US012127027B2

(12) United States Patent
Da Silva et al.

(10) Patent No.: US 12,127,027 B2
(45) Date of Patent: Oct. 22, 2024

(54) EARLY MEASUREMENT REPORTING WITH RRC RESUME REQUEST MESSAGE AND INDICATION OF REQUEST FOR EARLY MEASUREMENTS IN ASSOCIATION WITH PAGING

(71) Applicant: Telefonaktiebolaget LM Ericsson (publ), Stockholm (SE)

(72) Inventors: Icaro Leonardo J. Da Silva, Solna (SE); Antonino Orsino, Kirkkonummi (FI); Jens Bergqvist, Linköping (SE); Osman Nuri Can Yilmaz, Espoo (FI); Oumer Teyeb, Solna (SE); Patrik Rugeland, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 431 days.

(21) Appl. No.: 17/430,088

(22) PCT Filed: Feb. 3, 2020

(86) PCT No.: PCT/SE2020/050093
§ 371 (c)(1),
(2) Date: Aug. 11, 2021

(87) PCT Pub. No.: WO2020/167205
PCT Pub. Date: Aug. 20, 2020

(65) Prior Publication Data
US 2022/0150739 A1  May 12, 2022

(51) Int. Cl.
*H04W 24/10* (2009.01)
*H04W 12/0431* (2021.01)
(Continued)

(52) U.S. Cl.
CPC ....... *H04W 24/10* (2013.01); *H04W 12/0431* (2021.01); *H04W 68/005* (2013.01); *H04W 76/19* (2018.02)

(58) Field of Classification Search
CPC ............. H04W 24/10; H04W 12/0431; H04W 68/005; H04W 76/19; H04W 36/0085;
(Continued)

(56) References Cited

U.S. PATENT DOCUMENTS 10,856,163 B2 * 12/2020 Kim .................. H04L 5/001
2013/0252643 A1 * 9/2013 Park .................. H04W 68/025
455/458

(Continued)

FOREIGN PATENT DOCUMENTS

CN   109309969 B  *  7/2022   ............... H04B 7/06
CN   111385830 B  *  7/2022   ............ H04W 24/04
(Continued)

OTHER PUBLICATIONS

Sony, "R1-1808351: On providing quality report in Message 3," 3GPP TSG RAN WG1, Aug. 20-24, 2018, Gothenburg, Sweden, 4 pages (Year: 2018).*
(Continued)

*Primary Examiner* — Ayaz R Sheikh
*Assistant Examiner* — Louis Samara
(74) *Attorney, Agent, or Firm* — Withrow & Terranova, PLLC

(57) ABSTRACT

Systems and methods related to early measurement reporting are disclosed. In some embodiments, a method performed by a wireless device in a cellular communications system comprises transmitting measurements with a first message to a network node. The first message is a request to resume a connection of the wireless device with a target cell, and the measurements are measurements performed by the
(Continued)

wireless device while in a dormant state. Corresponding embodiments of a wireless device are also disclosed. Embodiments of a method of operation of a wireless device for reception of a request for early measurements in association with a paging message and corresponding embodiments of a wireless device are also disclosed. Embodiments of methods of operation of a network node and corresponding embodiments of a network node are also disclosed.

20 Claims, 26 Drawing Sheets

(51) Int. Cl.
    *H04W 68/00*    (2009.01)
    *H04W 76/19*    (2018.01)
(58) Field of Classification Search
    CPC . H04W 36/165; H04W 76/27; H04W 68/025; H04W 36/0058; H04W 52/0251; H04L 5/0053
    See application file for complete search history.

(56) References Cited

U.S. PATENT DOCUMENTS

| | | | | |
|---|---|---|---|---|
| 2017/0331670 | A1* | 11/2017 | Parkvall | H04W 52/0251 |
| 2018/0220344 | A1* | 8/2018 | Shaheen | H04W 4/60 |
| 2019/0387440 | A1* | 12/2019 | Yiu | H04W 36/362 |
| 2020/0396633 | A1* | 12/2020 | Tseng | H04L 5/001 |
| 2022/0132348 | A1* | 4/2022 | Orsino | H04W 76/27 |
| 2022/0150739 | A1* | 5/2022 | Da Silva | H04W 24/10 |

FOREIGN PATENT DOCUMENTS

| | | | | | |
|---|---|---|---|---|---|
| CN | 115699855 | A | * | 2/2023 | H04W 24/10 |
| CN | 113287339 | B | * | 9/2023 | H04L 5/0053 |
| KR | 102377138 | B1 | * | 12/2018 | |
| KR | 20180137385 | A | * | 12/2018 | |
| KR | 20200097573 | A | * | 8/2020 | |
| WO | WO-2012019536 | A1 | * | 2/2012 | H04W 24/10 |

OTHER PUBLICATIONS

Vivo, "R2-1811910: Discussion on UE behavior related to SIB2 idle measurement indication," 3GPP TSG-RAN WG2 Meeting #103, Aug. 20-24, 2018, Gothenburg, Sweden, 2 pages (Year: 2018).*

Qualcomm Incorporated, "R2-1804546: Fast SCell Configuration through Quick SCell Measurement Reporting," 3GPP TSG-RAN2 Meeting #101bis, Apr. 16-20, 2018, Athens, Greece, 7 pages (Year: 2018).*

Qualcomm Incorporated, "R2-1804546: Fast SCell Configuration through Quick SCell Measurement Reporting," 3GPP TSG-RAN2 Meeting #101bis, Apr. 16-20, 2018, Athens, Greece, 7 pages.

Ericsson, "R2-1900693: Signalling of early measurements for CA/DC setup," 3GPP TSG-RAN WG2 #105, Feb. 25-Mar. 1, 2019, Athens, Greece, 9 pages.

Ericsson, "R2-1904553: Email discussion [105#53][LTE_NR_DC_CA_enh-Core] Early measurements Signaling," 3GPP TSG-RAN WG2 Meeting #105bis, Apr. 8-12, 2019, Xi'an, China, 35 pages.

Examination Report for European Patent Application No. 20708224.9, mailed Mar. 6, 2023, 8 pages.

Author Unknown, "Technical Specification Group Services and System Aspects; General Packet Radio Service (GPRS) enahancements for Evolved Universal Terrestrial Radio Access Network (E-UTRAN) access (Release 16)," Technical Specification 23.401, Version 16.1.0, Dec. 2018, 3GPP Organizational Partners, 411 pages.

Author Unknown, "Technical Specification Group Radio Access Network; Evolved Universal Terrestrial Radio Access (E-UTRA); Requirements for support of radio resource management (Release 16)," Technical Specification 36.133, Version 16.0.0, Dec. 2018, 3GPP Organizational Partners, 3,563 pages.

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," Technical Specification 36.300, Version 15.4.0, mailed Dec. 2018, 3GPP Organizational Partners, 363 pages.

Author Unknown, "Technical Specification Group Radio Access Network; Evolved Universal Terrestrial Radio Access (E-UTRA); Medium Access Control (MAC) protocol specification (Release 15)," Technical Specification 36.321, Version 15.4.0, Dec. 2018, 3GPP Organizational Partners, 131 pages.

Author Unknown, "Technical Specification Group Radio Access Network; Evolved Universal Terrestrial Radio Access (E-UTRA); Packet Data Convergence Protocol (PDCP) specification (Release 15)," Technical Specification 36.323, Version 15.2.0, Dec. 2018, 3GPP Organizational Partners, 52 pages.

Author Unknown, "Technical Specification Group Radio Access Network; Evolved Universal Terrestrial Radio Access (E-UTRA); Radio Resource Control (RRC); Protocol specification (Release 15)," Technical Specification 36.331, Version 15.4.0, Dec. 2018, 3GPP Organizational Partners, 933 pages.

Author Unknown, "Technical Specification Group Radio Access Network; Evolved Univeral Terrestrial Radio Access (E-UTRA) and NR; Multi-connectivity; Stage 2 (Release 15)," Technical Specification 37.340, Version 15.4.0, Dec. 2018, 3GPP Organizational Partners, 67 pages.

Author Unknown, "Technical Specification Group Radio Access Network; NR; Physical layer procedures for control (Release 15)," Technical Specification 38.213, Version 15.4.0, Dec. 2018, 3GPP Organizational Partners, 104 pages.

Author Unknown, "Technical Specification Group Radio Access Network; NR; User Equipment (UE) procedures in Idle mode and RRC Inactive state (Release 15)," Technical Specification 38.304, Version 15.2.0, Dec. 2018, 3GPP Organizational Partners, 28 pages.

Author Unknown, "Technical Specification Group Radio Access Network; NR; Medium Access Control (MAC) protocol specification (Release 15)," Technical Specification 38.321, Version 15.4.0, Dec. 2018, 3GPP Organizational Partners, 77 pages.

Author Unknown, "Technical Specification Group Radio Access Network; NR; Packet Data Convergence Protocol (PDCP) specification (Release 15)," Technical Specification 38.323, Version 15.4.0, Dec. 2018, 3GPP Organizational Partners, 26 pages.

Author Unknown, "Technical Specification Group Radio Access Network; NR; Radio Resource Control (RRC) protocol specification (Release 15)," Technical Specification 38.331, Version 15.4.0, Dec. 2018, 3GPP Organizational Partners, 474 pages.

Ericsson, "R2-1802570: Measurement reporting in NB-IoT," 3GPP TSG-RAN2 Meeting #101, Feb. 26-Mar. 2, 2018, Athens, Greece, 7 pages.

Ericsson, "R2-1907253: Signaling of early measurements with Resume Request," 3GPP TSG-RAN WG2#106, May 13-17, 2019, Reno, Nevada, 8 pages.

Sony, "R1-1808351: On providing quality report in Message 3," 3GPP TSG RAN WG1, Aug. 20-24, 2018, Gothenburg, Sweden, 4 pages.

Vivo, "R2-1811910: Discussion on UE behavior related to SIB2 idle measurement indication," 3GPP TSG-RAN WG2 Meeting #103, Aug. 20-24, 2018, Gothenburg, Sweden, 2 pages.

International Search Report and Written Opinion for International Patent Application No. PCT/SE2020/050093, mailed May 15, 2020, 20 pages.

* cited by examiner

Note: The action of moving to Dormant is called "Hybernation"

3GPP Scenarios, LTE and NR Interworking Options

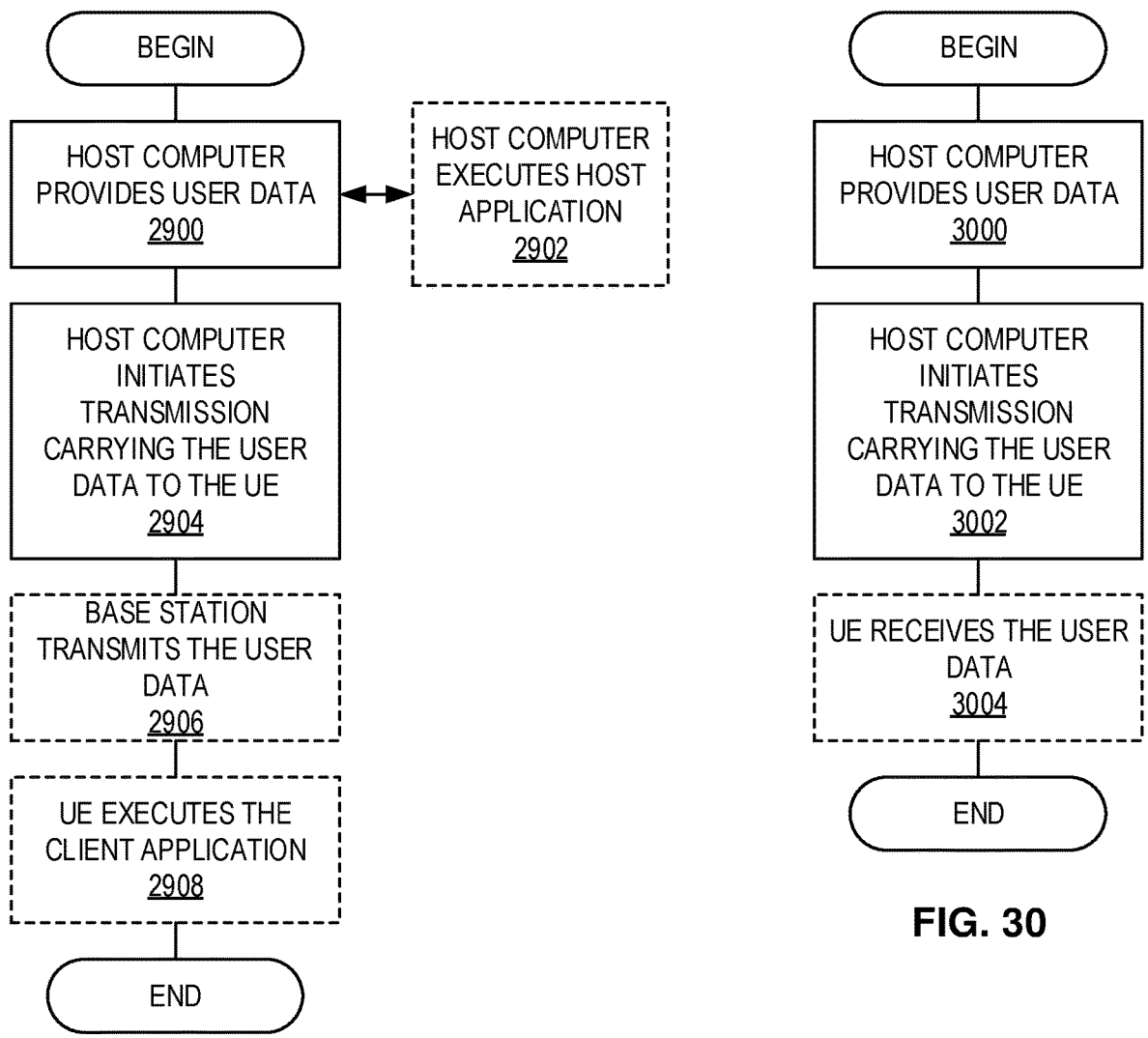

EARLY MEASUREMENT REPORTING WITH RRC RESUME REQUEST MESSAGE AND INDICATION OF REQUEST FOR EARLY MEASUREMENTS IN ASSOCIATION WITH PAGING

RELATED APPLICATIONS

This application is a 35 U.S.C. § 371 national phase filing of International Application No. PCT/SE2020/050093, filed Feb. 3, 2020, which claims the benefit of provisional patent application Ser. No. 62/804,612, filed Feb. 12, 2019, and provisional patent application Ser. No. 62/804,734, filed Feb. 12, 2019, the disclosures of which are hereby incorporated herein by reference in their entireties.

TECHNICAL FIELD

The present disclosure relates to Carrier Aggregation (CA) and/or Dual Connectivity (DC) enhancements; early inactive measurements; and resume, suspend, and/or Radio Resource Control (RRC) inactivate state.

BACKGROUND

1 Carrier Aggregation (CA) and Dual Connectivity (DC) in Long Term Evolution (LTE)

CA was introduced in LTE Release 10 to enable the User Equipment (UE) to transmit and/or receive information via multiple cells (so called Secondary Cells—SCell(s)) from multiple carrier frequencies to benefit existing non-contiguous and contiguous carriers. In CA terminology, the Primary Cell (PCell) is the cell towards which the UE establishes the Radio Resource Control (RRC) connection or performs handover. In CA, cells are aggregated on the Medium Access Control (MAC) level. MAC gets grants for a certain cell and multiplexes data from different bearers to one transport block being sent on that cell. Also, MAC controls how that process is done. This is illustrated in FIG. 1.

SCells can be "added" (a.k.a. "configured") for the UE using RRC signaling (e.g., RRCConnectionReconfiguration), which takes in the order of hundreds of milliseconds. A cell which is configured for the UE becomes a "serving cell" for this UE. An SCell may also be associated with an SCell state. When configured/added via RRC, an SCell starts in deactivated state. In LTE Release 15, the enhanced or evolved Node B (eNB) can indicate to activate-upon-configuration, or change the state, at least in RRCReconfiguration, as shown below (from Third Generation Partnership Project (3GPP) Technical Specification (TS) 36.331 V15.3.0):

In LTE Release 15, a new intermediate state between the deactivated and active state has been introduced for enhanced uplink operation. A MAC Control Element (CE) can be used to change the SCell state between the three states as shown in FIG. 2. There are also timers in MAC to move a cell between deactivated/activated/dormant.

These timers are:
  sCellHibernationTimer; which moves the SCell from activated state to dormant state,
  sCellDeactivationTimer; which moves the SCell from activated state to deactivated state,
  dormantSCellDeactivationTimer; which moves the SCell from dormant state to deactivated state.

The MAC level SCell activation takes in the order of 20-30 milliseconds (ms).

Once the network understands the need to configure and/or activate CA, the question is which cells to initially configure and/or activate, if they are configured, and/or whether a cell/carrier is good enough in terms of radio quality/coverage (e.g., Reference Signal Received Power (RSRP) and Reference Signal Received Quality (RSRQ)). To understand the conditions on SCell(s) or potential SCell (s) in a given available carrier, the network may configure the UE to perform Radio Resource Management (RRM) measurements.

Typically, the network may be assisted by RRM measurements to be reported by a UE. The network may configure the UE with measurement Identities (IDs) associated to reportConfig with event A1 (serving cell becomes better than threshold) in case this is a configured SCell, or A4 (neighbor cell becomes better than threshold) for carriers without a configured SCell. The measurement objects are associated with the carrier the network wants reports on. If the network is aware of the exact cells it wants the UE to measure, a so-called white cell list can be configured in the measurement object so that the UE is only required to measure these cells in that carrier.

FIG. 3 illustrates a process in which the network decides to setup CA or DC for a UE. The network then configures the UE to perform measurements, and the UE sends the appropriate measurement reports to the network. Based on the received measurement reports, the network makes a decision on SCell addition or SCell activation and then configures the UE to add the selected SCell(s).

With the introduction of DC in Release 12, it was possible to add what is called Secondary Cell Group (SGC) configuration to the UE. The main benefit would be that the UE could in principle add a cell from another eNB. Protocol-wise, that would require different MAC entities, one for each cell group. The UE will have two cell groups, one associated with the PCell (master node) and another associated with a

---

1> for each SCell configured for the UE other than the PSCell:
  2> if the received RRCConnectionReconfiguration message includes sCellState for the SCell and indicates activated:
    3> configure lower layers to consider the SCell to be in activated state;
  2> else if the received RRCConnectionReconfiguration message includes sCellState for the SCell and indicates dormant:
    3> configure lower layers to consider the SCell to be in dormant state;
  2> else:
    3> configure lower layers to consider the SCell to be in deactivated state;

Primary Secondary Cell (PSCell) (of the secondary eNB), where each group may possibly have their own associated SCells.

When it comes to adding SCells, when the UE is in single connectivity, the RRCConnectionReconfiguration message may carry a cell index (so MAC identifiers are optimized, i.e., shorter), cell identifier and carrier frequency, common parameters, and state information, introduced in Release 15 (activated or dormant).

The SCellToAddModList included in the RRCConnectionReconfiguration is illustrated and described below.

```
SCellToAddModList-r10 ::=           SEQUENCE (SIZE (1..maxSCell-r10)) OF
SCellToAddMod-r10
SCellToAddMod-r10 ::=               SEQUENCE {
    sCellIndex-r10                      SCellIndex-r10,
    cellIdentification-r10              SEQUENCE {
        physCellId-r10                      PhysCellId,
        dl-CarrierFreq-r10                  ARFCN-ValueEUTRA
    }                                                   OPTIONAL,-- Cond
SCellAdd
    radioResourceConfigCommonSCell-r10          RadioResourceConfigCommonSCell-r10
    OPTIONAL,   -- Cond SCellAdd
    radioResourceConfigDedicatedSCell-r10 RadioResourceConfigDedicatedSCell-r10
    OPTIONAL,   -- Cond SCellAdd2
    ...,
    [[ dl-CarrierFreq-v1090             ARFCN-ValueEUTRA-v9e0   OPTIONAL --
Cond EARFCN-max
    ]],
    [[ antennaInfoDedicatedSCell-v10i0  AntennaInfoDedicated-v10i0
    OPTIONAL -- Need ON
    ]],
    [[ srs-SwitchFromServCellIndex-r14  INTEGER (0.. 31) OPTIONAL -- Need
ON
    ]],
    [[ sCellState-r15                   ENUMERATED {activated, dormant}
    OPTIONAL   -- Need ON
    ]]
}
```

RRCConnectionReconfiguration field descriptions sCellConfigCommon
Indicates the common configuration for the SCell group.
sCellGroupIndex
Indicates the identity of SCell groups for which a common configuration is
provided.
sCellIndex
In case of DC, the SCellIndex is unique within the scope of the UE i.e. an SCG cell
can not use the same value as used for an MCG cell. For pSCellToAddMod, if
sCellIndex-r13 is present the UE shall ignore sCellIndex-r12. sCellIndex-r13 in
sCellToAddModListExt-r13 shall not have same values as sCellIndex-r10 in
sCellToAddModList-r10.
sCellGroupToAddModList, sCellGroupToAddModListSCG
Indicates the SCell group to be added or modified. E-UTRAN only configures at
most 4 SCell groups per UE over all cell groups.
sCellGroupToReleaseList
Indicates the SCell group to be released.
sCellState
A one-shot field that indicates whether the SCell shall be considered to be in
activated or dormant state upon SCell configuration.
sCellToAddModList, sCellToAddModListExt
Indicates the SCell to be added or modified. Field sCellToAddModList is used to
add the first 4 SCells for a UE with sCellIndex-r10 while sCellToAddModListExt is
used to add the rest. If E-UTRAN includes sCellToAddModListExt-v1430 it includes
the same number of entries, and listed in the same order, as in
sCellToAddModListExt-r13. If E-UTRAN includes sCellToAddModList-v10l0 it
includes the same number of entries, and listed in the same order, as in
sCellToAddModList-r10. If E-UTRAN includes sCellToAddModListExt-v1370 it
includes the same number of entries, and listed in the same order, as in
sCellToAddModListExt-r13. If E-UTRAN includes sCellToAddModListExt-v13c0 it
includes the same number of entries, and listed in the same order, as in
sCellToAddModListExt-r13.
sCellToAddModListSCG, sCellToAddModListSCG-Ext
Indicates the SCG cell to be added or modified. The field is used for SCG cells
other than the PSCell (which is added/ modified by field pSCellToAddMod). Field
sCellToAddModListSCG is used to add the first 4 SCells for a UE with sCellIndex-
r10 while sCellToAddModListSCG-Ext is used to add the rest. If E-UTRAN includes
sCellToAddModListSCG-v10l0 it includes the same number of entries, and listed in
the same order, as in sCellToAddModListSCG-r12. If E-UTRAN includes
sCellToAddModListSCG-Ext-v1370 it includes the same number of entries, and
listed in the same order, as in sCellToAddModListSCG-Ext-r13. If E-UTRAN
includes sCellToAddModListSCG-Ext-v13c0 it includes the same number of
entries, and listed in the same order, as in sCellToAddModListSCG-Ext-r13.

-continued sCellToReleaseListSCG, sCellToReleaseListSCG-Ext
Indicates the SCG cell to be released. The field is also used to release the PSCell
e.g. upon change of PSCell, upon system information change for the PSCell.

The procedure to add SCells to the Master Cell Group (MCG) in LTE (or to modify) is described as follows (as in 3GPP TS 36.331 V15.3.0):

5.3.5.3 Reception of an RRCConnectionReconfiguration not including the
mobilityControlInfo by the UE
If the RRCConnectionReconfiguration message does not include the
mobilityControlInfo and the UE is able to comply with the configuration included in
this message, the UE shall:
...
  1> if the received RRCConnectionReconfiguration includes the sCellToAddModList:
    2> perform SCell addition or modification as specified in 5.3.10.3b;
...
5.3.10.3b SCell addition/ modification
The UE shall:
  1> for each sCellIndex value included either in the sCellToAddModList or in the
    sCellToAddModListSCG that is not part of the current UE configuration (SCell
    addition):
    2> add the SCell, corresponding to the cellIdentification, in accordance with
      the radioResourceConfigCommonSCell and
      radioResourceConfigDedicatedSCell, both included either in the
      sCellToAddModList or in the sCellToAddModListSCG;
    2> if sCellState is configured for the SCell and indicates activated:
      3> configure lower layers to consider the SCell to be in activated state;
    2> else if sCellState is configured for the SCell and indicates dormant:
      3> configure lower layers to consider the SCell to be in dormant state;
    2> else:
      3> configure lower layers to consider the SCell to be in deactivated state;
    2> for each measId included in the measIdList within VarMeasConfig:
      3> if SCells are not applicable for the associated measurement; and
      3> if the concerned SCell is included in cellsTriggeredList defined within the
        VarMeasReportList for this measId:
        4>remove the concerned SCell from cellsTriggeredList defined within the
          VarMeasReportList for this measId;
  1> for each sCellIndex value included either in the sCellToAddModList or in the
    sCellToAddModListSCG that is part of the current UE configuration (SCell
    modification):
    2> modify the SCell configuration in accordance with the
      radioResourceConfigDedicatedSCell, included either in the sCellToAddModList
      or in the sCellToAddModListSCG;

2 3GPP DC

In 3GPP, a DC solution has been specified, both for LTE and between LTE and New Radio (NR). In DC, two nodes are involved: a Master Node (MN) or Master eNB (MeNB), and a Secondary Node (SN) or Secondary eNB (SeNB). Multi-Connectivity (MC) is the case when there are more than two nodes involved.

As said earlier, DC is standardized for both LTE (LTE-DC) and for Evolved Universal Terrestrial Radio Access (E-UTRA)-NR DC (EN-DC). LTE-DC and EN-DC are designed differently when it comes to which nodes control what. For example, LTE-DC is a centralized solution while EN-DC is a decentralized solution.

FIG. 4 is a schematic showing what the control plane architecture looks like for LTE-DC and EN-DC. The main difference here is that in EN-DC, the SN has a separate RRC entity (NR RRC). This means that the SN can also control the UE; sometimes without the knowledge of the MN, but often the SN needs to coordinate with the MN. In LTE-DC, the RRC decisions are always coming from the MN (MN to UE). Note however, the SN still decides the configuration of the SN, since it is only the SN itself that has knowledge of what kind of resources, capabilities, etc. the SN has.

Each type of DC will now be described in detail.

2.1 LTE-DC

FIG. 5 illustrates a conventional LTE-DC configuration. As described in 3GPP TS 36.300, when the MeNB (labeled "MN" in FIG. 5) decides to request a SeNB addition (step 500), the MeNB sends a SCG-ConfigInfo message (step 502) that includes an indication of the MCG configuration and the entire UE capabilities for UE capability coordination as well as the latest measurement results for the SCG cell(s) requested to be added. The SeNB (labeled "SN1" in FIG. 5) responds with an acknowledgement (step 504), e.g., with a SCG-Config message that contains the latest measConfig to the MeNB. If the MeNB accepts the SCG-Config configurations, it sends this to the UE as well as the UE measurement configurations (MeasConfig) in the RRCConnectionReconfiguration message to the UE (step 506). The UE then provides measurement reports to the MeNB (step 508).

The MeNB cannot change the SCG-Config from the SeNB, it can only accept it or reject it. The reason for this is that the MeNB is not fully aware of the available resources and capabilities of the SeNB. Thus, if the MeNB modifies the SCG-Config, this can lead to the case that the UE utilizes incorrect resources. In practice, the measurement configuration is controlled by the MeNB. Note also that in the LTE-DC centralized solution the UE's measurement report is sent to the MeNB only.

2.2 EN-DC

The second option is to use a decentralized option, which is used by EN-DC. This means that the SN can directly configure the UE with measurement.

FIG. 6 illustrates a conventional EN-DC configuration. When the MN decides to add an SN (step 600), the MN sends a Cell Group (CG)-ConfigInfo message (step 602). The SN (labeled "SN1" in FIG. 6) responds with an acknowledgement, e.g., with a CG-Config message (step 604). The MN sends an RRCConnectionReconfiguration message to the UE (step 606). The UE then provides measurement reports to the MN (step 608). As shown in FIG. 6, the SN1 may also send an RRCConnectionReconfiguration message to the UE (step 610), and the UE may then provide measurement reports to the SN1 (step 612).

Thus, one difference of EN-DC compared to LTE-DC is that since the SN can also configure the UE's measurements, these are also transmitted to the SN via a Signaling Radio Bearer (SRB), such as SRB3 (if configured). The SN may then directly act upon these measurements. In conventional systems, the MN never receives these measurements (at least there is no specification that supports this by default). If SRB3 is not configured, the measurement configurations from the SN are sent to the UE, and the measurement reports from the UE based on these measurement configurations are sent to the SN, via embedded RRC messages on SRB1. The MN transparently forwards the measurement configurations to the UE and transparently forwards the measurement results to the SN.

In EN-DC, the main reason to have decentralized measurement configurations was latency requirements. Thus, by supporting a special SRB (called SRB3) for the SN node (NR), which allows the SN to configure the measurement separately (without involving the MN), the SN can speed up the measurements and measurement configurations. The use of SRB3 (using NR radio) may allow faster transmission than the corresponding LTE SRBs. Also, the backhaul link between the MN and the SN may be congested which could negatively affect both the measurement reporting and new measurement configurations.

Thus, sending the UE measurement report directly to the concerned node (MN or SN) can speed up the necessary action (e.g., switch node/add node). Another reason to have decentralized measurements is that LTE and NR use slightly different RRC and different mobility, which also makes it convenient to split the responsibility.

The decentralized EN-DC solution option includes measurement capability coordination. According to the latest 3GPP agreement, the SN shall inform the MN every time it changes which carrier frequencies the UE shall measure on. The measurement capability coordination is necessary to not exceed the number of carriers the UE can measure and also for gap coordination, which will be described in more detail below. If the MN and the SN configure more carriers than the UE can take measurements from, the UE probably will randomly ignore one or more carriers for measurements. In the worst case, these ignored carriers may be the most important carriers from which to take measurements.

If the SN receives a new value for the maximum number of frequency layers or reporting configurations from the MN, and it has already configured all the allowed measurements or reporting configurations based on the previous maximum values, it releases the required number of measurements or reporting configurations to comply with the new limit.

For the reasons described above, it is important to coordinate the measured frequency carriers. It is also important to coordinate the measurement gaps. To understand why it is important for the MN and the SN to also coordinate the measurement gaps, it helps to understand how the measurements are performed in EN-DC.

2.2.1 Measurement Gaps in EN-DC

EN-DC may use both "LTE frequencies" and very high Fifth Generation (5G) frequencies. 3GPP distinguishes between two Frequency Ranges (FRs), referred to as "FR1" and "FR2". FR1 is below 6 Gigahertz (GHz) and FR2 is above 28 GHz. The reason this is done is because of different UE capabilities. Some more advanced UEs can receive data on FR1 and measure on FR2 simultaneously (and vice versa) while some cannot measure on FR1 and receive data on FR2 at the same time (or vice versa).

To be able to measure on any frequency (FR1 or FR2) the UE must be configured with a so called "gap", i.e. a certain time when the UE does not receive any data on this frequency and can focus on measuring on other cells in this frequency range. If a UE can receive data on FR1 and measure on FR2 simultaneously (or vice versa), the "gap" is called per-FR gap. If a UE cannot measure on FR1 and receive data on FR2 simultaneously (or vice versa) it is called per-UE gap. The most efficient way is always to configure per-FR gap, because per-UE gap will influence the scheduling of all serving cells and consequently both FR1 and FR2 data will be interrupted then, i.e. all data transmission will be impacted for a short period for per-UE gap measurements.

The 3GPP Working Group "RAN2" has agreed that the network can choose either a per-UE gap or a per-FR gap for a UE. As mentioned above, both the MN and the SN can configure the UE with measurement gaps. Thus, some gap coordination is needed.

In general, if the UE is per-UE gap capable, then the MN configures the gap to the UE. Thus, the MN needs to know the SN frequencies in order to also calculate a suitable gap for the SN, and then send this gap configuration to the SN. The SN can send the FR1/FR2 frequencies to the MN via a CG-Config message, for example.

If the UE is capable of per FR1/FR2 gaps, it is decided that the MN configures the FR1 gaps and the SN configures the FR2 gaps. However, for the per FR1/FR2 gap case, the MN and SN need to coordinate the gaps so they don't overlap.

For either per-UE gap or per-LTE/FR1 gap, the MN transmits the gap pattern to the SN via CG-ConfigInfo (CG-ConfigInfo is the NR name of the SCG-Config in LTE).

2.3 MC

The idea with MC is that the UE can connect to more than two nodes, i.e., more than one SN node. The benefits of MC are similar to the benefits of DC, but MC allows even more new areas to be utilized, such as a centralized scheduler, even more robust mobility, etc.

For an MC solution with only one type of radio, e.g. NR base stations, some of the above arguments to have a decentralized solution are not as strong anymore since all NR nodes should be equally capable.

From a migration point of view, it is natural to continue using EN-DC principles also for MC, i.e. using a decentralized solution. Also, there may still be cases when a decentralized measurement solution is beneficial, e.g. when the nodes have different capabilities (e.g., 700 megahertz (MHz) versus 28 GHz nodes).

3 Inter Radio Access Technology (RAT) and Inter 5G Core (5GC) Interworking in LTE and NR 5G in 3GPP introduces both a new core network, which is referred to as the 5GC, and a new Radio Access Network (RAN), which is referred to as NR. The 5GC will, however, also support RATs other than NR. It has been agreed that LTE (or E-UTRA) should also be connected to 5GC. LTE base stations (eNBs) that are connected to 5GC are called next generation eNBs (ng-eNBs) and are part of Next Generation Radio Access Network (NG-RAN), which also includes NR base stations called gNBs. FIG. 7 shows how the base stations are connected to each other and the nodes in 5GC. In particular, FIG. 7 is the 5G System (5GS) architecture containing 5GC and NG-RAN.

There are different ways to deploy a 5G network with or without interworking with LTE (also referred to as E-UTRA) and Evolved Packet Core (EPC), as depicted in FIG. 8. In principle, NR and LTE can be deployed without any interworking, denoted by NR Stand-Alone (SA) operation, that is the gNB in NR can be connected to 5GC and the eNB can be connected to EPC with no interconnection between the two (Option 1 and Option 2 in FIG. 8). On the other hand, the first supported version of NR is the so-called EN-DC, illustrated by Option 3 in FIG. 8. In such a deployment, DC between NR and LTE is applied with LTE as the master and NR as the secondary node. The RAN node (gNB) supporting NR may not have a control plane connection to the core network (EPC); instead, the gNB relies on the LTE as master node (MeNB). This is also called "Non-standalone NR". Notice that in this case the functionality of an NR cell is limited and would be used for connected mode UEs as a booster and/or diversity leg, but an RRC_IDLE UE cannot camp on these NR cells.

With introduction of 5GC, other options may be also valid. As mentioned above, Option 2 in FIG. 8 supports SA NR deployment where the gNB is connected to 5GC. Similarly, LTE can also be connected to 5GC using Option 5 (also known as enhanced LTE (eLTE), E-UTRA/5GC, or LTE/5GC and the node can be referred to as an ng-eNB). In these cases, both NR and LTE are seen as part of the NG-RAN (and both the ng-eNB and the gNB can be referred to as NG-RAN nodes). It is worth noting that Option 4 and Option 7 are other variants of DC between LTE and NR which will be standardized as part of NG-RAN connected to 5GC, denoted by Multi-Radio DC (MR-DC).

Under the MR-DC umbrella, we have:

EN-DC (Option 3): LTE is the master node and NR is the secondary node (EPC Core Network (CN) employed)

NR E-UTRA (NE)—DC (Option 4): NR is the master node and LTE is the secondary node (5GC employed)

Next Generation DC (NGEN-DC) (Option 7): LTE is the master node and NR is the secondary node (5GC employed)

NR-DC (variant of Option 2): DC where both the master and secondary nodes are NR (5GC employed).

As migration for these options may differ from different operators, it is possible to have deployments with multiple options in parallel in the same network, e.g. there could be an eNB base station supporting options 3, 5, and 7 in the same network as an NR base station supporting options 2 and 4. In combination with DC solutions between LTE and NR, it is also possible to support CA in each cell group (i.e., MCG and SCG) and DC between nodes on the same RAT (e.g., NR-NR DC). For the LTE cells, a consequence of these different deployments is the co-existence of LTE cells associated with eNBs connected to EPC, 5GC, or both EPC/5GC.

4 Suspend/Resume in LTE and Relation to CA/SCell and SCG Additions

A very typical scenario or use case is a UE with some burst traffic that comes and goes, e.g. some video packets and idle periods of transmission/reception, then comes live again. To save UE power, the network transitions the UE from connected to idle during these periods. Then, the UE comes back again (either via paging or UE request to get connected) and accesses the network.

In LTE Release 13, a mechanism was introduced for the UE to be suspended by the network in a suspended state similar to RRC_IDLE but with the difference that the UE stores the Access Stratum (AS) context or RRC context. This makes it possible to reduce the signaling when the UE is becoming active again by resuming the RRC connection, instead of as prior to establish the RRC connection from scratch. Reducing the signaling could have several benefits:

reduced latency, e.g., for smart phones accessing the Internet;

reduced signaling leads to reduced battery consumption for machine type devices sending very little data.

The Release 13 solution is based on the UE sending an RRCConnectionResumeRequest message to the network and, in response, the UE may receive an RRCConnectionResume from the network. The RRCConnectionResume is not encrypted but integrity protected.

The resume procedure in LTE can be found in the RRC specifications (3GPP TS 36.331). As the UE performing resume is in RRC_IDLE (with suspended AS context), a transition from RRC_IDLE to RRC_CONNECTED is triggered. Hence, this is modelled in the specifications in the same subclause that captures the RRC connection establishment (subclause 5.3.3 RRC connection establishment).

There are few things relevant to highlight in the SCG configurations and SCell configurations for MCGs in relation to suspend/resume procedures. Upon suspension, it is defined that the UE stores its used RRC configuration. In other words, if the UE is operating in any DC mode (and has an SCG configuration) or has just configured SCells in the MCG, the UE stores all these configurations. However, upon resume, at least until Release 15, it is defined that the UE shall release the SCG configurations and SCell configurations, as shown below:

5.3.3.2 Initiation
The UE initiates the procedure when upper layers request establishment or resume of an RRC connection while the UE is in RRC_IDLE or when upper layers request resume of an RRC connection or RRC layer requests resume of an RRC connection for, e.g. RNAU or reception of RAN paging while the UE is in RRC_INACTIVE.
. . .
Except for NB-IoT, upon initiating the procedure, if connected to EPC or 5GC, the UE shall:
    1> if the UE is resuming an RRC connection from a suspended RRC connection or from RRC_INACTIVE:
        2> if the UE is resuming an RRC connection from a suspended RRC connection:
            3> if the UE was configured with EN-DC:
                4>perform EN-DC release, as specified in TS 38.331 [82], clause 5.3.5.10;
        2> release the MCG SCell(s), if configured, in accordance with 5.3.10.3a;
    . . .
        2> release the entire SCG configuration, if configured, except for the DRB configuration (as configured by drb-ToAddModListSCG);

Hence, when the UE comes from RRC_IDLE with the context, if the network wants to add SCell(s) to the MCG or add an SCG, the network needs to do that from scratch, even if the UE is suspending and resuming in the same cell/area where all the previous PCell and SCell configurations are still valid from a radio conditions perspective.

As the use case of UEs with burst traffic constantly being suspended and resuming in the same cell is quite typical, 3GPP has standardized a solution in LTE to enable the UE to assist the network with measurements performed while the UE is in RRC_IDLE so that the network could speed up the setup of CA or DC. That solution is described below.

5 Existing Solution for Early Measurements Upon Idle to Connected Transition in LTE (Release15)

In LTE Release 15, it is possible to configure the UE to report so-called early measurements upon the transition from idle to connected state. These measurements are measurements that the UE can perform in idle state. According to a configuration provided by the source cell with the intention to receive these measurements immediately after the UE is connected and quickly sets up CA and/or other forms of DC (e.g., EN-DC, MR-DC, etc.) without the need to first provide a measurement configuration (measConfig) in RRC_CONNECTED, as shown in previous sections, the UE waits for hundreds of milliseconds until first samples are collected, monitored, and then the first reports are triggered and transmitted to the network.

5.1 Measurement Configuration for Early Measurements Upon Resume in LTE

A first aspect of the existing solution, as standardized in E-UTRA 36.331, is described in 5.6.20 Idle Mode Measurements. The UE can receive these idle mode measurement configurations in the system information (System Information Block 5 (SIB5)) in the field MeasId/eConfigSIB-r15, indicating up to 8 cells or ranges of cell IDs on which to perform measurements. In addition, the UE can be configured upon the transition from RRC_CONNECTED to RRC_IDLE with a dedicated measurement configuration in the RRCConnectionRelease message with the measIdleDedicated-r15 which overrides the broadcasted configurations in SIB5. The broadcasted and dedicated signaling is shown below:

| RRCConnectionRelease message |
|---|
| ```
-- ASN1START
RRCConnectionRelease ::=           SEQUENCE {
    rrc-TransactionIdentifier      RRC-TransactionIdentifier,
    criticalExtensions             CHOICE {
        c1                             CHOICE {
            rrcConnectionRelease-r8        RRCConnectionRelease-r8-IEs,
            spare3 NULL, spare2 NULL, spare1 NULL
        },
        criticalExtensionsFuture       SEQUENCE { }
    }
}
-- other info has been omitted
RRCConnectionRelease-v1530-IEs ::= SEQUENCE {
    drb-ContinueROHC-r15           ENUMERATED {true}            OPTIONAL, --
Cond UP-EDT
    nextHopChainingCount-r15       NextHopChainingCount         OPTIONAL, --
Cond UP-EDT
    measIdleConfig-r15             MeasIdleConfigDedicated-r15
OPTIONAL, -- Need ON
    rrc-InactiveConfig-r15         RRC-InactiveConfig-r15       OPTIONAL, --
Need OR
    cn-Type-r15                    ENUMERATED {epc,fivegc}      OPTIONAL,
-- Need OR
    nonCriticalExtension           SEQUENCE { }                 OPTIONAL
}
-- ASN1STOP
``` |

| MeasIdleConfig information element |
| --- |

```
-- ASN1START
MeasIdleConfigSIB-r15 ::= SEQUENCE {
  measIdleCarrierListEUTRA-r15 EUTRA-CarrierList-r15,
  ...
}
MeasIdleConfigDedicated-r15 :: = SEQUENCE {
  measIdleCarrierListEUTRA-r15      EUTRA-CarrierList-r15    OPTIONAL,
  -- Need OR
  measIdleDuration-r15              ENUMERATED {sec10, sec30, sec60, sec120,
                                       sec180, sec240, sec300, spare},
  ...
}
EUTRA-CarrierList-r15 :: = SEQUENCE (SIZE (1..maxFreqIdle-r15)) OF MeasIdleCarrierEUTRA-r15
MeasIdleCarrierEUTRA-r15::=        SEQUENCE {
  carrierFreq-r15                   ARFCN-ValueEUTRA-r9,
  allowedMeasBandwidth-r15          AllowedMeasBandwidth,
  validityArea-r15                  CellList-r15             OPTIONAL, -- Need OR
  measCellList-r15                  CellList-r15             OPTIONAL, -- Need OR
  reportQuantities                  ENUMERATED {rsrp, rsrq, both},
  qualityThreshold-r15              SEQUENCE {
    idleRSRP-Threshold-r15              RSRP-Range             OPTIONAL, -- Need OR
    idleRSRQ-Threshold-r15              RSRQ-Range-r13         OPTIONAL -- Need OR
  }                                                          OPTIONAL, -- Need OR
  ...
}
CellList-r15 ::=   SEQUENCE (SIZE (1.. maxCellMeasIdle-r15)) OF PhysCellIdRange
-- ASN1STOP
```

| MeasIdleConfig field descriptions |
| --- |
| allowedMeasBandwidth
If absent, the value corresponding to the downlink bandwidth indicated by the dl-Bandwidth included in MasterInformationBlock of serving cell applies.
carrierFreq
Indicates the E-UTRA carrier frequency to be used for measurements during IDLE mode.
measIdleCarrierListEUTRA
Indicates the E-UTRA carriers to be measured during IDLE mode.
measIdleDuration
Indicates the duration for performing measurements during IDLE mode for measurements assigned via RRCConnectionRelease. Value sec10 correspond to 10 seconds, value sec30 to 30 seconds and so on.
qualityThreshold
Indicates the quality thresholds for reporting the measured cells for IDLE mode measurements.
reportQuantities
Indicates which measurment quantities UE is requested to report in the IDLE mode measurement report.
measCellList
Indicates the list of cells which the UE is requested to measure and report for IDLE mode measurements.
validityArea
Indicates the list of cells within which UE is requested to do IDLE mode measurements. If the UE reselects to a cell outside this list, the measurements are no longer required. |

Carrier information and cell list: The UE is provided with a list of carriers and optionally with a list of cells on which the UE shall perform measurements. The fields s-NonIntraSearch in SystemInformationBlockType3 do not affect the UE measurement procedures in IDLE mode.

Timer T331: Upon the reception of that measurement configuration, the UE starts a timer T331 with the value provided in measIdleDuration, which can go from 0 to 300 seconds. The timer stops upon receiving RRCConnectionSetup, RRCConnectionResume which indicates a transition to RRC_CONNECTED, or, if validityArea is configured, upon reselecting to a cell that does not belong to validityArea. Upon expiry, these measurements performed in idle may be discarded. The timer T331 (also sometimes referred to as a "validity timer") exists to limit the amount of time the UE performs measurements for the purpose of early measurements.

Validity Area: Another concept introduced in the LTE Release 15 solution is a validity area, which comprises a list of Physical Cell Identities (PCIs). The intention is to limit the area where CA or DC may be setup later when the UE configuration (i.e., VarMeasIdleConfig). Notice that this does not necessarily imply that the UE releases the idle measurements that were configured in Release and that were performed, i.e. these may still be stored and possibly requested by the network. In addition, the UE may continue with IDLE mode measurements according to the broadcasted SIB5 configuration after the timer T331 has expired or stopped.

Minimum quality threshold: Notice also that only measurements above a certain threshold shall be stored as the cell candidates for CA setup need to be within a minimum acceptable threshold. How the UE performs measurements in IDLE mode is up to UE implementation as long as RAN4 requirements for measurement reporting defined in 36.133 are met.

How the UE performs measurements in IDLE mode is up to UE implementation as long as 3GPP Working Group RAN4 requirements for measurement reporting defined in 3GPP TS 36.133 are met.

The UE behavior is described in 3GPP TS 36.331, a portion of which is reproduced below:

---

5.6.20 Idle Mode Measurements
5.6.20.1 General
This procedure specifies the measurements done by a UE in RRC_IDLE when it has an IDLE mode measurement configuration and the storage of the available measurements by a UE in both RRC_IDLE and RRC_CONNECTED.
5.6.20.2 Initiation
While T331 is running, the UE shall:
    1> perform the measurements in accordance with the following:
        2> for each entry in measIdleCarrierListEUTRA within VarMeasIdleConfig:
            3> if UE supports carrier aggregation between serving carrier and the carrier frequency and bandwidth indicated by carrierFreq and allowedMeasBandwidth within the corresponding entry;
                4>perform measurements in the carrier frequency and bandwidth indicated by carrierFreq and allowedMeasBandwidth within the corresponding entry;
                NOTE: The fields s-NonIntraSearch in SystemInformationBlockType3 do not affect the UE measurement procedures in IDLE mode. How the UE performs measurements in IDLE mode is up to UE implementation as long as the requirements in TS 36.133 [16] are met for measurement reporting. UE is not required to perform idle measurements if SIB2 idle measurement indication is not configured.
            4>if the measCellList is included:
                5> consider PCell and cells identified by each entry within the measCellList to be applicable for idle mode measurement reporting;
            4>else:
                5> consider PCell and up to maxCellMeasIdle strongest identified cells whose RSRP/RSRQ measurement results are above the value(s) provided in qualityThreshold (if any) to be applicable for idle mode measurement reporting;
            4>store measurement results for cells applicable for idle mode measurement reporting within the VarMeasIdleReport;
        3> else:
            4>do not consider the carrier frequency to be applicable for idle mode measurement reporting;
    1> if validityArea is configured in VarMeasIdleConfig and UE reselects to a serving cell whose physical cell identity does not match any entry in validityArea for the corresponding carrier frequency:
        2> stop T331;
5.6.20.3 T331 expiry or stop
The UE shall:
    1> if T331 expires or is stopped:
        2> release the VarMeasIdleConfig;
NOTE:It is up to UE implementation whether to continue IDLE mode measurements according to SIB5 configuration after T331 has expired or stopped.

--- resumes/sets up the connection, so the early measurements are somewhat useful for that purpose. If validityArea is configured, and the UE reselects to a serving cell whose PCI does not match any entry in validityArea for the corresponding carrier frequency, the timer T331 is stopped. Then, the UE stops to perform IDLE measurements and releases the 5.2 Indication of Available Early Measurements Upon Resume/Setup in LTE Another aspect of the existing solution occurs when the UE tries to resume or setup a call from RRC_IDLE without context. If the previous step is performed, i.e. if the UE is configured to store idle measurements, the network may request the UE after resume/setup (after security is activated) whether the UE has idle measurements available.

In the case this UE is setting up a connection coming from RRC_IDLE without the AS context, the network is not aware that the UE has available measurements stored. Then, to allow the network to know that and possibly request the UE to report early measurements, the UE may indicate the availability of stored idle measurements in RRCConnectionSetupComplete. As not all cells would support the feature anyway, the UE only includes that availability information if the cell broadcasts the id/eModeMeasurements indication in SIB2. The flag in RRCReconnectionSetupComplete and procedure text are shown below:

available idle measurements stored after checking the fetched context from the source node where the UE got suspended. However, it is still not certain that the UE has measurements available since the UE is only required to perform the measurements if the cells are above the configured RSRP/RSRQ thresholds and while it performs cell selection/cell reselection within the configured validity area. Then, to allow the network to know that and possibly request the UE to report early measurements, the UE may also indicate the availability of stored idle measurements in RRCConnectionResumeComplete. As not all cells would support the feature anyway, the UE only includes that availability information if the cell broadcasts the idleMode-

```
RRCConnectionSetupComplete-v1530-IEs ::= SEQUENCE {
    logMeasAvailableBT-r15              ENUMERATED {true}
OPTIONAL,
    logMeasAvailableWLAN-r15            ENUMERATED {true}
OPTIONAL,
    idleMeasAvailable-r15               ENUMERATED {true}
OPTIONAL,
    flightPathInfoAvailable-r15         ENUMERATED {true}
OPTIONAL,
    connectTo5GC-r15                    ENUMERATED {true}
OPTIONAL,
    registeredAMF-r15                   RegisteredAMF-r15
OPTIONAL,
    s-NSSAI-list-r15                    SEQUENCE(SIZE (1..maxNrofS-NSSAI-r15)) OF S-
NSSAI-r15 OPTIONAL,
    ng-5G-S-TMSI-Bits-r15               CHOICE {
        ng-5G-S-TMSI-r15                    NG-5G-S-TMSI-r15,
        ng-5G-S-TMSI-Part2-r15              BIT STRING (SIZE (8))
    }                                               OPTIONAL,
    nonCriticalExtension                RRCConnectionSetupComplete-v1540-IEs
OPTIONAL
}
5.3.3.4  Reception of the RRCConnectionSetup by the UE
        NOTE 1: Prior to this, lower layer signalling is used to allocate a C-RNTI.
        For further details see TS 36.321 [6];
The UE shall:
    1>  if the RRCConnectionSetup is received in response to an
        RRCConnectionResumeRequest from a suspended RRC connection:
        . . .
    1>  set the content of RRCConnectionSetupComplete message as follows:
        2>  if the RRCConnectionSetup is received in response to an
            RRCConnectionResumeRequest:
        . . .
        2>  if the UE is connected to EPC:
            3>  except for NB-IoT:
                . . .
                4>  if the SIB2 contains idleModeMeasurements, and the UE
                    has IDLE mode measurement information available in
                    VarMeasIdleReport:
                    5>  include the idleMeasAvailable;
                4>stop T331 (if running);
                . . .
            3>  for NB-IoT:
                4>  if the UE supports serving cell idle mode measurements
                    reporting and servingCellMeasInfo is present in
                    SystemInformationBlockType2-NB:
                    5>  set the measResultServCell to include the measurements
                        of the serving cell;
                NOTE 2: The UE includes the latest results of the serving cell
                measurements as used for cell selection/ reselection evaluation, which are
                performed in accordance with the performance requirements as specified in
                TS 36.133 [16].
            3>  include dcn-ID if a DCN-ID value (see TS 23.401 [41]) is received from
                upper layers;
```

In the case this UE is setting up a connection coming from RRC_IDLE but with a stored AS context (i.e., resume from suspended), the network may be aware that the UE may have Measurements indication in SIB2. The flag in RRCReconnectionResumeComplete and procedure text are shown below:

```
RRCConnectionResumeComplete-v1530-IEs ::= SEQUENCE {
    logMeasAvailableBT-r15          ENUMERATED {true}
        OPTIONAL,
    logMeasAvailableWLAN-r15        ENUMERATED {true}
        OPTIONAL,
    idleMeasAvailable-r15           ENUMERATED {true}
        OPTIONAL,
    flightPathInfoAvailable-r15     ENUMERATED {true}
        OPTIONAL,
    nonCriticalExtension            SEQUENCE { }                OPTIONAL
}
```

*****************************************************************
*****

5.3.3.4a        Reception of the RRCConnectionResume by the UE
The UE shall:
...
1> set the content of RRCConnectionResumeComptete message as follows:
    2>      except for NB-IoT:
        ...
        3>      if the SIB2 contains idleModeMeasurements, and the UE has
            IDLE mode measurement information available in
            VarMeasIdleReport:
            4>      include the idleMeasAvailable;
        3>      stop T331 (if running);
    2>      for NB-IoT:
        3>      if the UE supports serving cell idle mode measurements
            reporting and servingCellMeasInfo is present in
            SystemInformationBlockType2-NB:
            4>      set the measResultServCell to include the measurements
                of the serving cell;
            NOTE:   The UE includes the latest results of the serving cell
            measurements as used for cell selection/ reselection evaluation, which are
            performed in accordance with the performance requirements as specified in
            TS 36.133 [16].
1> submit the RRCConnectionResumeComplete message to lower layers for
    transmission;
1> the procedure ends.

5.3 Reporting of Early Measurements Upon Resume/Setup in LTE

Once the UE indicates to the target cell upon resume or setup that idle measurements are available, the network may finally request the UE to report these available measurements by including the field idleModeMeasurementReq in the UEInformationRequest message transmitted to the UE. Then, the UE responds with a UEInformationResponse containing these measurements. This process is illustrated in FIG. 9.

5.6.5.3             Reception of the UEInformationRequest message
Upon receiving the UEInformationRequest message, the UE shall, only after
successful security activation:
...
1> if the idleModeMeasurementReq is included in the UEInformationRequest and UE
    has stored VarMeasIdleReport:
    2>      set the measResultListIdle in the UEInformationResponse message to
        the value of idleMeasReport in the VarMeasIdleReport;
    2>      discard the VarMeasIdleReport upon successful delivery of the
        UEInformationResponse message confirmed by lower layers;
...

UEInformationResponse message

```
-- ASN1START
UEInformationResponse-r9 ::=                SEQUENCE {
    rrc-TransactionIdentifier               RRC-TransactionIdentifier,
    criticalExtensions                      CHOICE {
        c1                                  CHOICE {
            ueInformationResponse-r9                UEInformationResponse-r9-IEs,
            spare3 NULL, spare2 NULL, spare1 NULL
        },
        criticalExtensionsFuture            SEQUENCE { }
    }
}
UEInformationResponse-v1530-IEs ::= SEQUENCE {
    measResultListIdle-r15                  MeasResultListIdle-r15
        OPTIONAL,
    flightPathInfoReport-r15                FlightPathInfoReport-r15        OPTIONAL,
    nonCriticalExtension                    SEQUENCE { }                    OPTIONAL
}
```

-continued

```
5.6.20 Idle Mode Measurements
5.6.20.1                    General
This procedure specifies the measurements done by a UE in RRC_IDLE when it has an
IDLE mode measurement configuration and the storage of the available
measurements by a UE in both RRC_IDLE and RRC_CONNECTED.
5.6.20.2                    Initiation
While T331 is running, the UE shall:
  1> perform the measurements in accordance with the following:
      2>                      for each entry in measIdleCarrierListEUTRA within VarMeasIdleConfig:
          3>                  if UE supports carrier aggregation between serving carrier and the
              carrier frequency and bandwidth indicated by carrierFreq and
              allowedMeasBandwidth within the corresponding entry;
          4>perform measurements in the carrier frequency and bandwidth indicated
                              by carrierFreq and allowedMeasBandwidth within the corresponding
                              entry;
              NOTE: The fields s-NonIntraSearch in SystemInformationBlockType3 do
              not affect the UE measurement procedures in IDLE mode. How the UE
              performs measurements in IDLE mode is up to UE implementation as long
              as the requirements in TS 36.133 [16] are met for measurement reporting.
              UE is not required to perform idle measurements if SIB2 idle measurement
              indication is not configured.
          4>if the measCellList is included:
              5>      consider PCell and cells identified by each entry within the
                      measCellList to be applicable for idle mode measurement reporting;
          4>else:
              5>      consider PCell and up to maxCellMeasIdle strongest identified
                      cells whose RSRP/RSRQ measurement results are above the value(s)
                      provided in qualityThreshold (if any) to be applicable for idle mode
                      measurement reporting;
          4>store measurement results for cells applicable for idle mode
                      measurement reporting within the VarMeasIdleReport;
      3>                      else:
          4>do not consider the carrier frequency to be applicable for idle mode
                      measurement reporting;
  1> if validityArea is configured in VarMeasIdleConfig and UE reselects to a serving
      cell whose physical cell identity does not match any entry in validityArea for the
      corresponding carrier frequency:
      2>                      stop T331;
5.6.20.3                    T331 expiry or stop
The UE shall:
  1> if T331 expires or is stopped:
      2>                      release the VarMeasIdleConfig;
NOTE: It is up to UE implementation whether to continue IDLE mode measurements
according to SIB5 configuration after T331 has expired or stopped.
```

In summary, measurements performed in idle may only be provided after security is set up. If the UE is released to IDLE (i.e., no UE context stored), security can be up and running only after security mode command procedure (two radio Round Trip Times (RTTs) after the UE enters the RRC_CONNECTED state, i.e., reception of RRCConnectionSetup). It may take quite some time for the UE to report these measurements and for the network to be able to make educated decisions, such as decisions relating to the setup of CA and/or DC, based on these measurements.

If the UE is suspended to the IDLE state (i.e., the UE context is stored), there is no need for security mode command procedure, and security can be up and running upon the reception of an RRCConnectionResume message, which contains the next hop chaining counter that enables the UE to start security according to the target configuration. Then, after the UE enters the RRC_CONNECTED state, the network may send the UEInformationRequest message and get the UEInformationResponse message with the idle measurements.

In the case of resumption of a data connection due to downlink data, the network is typically already aware of whether the data connection would require a CA or DC connection, before the actual establishment/resumption. The network then typically knows, for example, whether there is a lot of data to transfer and/or the requirements for the service, such as the latency requirements.

6 Paging

FIG. 10 illustrates a conventional paging scenario in which a network node sends a paging message to a UE (step 1000). Paging allows the network to reach UEs in the RRC_IDLE state and in the RRC_INACTIVE state, and to notify UEs in the RRC_IDLE state, the RRC_INACTIVE state, and the RRC_CONNECTED state of a change of system information, including Earthquake and Tsunami Warning System (ETWS) and Commercial Mobile Alert System (CMAS) indications.

While in the RRC_IDLE state, the UE monitors the paging channels for CN-initiated paging; in the RRC_INACTIVE state, the UE also monitors paging channels for RAN-initiated paging. A UE need not monitor paging channels continuously, however. Paging Discontinuous Reception (DRX) is defined where the UE in the RRC_IDLE state or the RRC_INACTIVE STATE is only required to monitor paging channels during one Paging Occasion (PO) per DRX cycle (see 3GPP TS 38.304). The paging DRX cycles are configured by the network:
1. For CN-initiated paging, a default cycle is broadcast in system information;
2. For CN-initiated paging, a UE specific cycle can be configured via Non-Access Stratum (NAS) signaling;
3. For RAN-initiated paging, a UE-specific cycle is configured via RRC signaling.

The UE uses the shortest of the DRX cycles applicable, i.e. a UE in the RRC_IDLE state uses the shorter of the first two cycles above, while a UE in the RRC_INACTIVE state uses the shortest of the three.

The POs of a UE for CN-initiated and RAN-initiated paging are based on the same UE ID, resulting in overlapping POs for both. The number of different POs in a DRX cycle is configurable via system information and a network may distribute UEs to those POs based on their IDs.

When in the RRC_CONNECTED state, the UE monitors the paging channels in any PO signaled in system information for a system information change indication and a Public Warning System (PWS) notification. In case of CA, a UE in the RRC_CONNECTED state only monitors paging channels on the active Bandwidth Part (BWP) with common search space configured.

Paging optimization for UEs in the CM_IDLE state: at UE context release, the NG-RAN node may provide the Access and Mobility Management Function (AMF) with a list of recommended cells and NG-RAN nodes as assistance information for subsequent paging. The AMF may also provide Paging Attempt Information consisting of a Paging Attempt Count and the Intended Number of Paging Attempts and may include the Next Paging Area Scope. If Paging Attempt Information is included in the Paging message, each paged NG-RAN node receives the same information during a paging attempt. The Paging Attempt Count shall be increased by one at each new paging attempt. The Next Paging Area Scope, when present, indicates whether the AMF plans to modify the paging area currently selected at the next paging attempt. If the UE has changed its state to Connection Management (CM) CONNECTED the Paging Attempt Count is reset.

Paging optimization for UEs in the RRC_INACTIVE state: at RAN Paging, the serving NG-RAN node provides RAN Paging area information. The serving NG-RAN node may also provide RAN Paging attempt information. Each paged NG-RAN node receives the same RAN Paging attempt information during a paging attempt with the following content: Paging Attempt Count, the intended number of paging attempts, and the Next Paging Area Scope. The Paging Attempt Count shall be increased by one at each new paging attempt. The Next Paging Area Scope, when present, indicates whether the serving NG_RAN node plans to modify the RAN Paging Area currently selected at the next paging attempt. If the UE leaves the RRC_INACTIVE state, the Paging Attempt Count is reset.

---

Excerpt from 3GPP TS 38.304:
The purpose of this procedure is:
- to transmit paging information to a UE in the RRC_IDLE state or the RRC_INACTIVE STATE.

Initiation
The network initiates the paging procedure by transmitting the Paging message at the UE's paging occasion as specified in TS 38.304 [20]. The network may address multiple UEs within a Paging message by including one PagingRecord for each UE.
Reception of the Paging message by the UE
Upon receiving the Paging message, the UE shall:
    1> if in the RRC_IDLE state, for each of the PagingRecord, if any, included in the Paging message:
        2> if the ue-Identity included in the PagingRecord matches the UE identity allocated by upper layers:
            3> forward the ue-Identity and accessType (if present) to the upper layers;
    1> if in the RRC_INACTIVE STATE, for each of the PagingRecord, if any, included in the Paging message:
        2> if the ue-Identity included in the PagingRecord matches the UE's stored fullI-RNTI:
            3> if the UE is configured by upper layers with access identity 1:
                4>initiate the RRC connection resumption procedure according to 5.3.13 with resumeCause set to MPS-PriorityAccess;
            3> else if the UE is configured by upper layers with access identity 2:
                4>initiate the RRC connection resumption procedure according to 5.3.13 with resumeCause set to MCS-PriorityAccess;
            3> else if the UE is configured by upper layers with one or more access identities equal to 11-15:
                4>initiate the RRC connection resumption procedure according to 5.3.13 with resumeCause set to highPriorityAccess;
            3> else:
                4>initiate the RRC connection resumption procedure according to 5.3.13 with resumeCause set to mt-Access;
        2> else if the ue-Identity included in the PagingRecord matches the UE identity allocated by upper layers:
            3> forward the ue-Identity to upper layers and accessType (if present) to the upper layers;

Paging ASN.1
The Paging message is used for the notification of one or more UEs.
  Signalling radio bearer: N/A
  RLC-SAP: TM
  Logical channel: PCCH
  Direction: Network to UE Paging message -- ASN1START
-- TAG-PAGING-START
Paging ::=                SEQUENCE {
  pagingRecordList          PagingRecordList
OPTIONAL, -- Need N

```
    lateNonCriticalExtension       OCTET STRING           OPTIONAL,
    nonCriticalExtension           SEQUENCE{ }                         OPTIONAL
}
PagingRecordList ::=           SEQUENCE (SIZE(1..maxNrofPageRec)) OF PagingRecord
PagingRecord ::=               SEQUENCE {
    ue-Identity                    PagingUE-Identity,
    accessType                         ENUMERATED {non3GPP}   OPTIONAL,   -- Need N
    ...
}
PagingUE-Identity ::=          CHOICE {
    ng-5G-S-TMSI                   NG-5G-S-TMSI,
    fullI-RNTI                     I-RNTI-Value,
    ...
}
-- TAG-PAGING-STOP
-- ASN1STOP
```

PagingRecord field descriptions accessType
It indicates whether Paging is originated due to the PDU sessions from the non-3GPP access.

7 Problems with Existing Solutions

There currently exist certain challenge(s). In particular, there is a need for systems and methods for early reporting of measurements made by the UE while in idle mode. In addition, there is a need for systems and methods that enable the network to request early measurements from a UE earlier than what is possible with existing solutions.

SUMMARY

Systems and methods related to early measurement reporting are disclosed. In some embodiments, a method performed by a wireless device in a cellular communications system comprises transmitting measurements with a first message to a network node. The first message is a request to resume a connection of the wireless device with a target cell, and the measurements are measurements performed by the wireless device while in a dormant state. By reporting early measurements with the first message that is a request to resume the connection with the target cell, the early measurements are reported to the network node much sooner that previously done, which in turn enables the network node to, e.g., enable carrier aggregation or dual-connectivity for the wireless device much sooner that previously possible.

In some embodiments, the method further comprises performing the measurements while in the dormant state, and storing the measurements.

In some embodiments, transmitting the measurements with the first message comprises transmitting a separate message that is multiplexed with the first message, wherein the separate message comprises the measurements. In some embodiments, the first message is a Radio Resource Control (RRC) Resume Request like message, and the separate message is a UEInformationResponse like message or a MeasurementReport like message. In some embodiments, the RRC Resume Request like message is an RRCResumeRequest1 message, an RRCResumeRequest message, or an RRCConnectionResumeRequest message. In some embodiments, the separate message is multiplexed with the first message in a radio frame.

In some embodiments, transmitting the measurements with the first message comprises transmitting the first message, wherein the first message comprises the measurements.

In some embodiments, the first message is an RRC Resume Request like message. In some embodiments, the RRC Resume Request like message is an RRCResumeRequest1 message, an RRCResumeRequest message, or an RRCConnectionResumeRequest message.

In some embodiments, the method further comprises, prior to transmitting the measurements, starting security for the target cell.

In some embodiments, the method further comprises, prior to transmitting the measurements, identifying that a target cell for resuming the connection supports early measurement reporting.

In some embodiments, the method further comprises, prior to transmitting the measurements, transmitting a random access preamble that indicates that the wireless device has early measurements available for reporting.

In some embodiments, the method further comprises receiving a random access response that comprises an indication that the wireless device is to report early measurements. In some embodiments, transmitting the measurements comprises transmitting the measurements with the first message upon receiving the random access response that comprises the indication that the wireless device is to report early measurements.

In some embodiments, the method further comprises deciding to perform early measurement reporting according to at least one criterion, wherein transmitting the measurements comprises transmitting the measurements upon deciding to perform early measurement reporting. In some embodiments, the at least one criterion comprises an indication comprised in a paging message. In some embodiments, the at least one criterion comprises an indication comprised in broadcasted system information.

Corresponding embodiments of a wireless device are also disclosed. In some embodiments, a wireless device for a cellular communications system is adapted to transmit measurements with a first message to a network node, wherein the first message is a request to resume a connection of the wireless device with a target cell, and the measurements are measurements performed by the wireless device while in a dormant state.

In some embodiments, the wireless device comprises one or more transmitters, one or more receivers, and processing circuitry associated with the one or more transmitters and the one or more receivers. The processing circuitry is configured to cause the wireless device to transmit the measurements with the first message to the network node.

Embodiments of a method performed by a base station are also disclosed. In some embodiments, a method performed by a base station comprises receiving, from a wireless device, measurements with a first message, wherein the first message is a request to resume a connection of the wireless device with a target cell, and the measurements are measurements performed by the wireless device while in a dormant state.

In some embodiments, the method further comprises performing one or more tasks based on the measurements.

In some embodiments, receiving the measurements comprises receiving a separate message that is multiplexed with the first message, wherein the separate message comprises the measurements. In some other embodiments, receiving the measurements comprises receiving the first message, wherein the first message comprises the measurements.

In some embodiments, the first message is an RRC Resume Request like message.

In some embodiments, the method further comprises, prior to receiving the measurements, transmitting an indication that the target cell supports early measurement reporting. In some embodiments, the indication is comprised in broadcasted system information. In some other embodiments, the indication is comprised in a paging message.

In some embodiments, the method further comprises, prior to receiving the measurements, identifying that the wireless device has available early measurements. In some embodiments, identifying that the wireless device has available early measurements comprises receiving a random access preamble that indicates that the wireless device has measurements available for reporting.

In some embodiments, the method further comprises transmitting an indication for the wireless device to include early measurements with the first message. In some embodiments, transmitting an indication for the wireless device to include early measurements with the first message comprises transmitting a random access response that indicates that the wireless device is to report early measurements.

Corresponding embodiments of a base station are also disclosed. In some embodiments, a base station for a cellular communications system is adapted to receive, from a wireless device, measurements with a first message, wherein the first message is a request to resume a connection of the wireless device with a target cell, and the measurements are measurements performed by the wireless device while in a dormant state.

In some embodiments, the base station comprises processing circuitry configured to cause the base station to receive, from the wireless device, the measurements with the first message.

Systems and methods are also disclosed herein that relate to early measurement request in association with a paging procedure. Embodiments of a method performed by a wireless device for early measurement request in association with a paging procedure are disclosed. In some embodiments, a method performed by a wireless device for early measurement request in association with a paging procedure comprises receiving a message in a cell on which the wireless device is camping, wherein the message comprises either: (a) a paging message or (b) a separate message that is multiplexed with the paging message. The method further comprises detecting that the message contains an indication that the wireless device is to report available early measurements during a resume-like procedure and reporting at least one early measurement in accordance with the indication.

In some embodiments, the method further comprises determining that at least one early measurement is available at the wireless device. Further, reporting the at least one early measurement comprises reporting the at least one early measurement upon determining that at least one early measurement is available at the wireless device.

In some embodiments, the message comprises the paging message.

In some other embodiments, the message comprises the separate message that is multiplexed with the paging message.

In some embodiments, the paging message comprises an RRC Paging message. In some embodiments, the separate message that is multiplexed with the paging message comprises a UEInformationRequest message.

In some embodiments, detecting that the message contains an indication that the wireless device is to report available early measurements comprises first decoding at least a portion of the message. In some embodiments, decoding at least a portion of the message comprises decoding the portion of the message using security keys provided by a last cell in which the wireless device was in a CONNECTED state. In some other embodiments, decoding at least a portion of the message comprises decoding the portion of the message using security keys provided by the cell on which the wireless device is camping. In some embodiments, the security keys are included in the received message.

In some embodiments, the resume-like procedure comprises a connection resume procedure, a connection setup procedure, a connection establishment procedure, or a connection re-establishment procedure.

In some embodiments, an early measurement comprises a measurement taken by the wireless device while the wireless device was in an RRC_IDLE state and/or an RRC_INACTIVE state.

Corresponding embodiments of a wireless device are also disclosed. In some embodiments, a wireless device for a cellular communications system is adapted to receive a message in a cell on which the wireless device is camping, wherein the message comprises either: (a) a paging message or (b) a separate message that is multiplexed with the paging message. The wireless device is further adapted to detect that the message contains an indication that the wireless device is to report available early measurements during a resume-like procedure and report at least one early measurement in accordance with the indication.

In some embodiments, the wireless device comprises one or more transmitters, one or more receivers, and processing circuitry associated with the one or more transmitters and the one or more receivers. The processing circuitry is configured to cause the wireless device to receive the message in the cell on which the wireless device is camping, detect that the message contains the indication that the wireless device is to report available early measurements during a resume-like procedure, and report the at least one early measurement in accordance with the indication.

Embodiments of a method performed by a network node for early measurement request in association with a paging procedure as also disclosed herein. In some embodiments, a method, performed by a network node, for early measurement request in association with a paging procedure comprises sending a message within a cell on which a wireless device is camping. The message comprises either: (a) a paging message or (b) a separate message that is multiplexed with the paging message, and the message contains an indication that the wireless device is to report available early measurements during a resume-like procedure. The method further comprises receiving, from the wireless device, at least one early measurement in response to the sent message.

In some embodiments, the message comprises the paging message.

In some embodiments, the message comprises the separate message that is multiplexed with the paging message. In some embodiments, the separate message comprises a UEInformationRequest message.

In some embodiments, the paging message comprises an RRC Paging message.

In some embodiments, the message contains security keys to be used by the wireless device to decode at least a portion of the message.

In some embodiments, the resume-like procedure comprises a connection resume procedure, a connection setup procedure, a connection establishment procedure, or a connection re-establishment procedure.

In some embodiments, an early measurement comprises a measurement taken by the wireless device while the wireless device was in the RRC_IDLE state and/or the RRC_INACTIVE state.

In some embodiments, the network node comprises a Base Station (BS), an Access Point (AP), an enhanced or evolved Node B (eNB), a New Radio (NR) BS (gNB), a Remote Radio Unit (RRU), or a Remote Radio Head (RRH).

Corresponding embodiments of a network node are also disclosed. In some embodiments, a network node for a cellular communications system is adapted to send a message within a cell on which a wireless device is camping, wherein the message comprises either: (a) a paging message or (b) a separate message that is multiplexed with the paging message, and the message contains an indication that the wireless device is to report available early measurements during a resume-like procedure. The network node is further adapted to receive, from the wireless device, at least one early measurement in response to the sent message.

In some embodiments, the network node comprises processing circuitry configured to cause the network node to send the message within the cell on which the wireless device is camping and receive, from the wireless device, the at least one early measurement in response to the sent message.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 29 through 32 are flowcharts illustrating example methods implemented in a communication system, such as that of FIG. 27, in accordance with some embodiments of the present disclosure.

DETAILED DESCRIPTION

Figure 1:
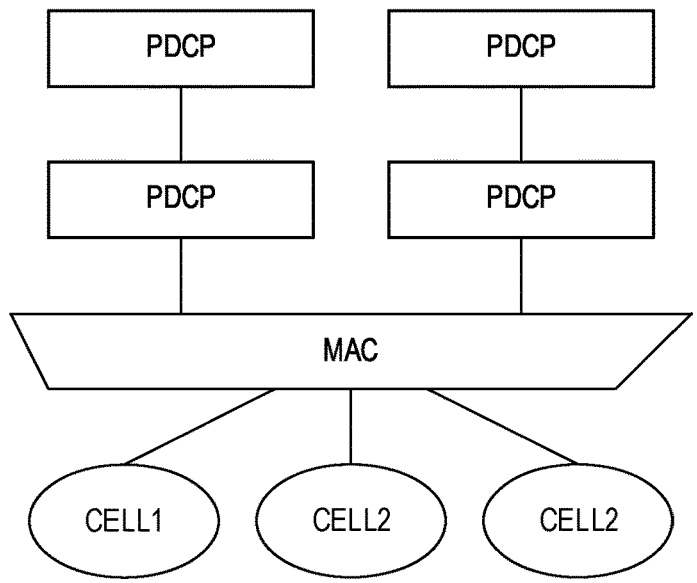
FIG. 1 is an illustration of Carrier Aggregation (CA) at the Medium Access Control (MAC) level.
Figure 2:
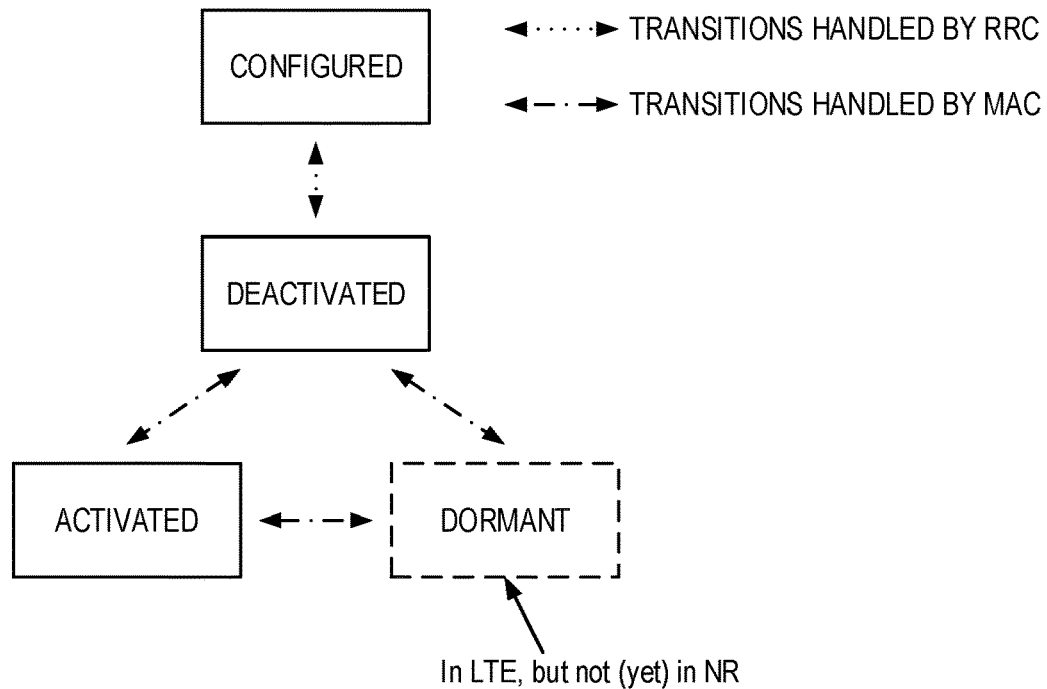
FIG. 2 illustrates transitions between three User Equipment (UE) states.
Figure 3:
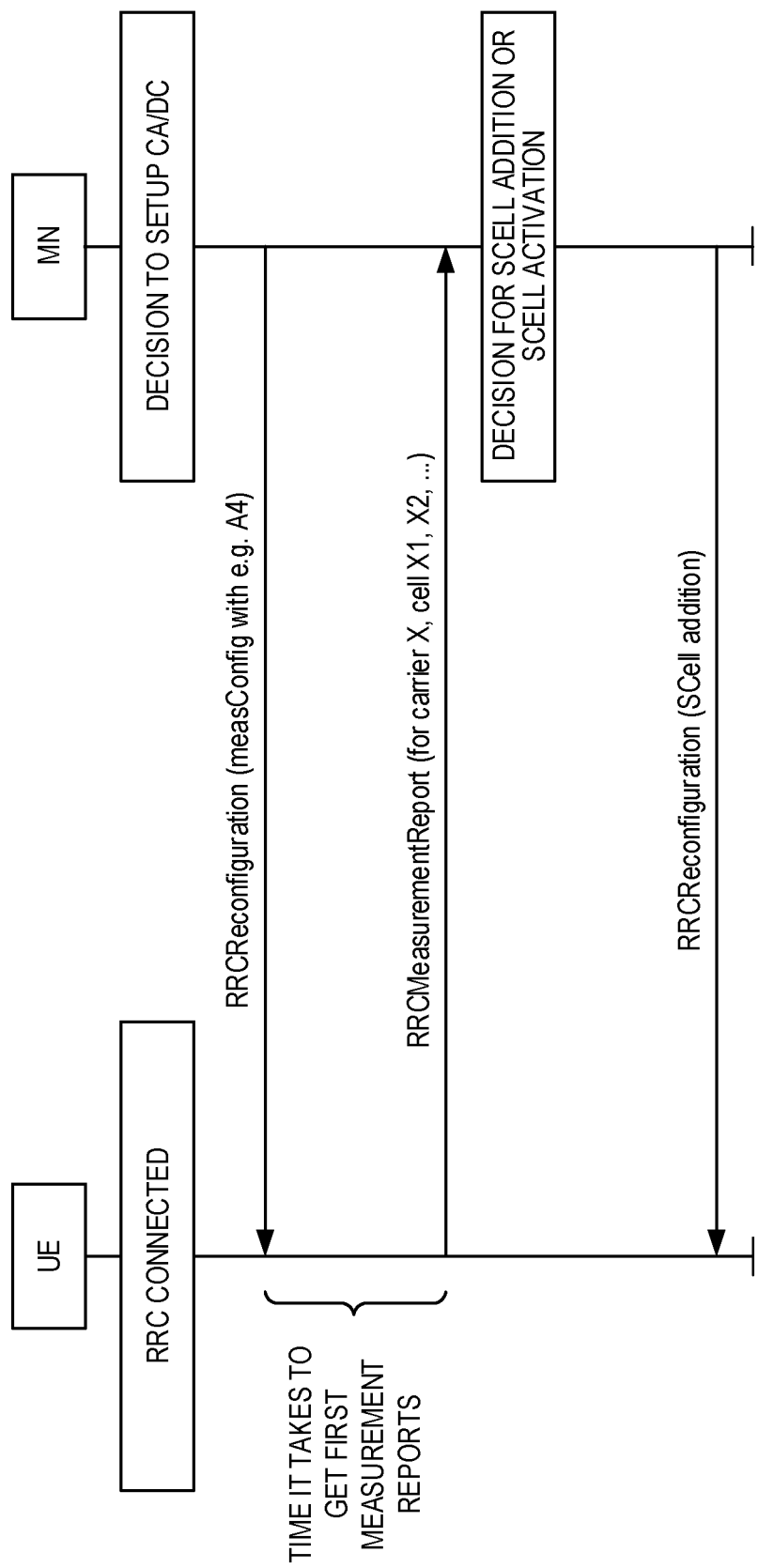
FIG. 3 illustrates a process in which the network decides to setup CA or Dual Connectivity (DC) for a UE.
Figure 4:
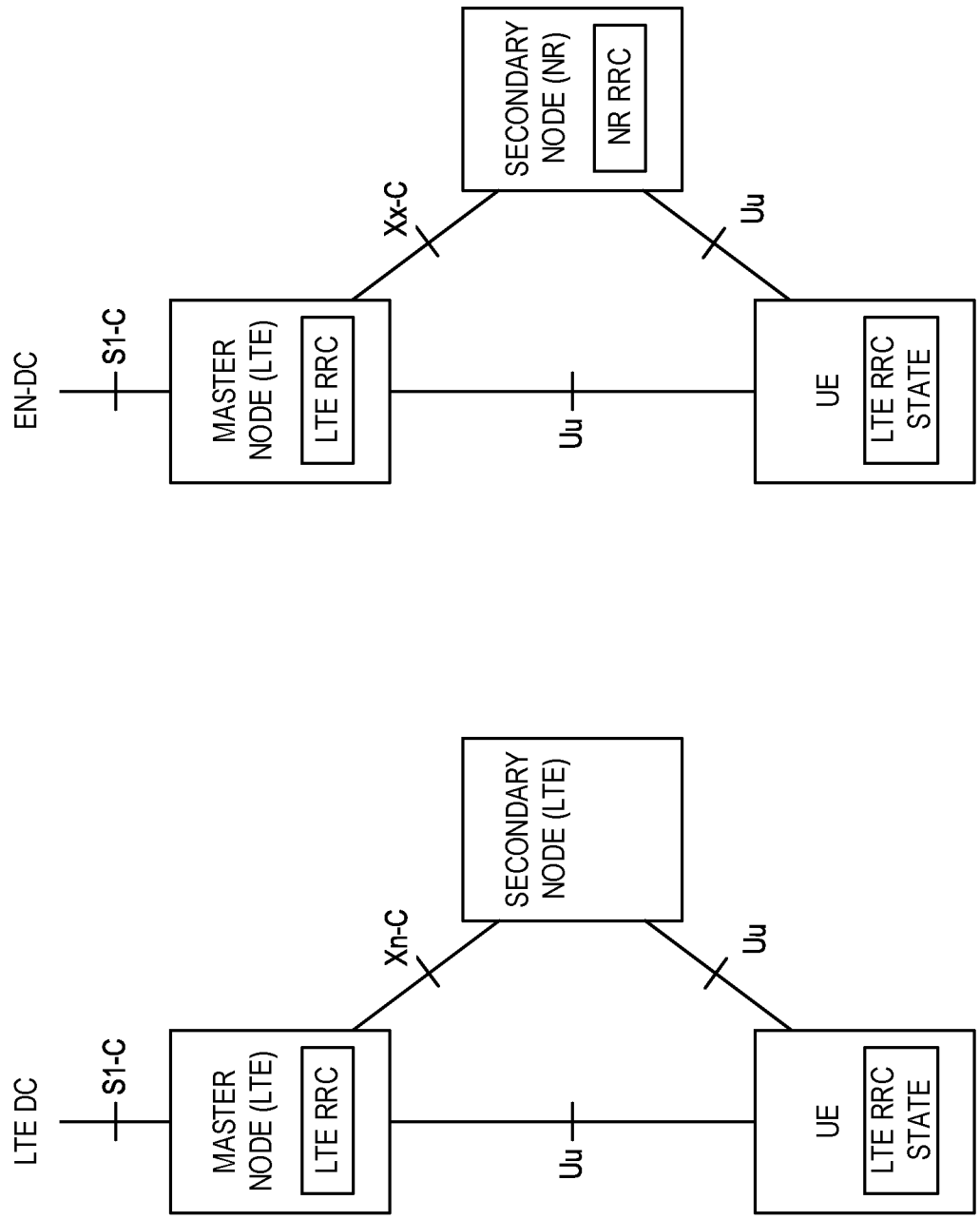
FIG. 4 is a schematic showing what the control plane architecture looks like for Long Term Evolution (LTE) DC and Evolved Universal Terrestrial Radio Access (E-UTRA)-New Radio (NR) DC (EN-DC)
Figure 5:
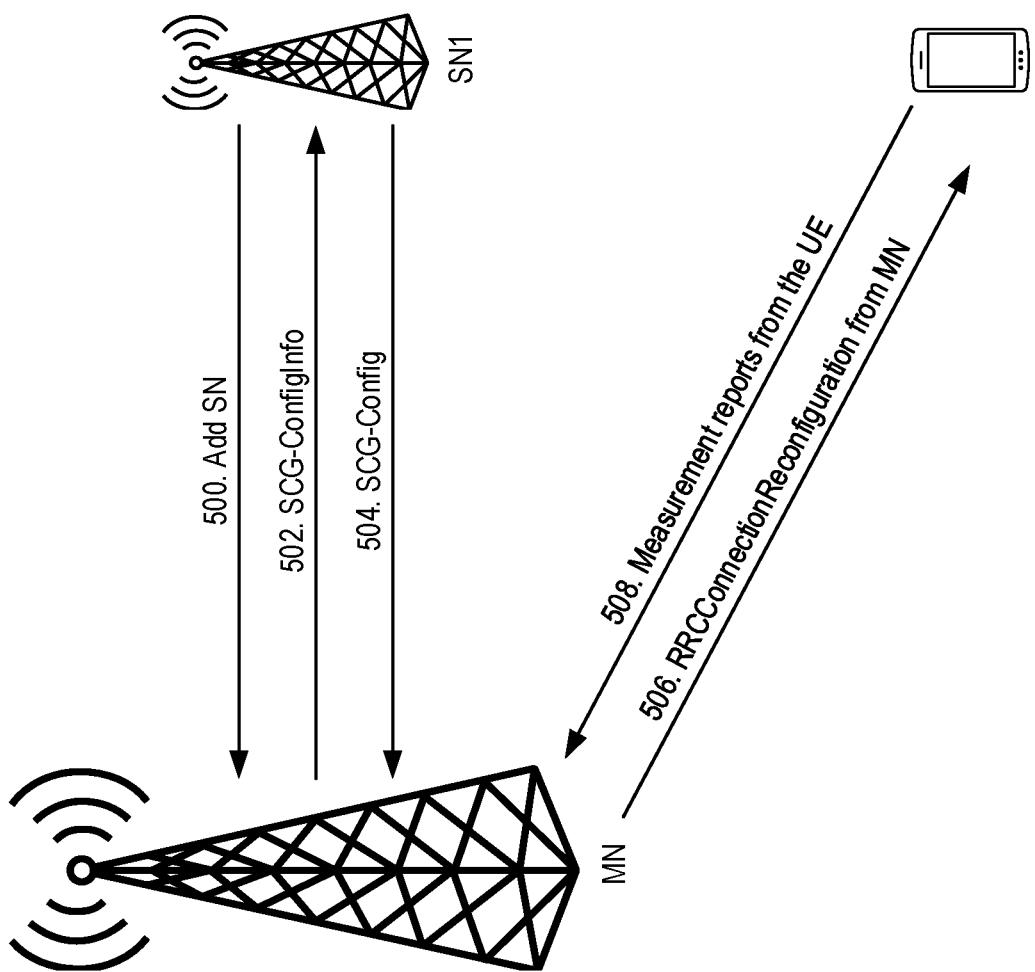
FIG. 5 illustrates a conventional LTE-DC configuration.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" or "wireless terminal" is any type of device that has access to (i.e., is served by) a cellular communications network by wirelessly transmitting and/or receiving signals to a radio access node(s). Some examples of a wireless device include, but are not limited to, a User Equipment (UE) in a 3GPP network (e.g., an LTE network or a NR network) and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). In particular, there is a need for systems and methods for early reporting of measurements made by the UE while in idle mode. The problem addressed in the present disclosure is how early these idle measurements in the Release 15 baseline solution are provided to the network, so the network may quickly setup Carrier Aggregation (CA) and/or Dual Connectivity (DC) (which may include Evolved Universal Terrestrial Radio Access (E-UTRA) NR DC (EN-DC)).

For a UE in RRC_IDLE without context in LTE or RRC_IDLE NR, the earliest measurements to be obtained in RRC_CONNECTED (i.e., without the Release 15 feature like solution for early measurements performed in idle) could be obtained by providing the UE with an RRCReconfiguration with a measurement configuration (e.g., measConfig with A4 events (neighbor cell becomes better than absolute threshold) configured for carriers that are candidates for CA) even before security is setup (e.g., multiplexed with the RRCSetup). At that point the UE enters RRC_CONNECTED and starts to perform connected mode measurements. Then, the UE transmits the RRCSetupComplete and the network initiates security mode command. The UE can only then get the first RRCReconfiguration message after security has been activated so Signaling Radio Bearers (SRBs)/Data Radio Bearers (DRBs) may be added. At any point in time after security is activated, the first measurements (e.g., triggered by A4 event) may be transmitted. However, as the network is not aware of UE capabilities related to if the UE supports certain carriers or not, in practice it may take some time until the network configures the UE with measurements during the transition from RRC_IDLE to RRC_CONNECTED. Hence, the feature standardized in Release 15 for idle measurements may indeed provide measurements to the network earlier than the first measurements triggered by the measConfig provided in RRC_CONNECTED.

Observation-1: Release 15 solution from LTE may provide early measurements when the UE transitions from RRC_IDLE to RRC_CONNECTED.

For a UE in RRC_IDLE with stored Access Stratum (AS) context in LTE-Evolved Packet Core (EPC) or RRC_INACTIVE NR or enhanced LTE (eLTE) (i.e., LTE connected to 5G Core (5GC), where RRC_INACTIVE state is also supported), the earliest measurements to be obtained in RRC_CONNECTED (i.e., without the Release 15 feature like solution for early measurements performed in idle) could be configured by providing the UE with a measConfig with A4 events configured for carriers that are candidates for CA in the RRCResume message, so at that point the UE starts to perform measurements upon entering RRC_CONNECTED, as shown below:

```
RRCResume-IEs ::=              SEQUENCE {
    radioBearerConfig              RadioBearerConfig
        OPTIONAL, -- Need M
    masterCellGroup                OCTET STRING (CONTAINING
                                       CellGroupConfig)
        OPTIONAL, -- Need M
    measConfig                     MeasConfig
```

-continued

```
  OPTIONAL, -- Need M
    fullConfig          ENUMERATED {true}
  OPTIONAL, -- Need N
```

Figure 11:
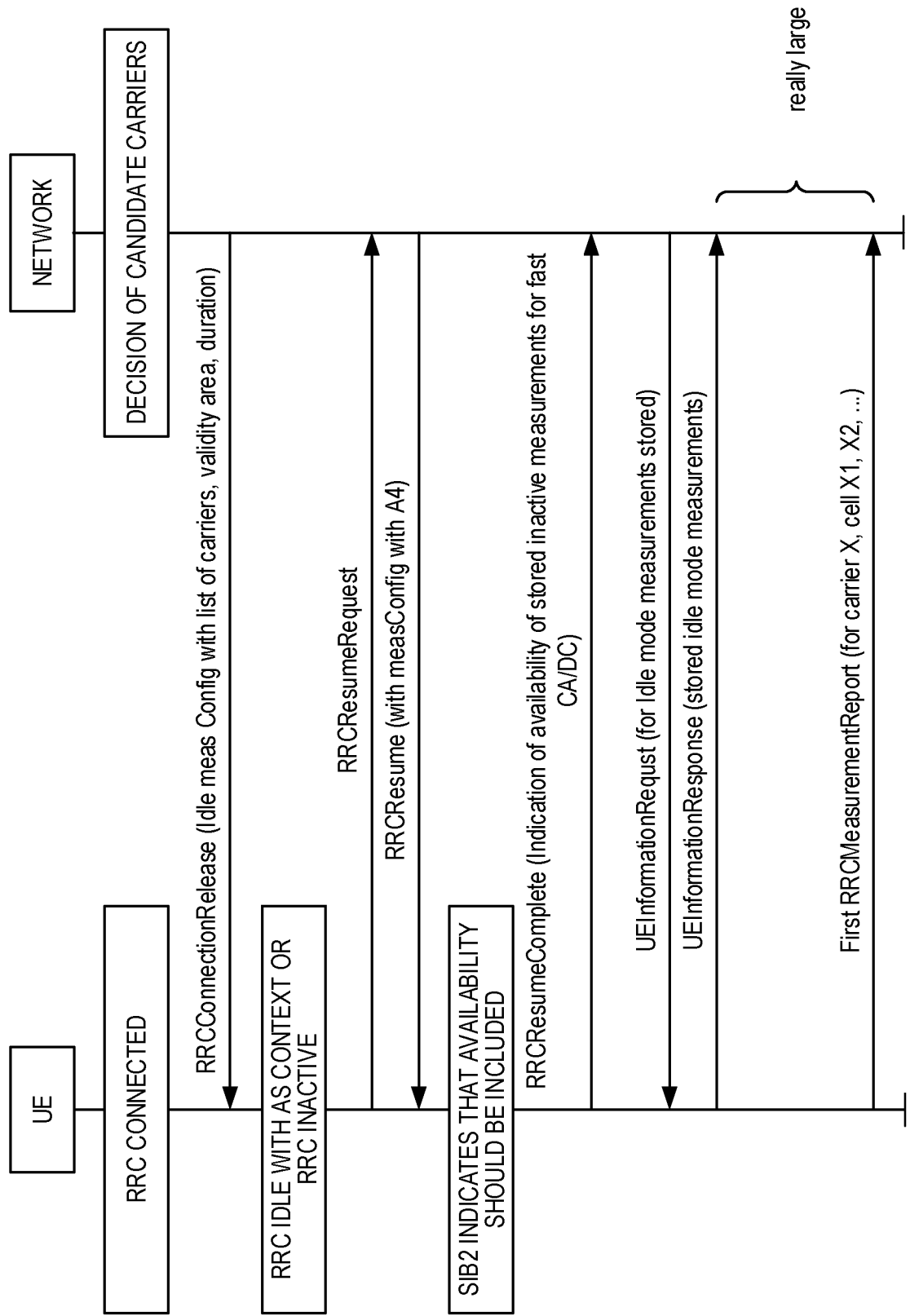
FIG. 11 illustrates that there is a large delay required for reporting early measurements when using the conventional Radio Resource Control (RRC) resume procedure.

Then, after few hundreds of milliseconds, the first measurement report may be triggered and transmitted. If instead the existing solution of Release 15 is implemented, the UE would be configured with measurements to be performed in idle for certain carrier frequencies and, upon indicating in RRCResumeComplete that these are available the network may initiate the procedure to request these measurements. Though it is likely that the idle mode measurements will be received earlier than measurements performed according to configurations received in the resume message, there is still a need to wait for the resume complete message to be transmitted, followed by the UE information request and response, before the network gets the idle mode measurements (see FIG. 11).

In addition to that, an RRCReconfiguration message has to be sent to configure the UE with the Master Cell Group (MCG) Secondary Cells (SCells) or/and Secondary Cell Group (SCG) cells based on the received measurements.

Certain aspects of the present disclosure and their embodiments may provide solutions to the aforementioned or other challenges. Embodiments of the present disclosure provide a method at a wireless terminal or UE for measurement reporting during a transition from a dormant state (e.g., RRC_INACTIVE or RRC_IDLE with or without context information) to a connected state (e.g., RRC_CONNECTED) to assist the network to perform a UE reconfiguration (e.g., handovers; reconfiguration with sync; SCG addition, removal, or modification; SCell addition, removal, or modification; etc.).

In some embodiments, the method comprises one or more of the following actions at the UE:
(Optional) Receiving and applying configurations for measurements in a dormant state (e.g., idle mode measurements) from at least one of:
  a first cell (source cell) upon entering the dormant state in a Radio Resource Control (RRC) message (e.g., RRCRelease or RRCConnectionRelease), and
  a second cell at which the UE is currently camping in broadcasted signaling (e.g., System Information Block 5 (SIB5));
Performing and storing dormant state measurements (e.g., idle mode measurements) according to the received configurations for measurements in the dormant state (e.g., the received idle mode measurement configurations);
(Optional) Identifying that a third cell (the target cell) in the network that the UE is camping to and to which the UE is trying to resume supports early measurements performed in a dormant state (e.g., idle and/or inactive state) to be reported as described in the method;
  Note: The first, second, and third cells may be the same cell, two different cells (in any combination), or three different cells.
(Optional) Deciding to perform early measurement reporting according to at least one criterion, e.g. an indication broadcasted by the network in system information or paging;
(Optional) Selecting random access parameters of the target cell, such as a random access resource (e.g., a specific preamble from a specific preamble group), where the selection indicates that the UE has available measurements performed in dormant state (e.g., RRC_IDLE or RRC_INACTIVE); and, after selecting, transmitting a random access preamble in accordance with the selected random access parameters (e.g., transmitting a selected random access preamble in the selected random access resource);
(Optional) Receiving an indication from the network, for example with the Random Access Response (RAR) message, that the UE is to transmit early measurements performed in the dormant state (e.g., idle/inactive state), if these are available;
  This indication may be implicit (e.g., a large grant) or explicit (e.g., some payload information in the RAR or a Medium Access Control (MAC) Control Element (CE)).
Transmitting, to the network, measurements performed in the dormant state (e.g., RRC_IDLE with AS Context, RRC_IDLE or RRC_INACTIVE), if available, in an RRC Resume Request like message (e.g., RRCResumeRequest or RRCConnectionResumeRequest) or in a separate message multiplexed (e.g., in the same radio frame) with the RRC Resume Request like message or in a separate message in a radio frame different from the radio frame used to send the RRC Resume Request like message; and
(Optional) Receiving a reconfiguration from the network in an RRC Resume Request like message (e.g., RRCResume, RRCConnectionResume, RRCReconfiguration, or RRCConnectionReconfiguration) to add, modify, remove, change state (activate/deactivate/etc.) SCGs, SCell(s), perform handovers, or any other action that may be assisted by early measurements, and applying the reconfiguration(s).

Embodiments of the present disclosure also provide a method at target network node associated with a target cell where a wireless terminal or UE is trying to resume. In some embodiments, the method comprises one or more of the following actions at the target network node:
(Optional) Indicating that a target cell supports early measurements performed in a dormant state (e.g., idle and/or inactive state) to be reported as described in the method, e.g. by broadcasting an indication in the system information or including the indication in the paging message;
(Optional) Identifying that a UE is trying to resume a connection at the target cell (or network node associated with the target cell) and that the UE has available measurements performed in a dormant state (e.g., RRC_IDLE or RRC_INACTIVE), e.g. by detecting given random access parameters such as preamble, resource, etc.;
(Optional) Indicating to the UE trying to resume the connection that the UE is to include early measurements performed in the dormant state (e.g., idle/inactive state), if these are available; the network also provides enough resources for the UE, e.g. by providing a large enough uplink grant for the message and the early measurements;
Receiving, from the UE, measurements performed by the UE in the dormant state (e.g., RRC_IDLE with AS Context, RRC_IDLE, or RRC_INACTIVE) in an RRC Resume Request like message (e.g., RRCResumeRequest or RRCConnectionResumeRequest) or in a separate message multiplexed (e.g., in the same radio frame) with the RRC Resume Request like message or in a separate message in a radio frame different from the radio frame used to send the RRC Resume Request like message;

Upon receiving the early measurements from the UE, performing one or more tasks using the early measurements. The one or more tasks may include, e.g., deciding to keep the existing resumed UE configuration; and/or add, remove, or modify SCG configurations; and/or add, remove, or modify SCell configurations of the MCG and/or SCG; and/or activate or deactivate the state of configured MCG/SCG SCells; and (Optional) Sending a reconfiguration to the UE in an RRC Resume Request like message (e.g., RRCResume, RRCConnectionResume, RRCReconfiguration, or RRCConnectionReconfiguration) to add, modify, remove, change state (activate/deactivate/etc.) SCGs, SCell(s), perform handovers, or any other action that may be assisted by early measurements).

In some embodiments, early measurements performed in a dormant state (e.g., RRC_IDLE or RRC_INACTIVE state) are transmitted by the UE with the RRC Resume Request like message. Embodiments are also disclosed herein that solve related problems such as, e.g., how the network is aware that the UE may have measurements available, etc.

Certain embodiments may provide one or more of the following technical advantage(s). For example, embodiments of the present disclosure provide an advantage that the UE may report measurements performed in a dormant state (e.g., RRC_IDLE or RRC_INACTIVE) at the same time that the UE sends an RRC Resume Request like message (either multiplexed with the RRC Resume Request like message, included in the RRC Resume Request like message, or after (e.g., immediately after) transmitting the RRC Resume Request like message (e.g., in a next radio frame)) so that the network can use the received early measurements to, e.g., decide to setup/remove/modify SCGs, setup/remove/modify SCells for MCGs and/or SCGs, or activate or deactivate SCells, and communicate the result of this decision in the RRC Resume Request like message (e.g., RRCResume or RRCConnectionResume).

Compared to the baseline solution standardized in LTE Release 15, these measurements may be available at least two Round Trip Times (RTTs) earlier (as in the Release 15 solution the network gets the measurement results only after sending the Resume message, receiving the Resume Complete, sending the UEInformationRequest, and receiving the measurements in the UEInformationResponse). Also, at least an extra ½ RTT has to elapse before the network can decide the most appropriate reconfiguration based on the received measurements and the UE receives the reconfiguration via an RRC Reconfiguration like message (e.g., RRCReconfiguration, RRCConnectionReconfiguration, etc.), Thus, not only is the latency to setup proper CA/DC configuration reduced, but the signaling overhead/load in the network is also reduced, as there will be no need to send the RRC Reconfiguration like message (and the corresponding RRC Reconfiguration Complete like message from the UE in response to that).

It should be noted that the 2.5 RTTs latency reduction in setting up the UE with the proper CA/DC configuration is a lower bound because tens of milliseconds may elapse, depending on network load and radio conditions, between the sending of the resume request and the reception of the resume message, the sending of the resume complete and the sending of the UE information request, sending the UE information response and the reception of the RRC reconfiguration. So, in reality, the methods proposed by the present disclosure may end up making it possible to configure the UE with the proper CA/DC configuration 100s of milliseconds earlier as compared to the LTE Release 15 solution.

Systems and methods are disclosed herein for reporting of early measurements performed by a wireless device while in a dormant state in an efficient manner.

Figure 12:
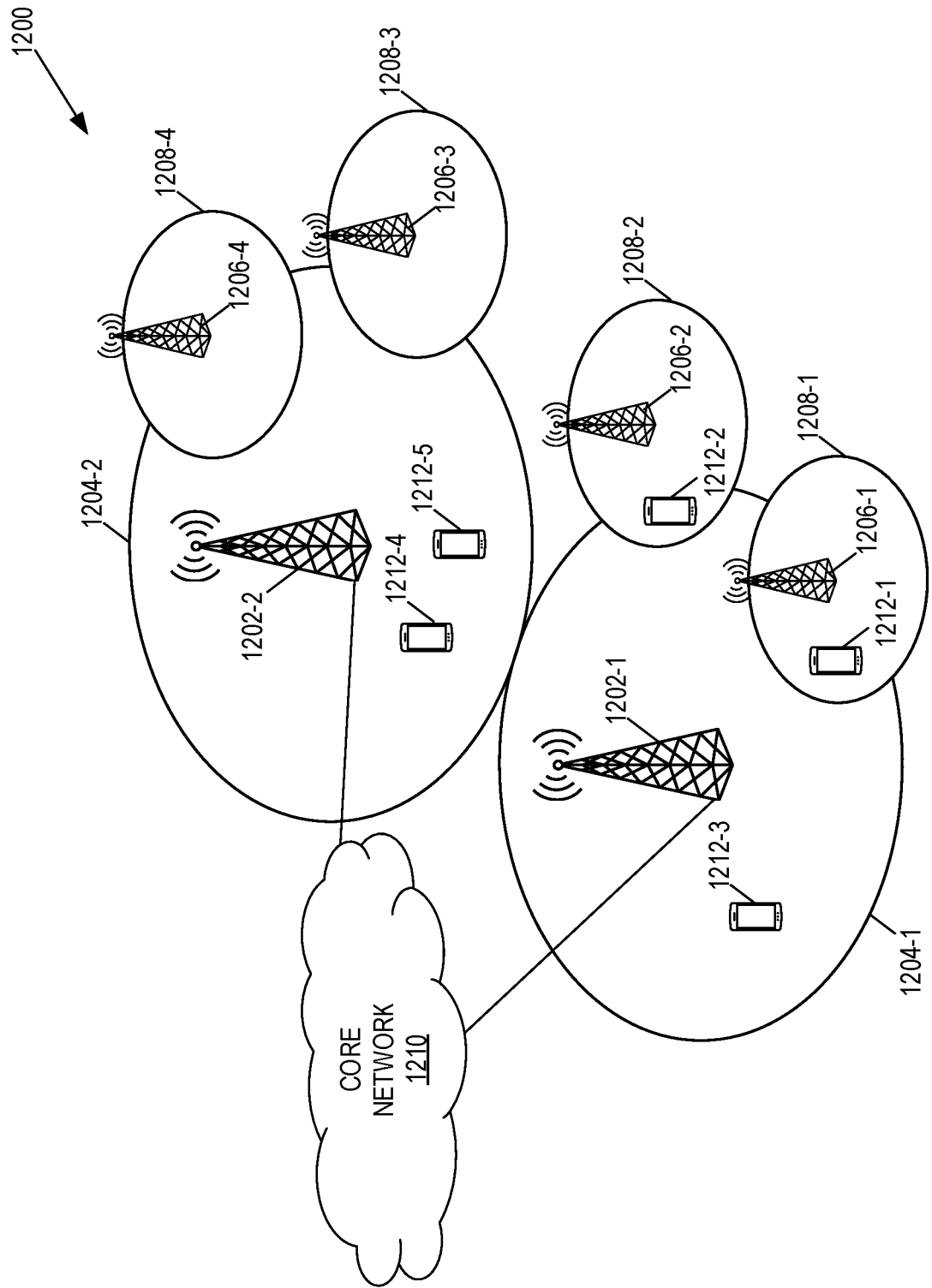
FIG. 12 illustrates one example of a cellular communications network in which embodiments of the present disclosure may be implemented.

In this regard, FIG. 12 illustrates one example of a cellular communications network 1200 in which embodiments of the present disclosure may be implemented. In the embodiments described herein, the cellular communications network 1200 is a 5G NR network, an LTE network, or a network providing interworking between LTE and NR, as described above. In this example, the cellular communications network 1200 includes base stations 1202-1 and 1202-2, which in LTE are referred to as eNBs and in 5G NR are referred to as gNBs, controlling corresponding macro cells 1204-1 and 1204-2. The base stations 1202-1 and 1202-2 are generally referred to herein collectively as base stations 1202 and individually as base station 1202. Likewise, the macro cells 1204-1 and 1204-2 are generally referred to herein collectively as macro cells 1204 and individually as macro cell 1204. The cellular communications network 1200 may also include a number of low power nodes 1206-1 through 1206-4 controlling corresponding small cells 1208-1 through 1208-4. The low power nodes 1206-1 through 1206-4 can be small base stations (such as pico or femto base stations) or Remote Radio Heads (RRHs), or the like. Notably, while not illustrated, one or more of the small cells 1208-1 through 1208-4 may alternatively be provided by the base stations 1202. The low power nodes 1206-1 through 1206-4 are generally referred to herein collectively as low power nodes 1206 and individually as low power node 1206. Likewise, the small cells 1208-1 through 1208-4 are generally referred to herein collectively as small cells 1208 and individually as small cell 1208. The base stations 1202 (and optionally the low power nodes 1206) are connected to a core network(s) 1210. For example, the core network 1210 may be a 5GC or an EPC. In some other embodiments, the core network(s) 1210 may include both a 5GC and an EPC, in which case some base stations 1202 (e.g., eNBs) are connected to the EPC and other base stations 1202 (e.g., gNBs or Next Generation eNBs (ng-eNBs)) are connected to the 5GC.

The base stations 1202 and the low power nodes 1206 provide service to wireless devices 1212-1 through 1212-5 in the corresponding cells 1204 and 1208. The wireless devices 1212-1 through 1212-5 are generally referred to herein collectively as wireless devices 1212 and individually as wireless device 1212. The wireless devices 1212 are also sometimes referred to herein as UEs.

Now, a discussion of some example embodiments of the present disclosure will be provided.

Some initial disclaimers, e.g., on configuration and exact information to be reported will now be provided. In the present disclosure, the measurement configuration provided to the UE in RRC_IDLE has not been disclosed in detail and is not part of the core of the present disclosure. One may assume, as an example, at least the existing solution in LTE Release 15 where the UE is provided with a list of carriers, either through broadcasted or dedicated signaling, whose measurements to be performed may also be indicated, i.e. Reference Signal Received Power (RSRP) and/or Reference Signal Received Quality (RSRQ). Other configurations may also be present, e.g., validity area, timers, list of cells, etc. Also notice that the fundamental aspect is that, upon resume, the UE has idle/inactive measurements available that may be provided to the network to speed up the setup of CA and/or any form of dual/multi-radio connectivity.

An example of a possible measurement configuration for these early measurements is provided below from Technical Speciation (TS) 36.331 V15.4.0:

| MeasIdleConfig information element |
|---|
| ```
-- ASN1START
MeasIdleConfigSIB-r15 ::= SEQUENCE {
    measIdleCarrierListEUTRA-r15      EUTRA-CarrierList-r15,
    ...
}
MeasIdleConfigDedicated-r15 ::= SEQUENCE {
    measIdleCarrierListEUTRA-r15      EUTRA-CarrierList-r15     OPTIONAL,
    -- Need OR
    measIdleDuration-r15              ENUMERATED {sec10, sec30, sec60, sec120,
                                       sec180, sec240, sec300, spare},
    ...
}
EUTRA-CarrierList-r15 ::= SEQUENCE (SIZE (1..maxFreqIdle-r15)) OF MeasIdleCarrierEUTRA-r15
MeasIdleCarrierEUTRA-r15::=           SEQUENCE {
    carrierFreq-r15                   ARFCN-ValueEUTRA-r9,
    allowedMeasBandwidth-r15          AllowedMeasBandwidth,
    validityArea-r15                  CellList-r15              OPTIONAL, -- Need OR
    measCellList-r15                  CellList-r15              OPTIONAL, -- Need OR
    reportQuantities                  ENUMERATED {rsrp, rsrq, both},
    qualityThreshold-r15              SEQUENCE {
        idleRSRP-Threshold-r15            RSRP-Range            OPTIONAL,
        -- Need OR
        idleRSRQ-Threshold-r15            RSRQ-Range-r13        OPTIONAL-- Need OR
    }                                                           OPTIONAL, -- Need OR
    ...
}
CellList-r15 ::=    SEQUENCE (SIZE (1.. maxCellMeasIdle-r15)) OF PhysCellId Range
-- ASN1STOP
``` |

In the present disclosure, the exact measurements to be reported to the UE during the transition to RRC_CONNECTED have not been disclosed in detail and are not part of the core of the present disclosure. One may assume, simply as an example, at least the existing solution in LTE Release 15, as shown below:

```
UEInformationResponse-v1530-IEs ::= SEQUENCE {
    measResultListIdle-r15            MeasResultListIdle-r15      OPTIONAL,
    flightPathInfoReport-r15          FlightPathInfoReport-r15    OPTIONAL,
    nonCriticalExtension              SEQUENCE { }                OPTIONAL
}
MeasResultListIdle-r15   ::= SEQUENCE (SIZE (1..maxIdleMeasCarriers-r15)) OF MeasResultIdle-r15
MeasResultIdle-r15   ::= SEQUENCE {
    measResultServingCell-r15             SEQUENCE {
        rsrpResult-r15                    RSRP-Range,
        rsrqResult-r15                    RSRQ-Range-r13
    },
    measResultNeighCells-r15              CHOICE {
        measResultIdleListEUTRA-r15           MeasResultIdleListEUTRA-r15,
        ...
    }                                                             OPTIONAL,
    ...
}
MeasResultIdleListEUTRA-r15 ::=       SEQUENCE (SIZE (1..maxCellMeasIdle-r15)) OF MeasResultIdleEUTRA-r15
MeasResultIdleEUTRA-r15 ::=   SEQUENCE {
    carrierFreq-r15                   ARFCN-ValueEUTRA-r9,
    physCellId-r15                    PhysCellId,
    measResult-r15                    SEQUENCE {
        rsrpResult-r15                    RSRP-Range,
        rsrqResult-r15                    RSRQ-Range-r13
    },
    ...
}
```

The present disclosure comprises a method at a wireless terminal (e.g., a UE) for measurement reporting during a transition from a dormant state to connected state. In the context of the present disclosure, one should interpret dormant state as a protocol state (like an RRC state) where the UE performs actions optimized for power savings, such as:
RRC_IDLE without stored AS context;
RRC_IDLE with stored AS context; or
RRC_INACTIVE.

As the method comprises the reporting of measurements performed in a dormant state when the UE is trying to resume, it is important to mention that the method covers the case where the UE is suspended in one Radio Access Technology (RAT) (e.g., RRC_CONNECTED to RRC_IDLE or RRC_INACTIVE) and tries to resume in another RAT (e.g., RRC_INACTIVE or RRC_IDLE to RRC_CONNECTED), such as, e.g., in the following cases:
UE is suspended in NR and resumes in LTE;
UE is suspended in LTE and resumes in NR;
UE is suspended in NR and resumes in NR;
UE is suspended in LTE and resumes in LTE; or
in more general terms, UE is suspended in RAT-1 and resumes in RAT-2, where RAT-1 and RAT-2 may be the same or different RATs.

Figure 13:
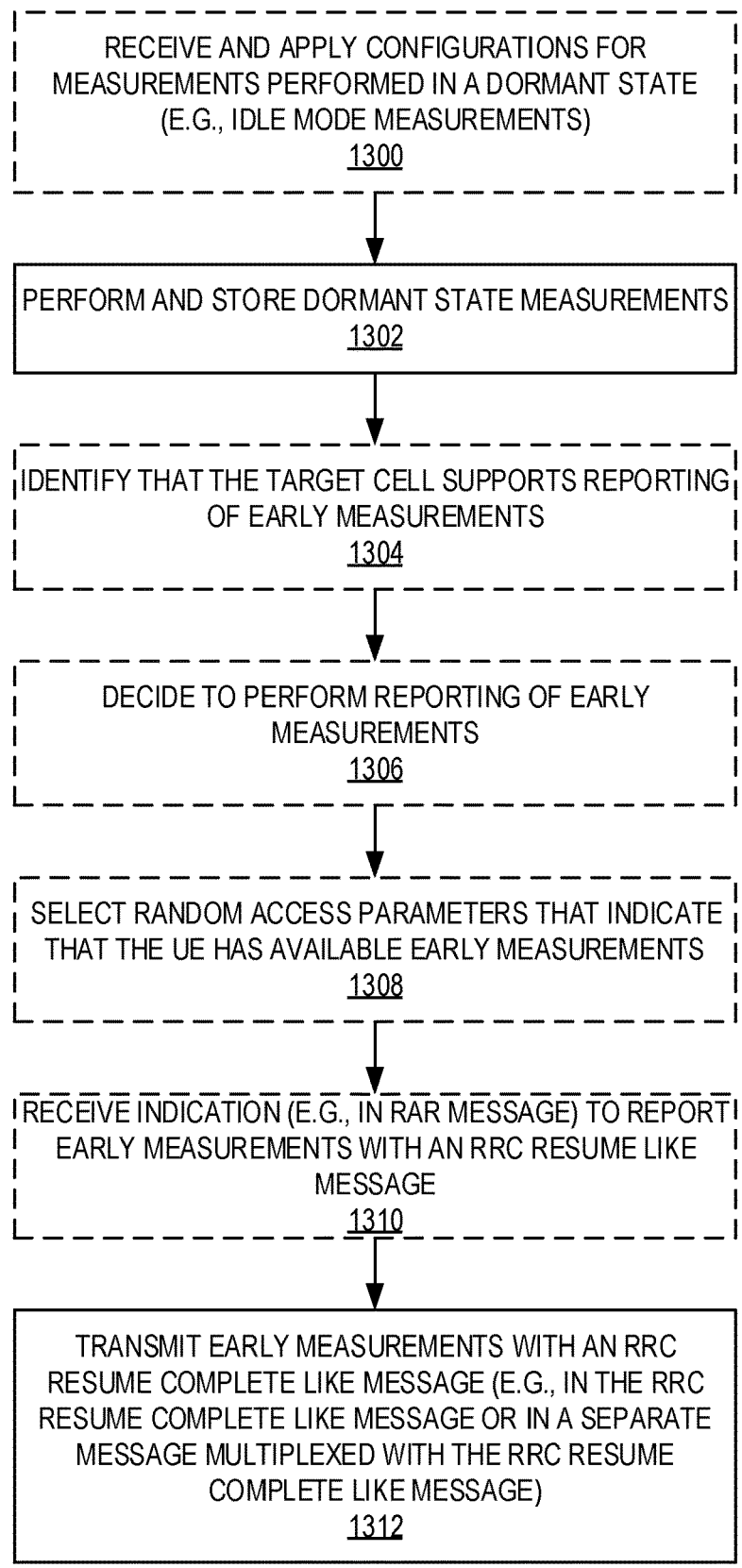
FIG. 13 is a flow chart that illustrates the operation of a wireless device (e.g., a UE) to provide early measurement reporting with a message (e.g., RRC Resume Request like message) that requests resuming of a connection of the wireless device in a target cell, in accordance with some embodiments of the present disclosure.

In the present disclosure, embodiments of a method at a wireless terminal (e.g., UE) for measurement reporting during a transition from a dormant state (e.g., RRC_INACTIVE) to RRC_CONNECTED to assist the network to perform a UE reconfiguration (e.g., handovers, reconfiguration with sync, SCG addition/removal/modification, SCell addition/removal/modification, etc.) are provided. As illustrated in FIG. 13, in some embodiments, the method comprises the following steps. Note that while these actions are referred to as "steps", these actions may be performed in any suitable order and are not limited to the order in which they are presented here, unless otherwise stated or required. Further, optional steps are represented in FIG. 13 by dashed lines.

Step 1300 (Optional): The UE receives and applies configurations for measurements performed in a dormant state (e.g., idle mode measurements), where the configurations are from at least one of:
a first cell (source cell) upon entering dormant state in an RRC message (e.g., RRCRelease or RRCConnectionRelease), and
a second cell at which the UE is currently camping in broadcasted signaling (e.g., SIB5).

Step 1302: The UE performs and stores dormant state measurements (e.g., idle mode measurements) according to the received configurations for measurements in the dormant state (e.g., the received idle mode measurement configurations).

Step 1304 (Optional): The UE identifies that a third cell (the target cell) in the network that the UE is camping on and to which the UE is trying to resume supports reporting of early measurements performed in dormant state(s) (e.g., idle and/or inactive state) (e.g., supports early measurement reporting as described in the method). Note that the first, second, and third cells may be the same cell, two different cells (in any combination), or three different cells.

Step 1306 (Optional): The UE decides to perform early measurement reporting according to at least one criterion, e.g. an indication broadcasted by the network in system information or paging.

In a first variant, the decision of step 1306 is performed by the UE when the UE reads a specific field(s) in system information, for example, in SIB1 (e.g., or SIB2, in LTE). It may be the case that different solutions are defined for early measurement upon transition to RRC_CONNECTED depending on whether the UE is resuming from RRC_INACTIVE or from RRC_IDLE. For example, one possibility is to define that the same solutions as in LTE Release 15 are performed (e.g., required by standards) for NR when the UE comes from RRC_IDLE; while the solution disclosed in the method of the present disclosure is performed (e.g., required by standard) for NR when the UE comes from RRC_INACTIVE. That could make sense as the security solution in NR for RRC_INACTIVE UEs has had enhancements (security is activated before receiving RRCResume, RRCResume is encrypted, etc.). It may be the case that different solutions are defined for early measurement upon transition to RRC_CONNECTED depending on network implementation, e.g. some nodes may implement one solution and other nodes may implement another solution. The network node would then indicate which solution to use for early measurement reporting. In that case, some prioritization may be defined in case of both solutions being supported by the network (e.g., if the UE supports both solutions, the solution disclosed in this method is used by the UE).

A possible implementation in LTE is shown as follows:

| SystemInformationBlockType2 information element |
| --- |
| -- ASN1START |
| SystemInformationBlockType2 ::=    SEQUENCE { |
| ... |
|    idleModeMeasurements-r15    ENUMERATED {true} |
|    OPTIONAL,   -- Need OR |
|    idleModeMeasurementsResumeRequest-r16    ENUMERATED {true}    OPTIONAL,   -- Need OR |
|    idleModeMeasurementsResumeRequest-r16    ENUMERATED {true}    OPTIONAL,   -- Need OR |
| ... |
| } |

As LTE connected to 5GC also supports the RRC_INACTIVE state, it is possible that separate indications are introduced for idle mode measurement reporting in Resume Request from suspended RRC connection in RRC_IDLE and from RRC_INACTIVE. Alternatively, the same indication is used for both cases.

A possible implementation in NR is shown as follows:

| SIB1 message |
| --- |
| -- ASN1START |
| -- TAG-SIB1-START |
| SIB1 ::=    SEQUENCE { |
| ... |
|    idleModeMeasurements-r16    ENUMERATED {true}    OPTIONAL,   -- Need OR |
|    inactiveModeMeasurementsResumeRequest-r16    ENUMERATED {true}    OPTIONAL,   -- Need OR |
| ... |
| } |

In a second variant, the decision of step 1306 is performed by the UE by receiving, from the network, a list of cells when the UE is being suspended or released, where each cell in the list supports the feature for the transmission of early measurements upon transition to RRC_CONNECTED according to the method. That may be coupled to other concepts such as, e.g., a cell within the RAN configuration area. Perhaps a signaling optimization contains a flag indication whether that concept is the same as the RAN configuration area.

In a third variant, the decision of step 1306 is performed by the UE receiving the identification that the cell supports early measurements in the RAR message or any other MAC CE. The indication can then also indicate that the network sees a potential use of the measurements, if available, for the specific connection for the UE that has sent the preamble. This variant could be implemented in the MAC specifications by adding a specific uplink grant in the RAR to indicate to the UE that early measurements shall be sent, if available. This is shown below in a possible implementation in TS 38.321:

---

Figure 6:
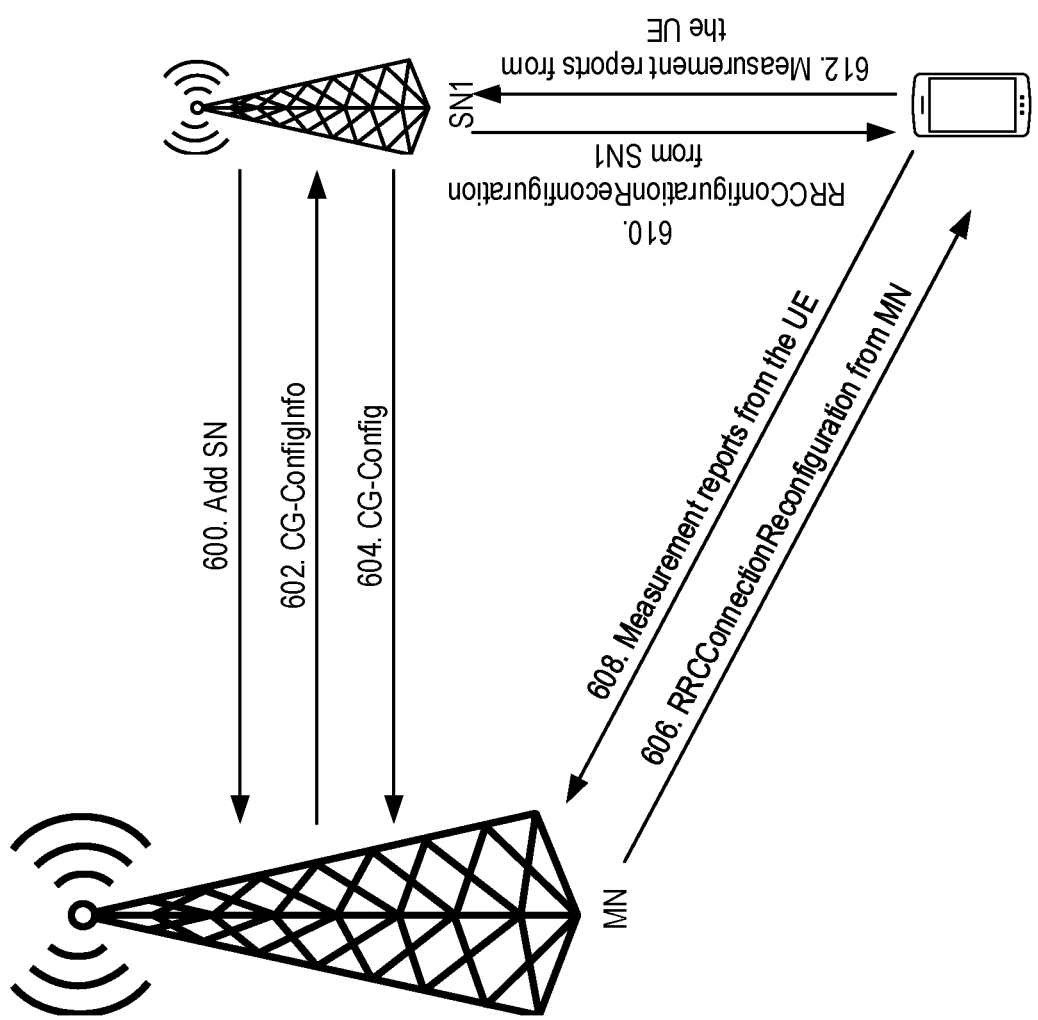
FIG. 6 illustrates a conventional EN-DC configuration.
Figure 7:
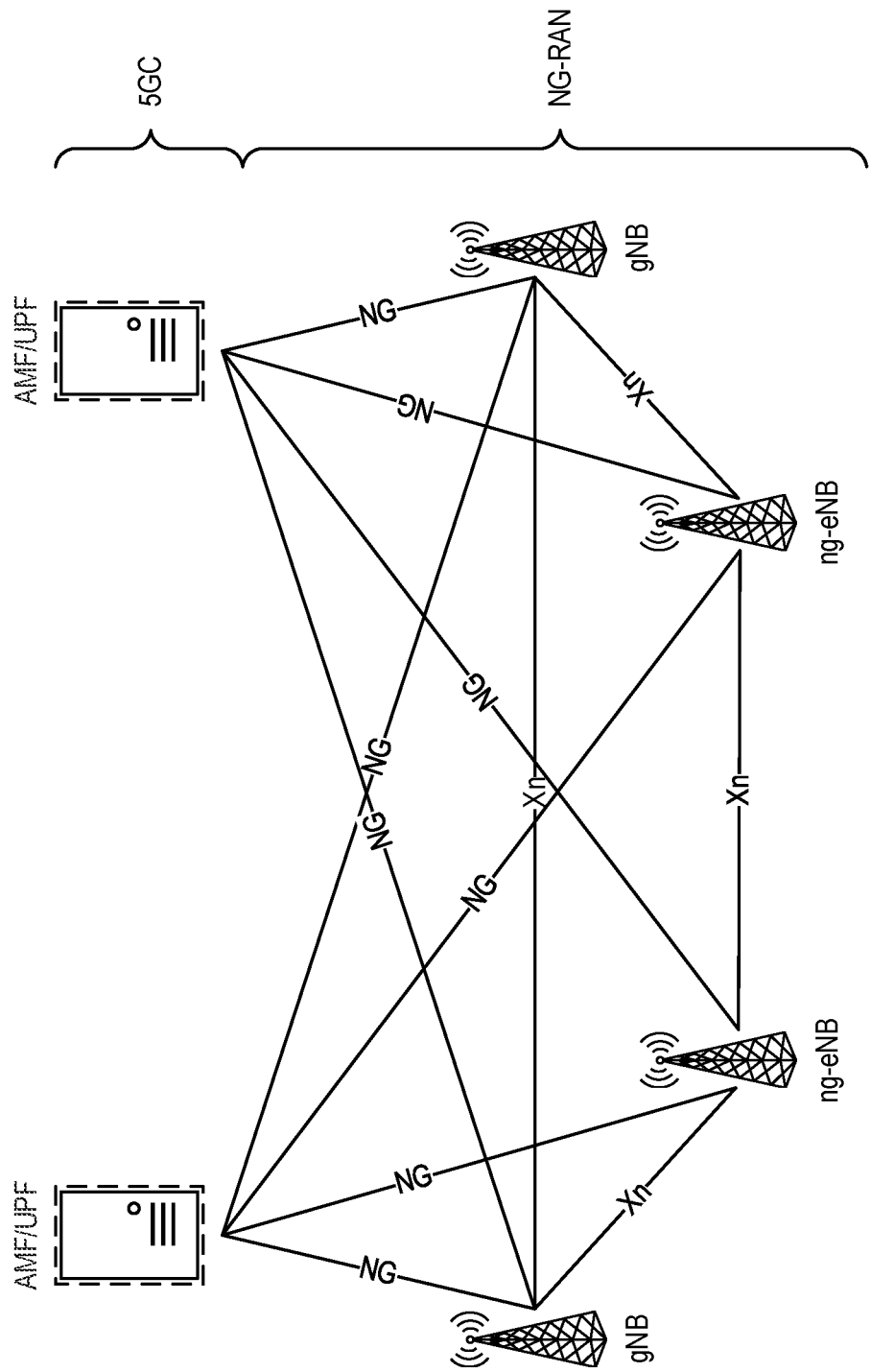
FIG. 7 illustrates the Fifth Generation (5G) System (5GS) architecture containing the 5G Core (5GC) and Next Generation Radio Access Network (NG-RAN)
Figure 8:
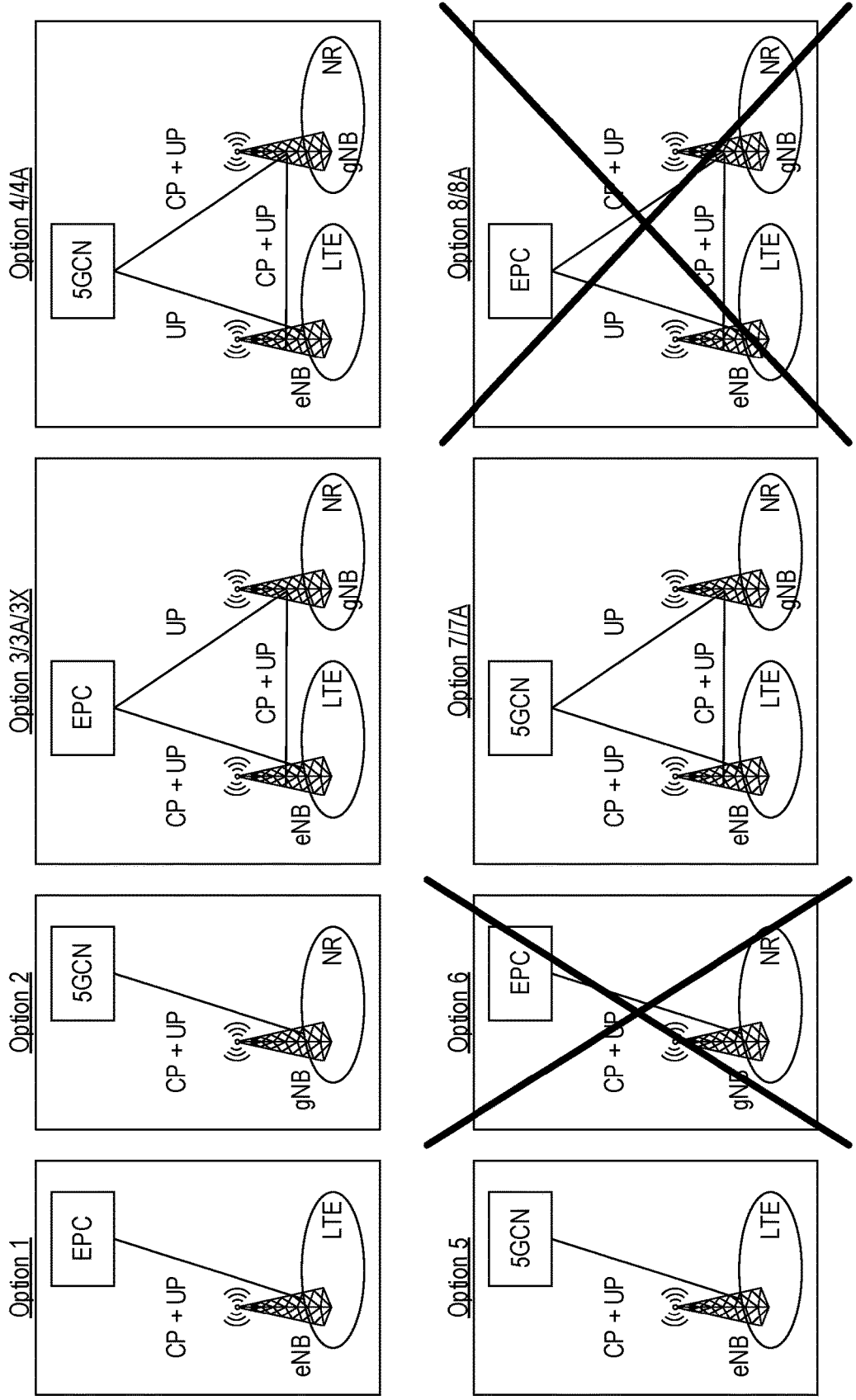
FIG. 8 illustrates different LTE and NR interworking options.
Figure 9:
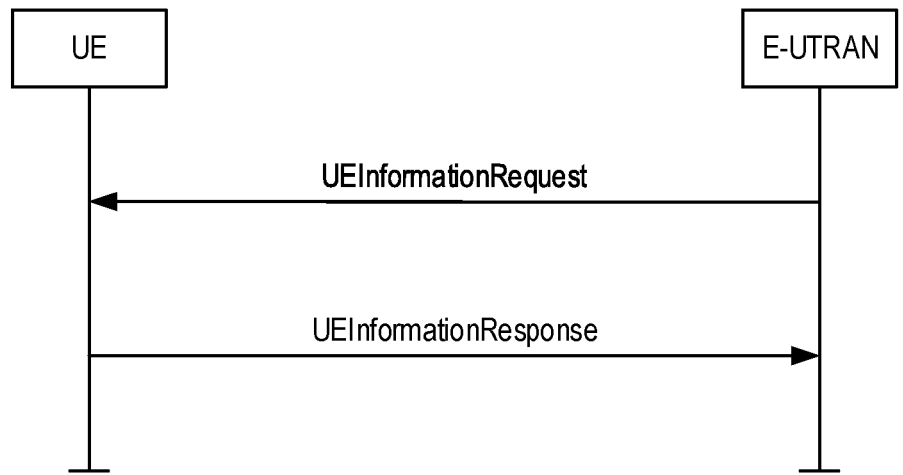
FIG. 9 illustrates a process for reporting early measurements upon resume/setup in LTE.
Figure 10:
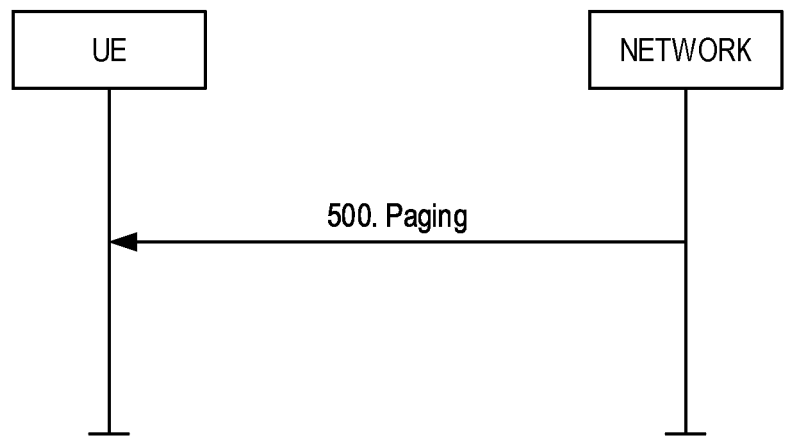
FIG. 10 illustrates a conventional paging scenario in which a network node sends a paging message to a UE.

6.2.3 MAC payload for Random Access Response
The MAC RAR is of fixed size as depicted in FIG. 6.2.3-1, and consists of the following fields:
 - R: Reserved bit, set to "0";
 - Timing Advance Command: The Timing Advance Command field indicates the index value $T_A$ used to control the amount of timing adjustment that the MAC entity has to apply in TS 38.213 [6]. The size of the Timing Advance Command field is 12 bits;
 - UL Grant: The Uplink Grant field indicates the resources to be used on the uplink in TS 38.213 [6], or for early measurement reporting during transition to connected. The size of the UL Grant field is 27 bits;
 - Temporary C-RNTI: The Temporary C-RNTI field indicates the temporary identity that is used by the MAC entity during Random Access. The size of the Temporary C-RNTI field is 16 bits.
The MAC RAR is octet aligned.

---

The UE decides to perform early measurement reporting according to the described method based on any of the indications described in the previous step (which may be at least one of them or a combination of them, even if below an implementation where all of them needs to be fulfilled is shown). That may be done based on different conditions, such as in the following possible implementation to the RRC specifications (TS 38.331):

---

5.3.13.X Conditions for initiating early measurement reporting
A UE can initiate Early Measurement Reporting when the following conditions are fulfilled:
  1> the upper layers request resumption of an RRC connection; and
  1> the UE supports early measurement reporting; and
  1> SIB1 includes inactiveModeMeasurementsResumeRequest;
  1> and the UE has a stored value of the nextHopChainingCount provided in the RRCConnectionRelease message with suspend indication during the preceding suspend procedure;
  1> the establishment or resumption request is for mobile originating calls and the establishment cause is mo-Data;
  1> SIB1 includes inactiveModeMeasurementsResumeRequest-Parameters;
  1> the size of the resulting MAC PDU including the early measurements is expected to be smaller than or equal to the TBS signalled in emr-TBS as specified in TS 38.321 [6, 5.1.1];

---

Step 1308 (Optional): The UE selects random access parameters of the target cell, such as a random access resource (e.g., a specific preamble from a specific preamble group), where the selection indicates that the UE has available measurements performed in dormant state (e.g., RRC_IDLE or RRC_INACTIVE). Further, after selecting, the UE transmits a random access preamble in accordance with the selected random access parameters (e.g., transmitting a selected random access preamble in the selected random access resource).

In a first variant, the UE reads an SIB (e.g., SIB1) and obtains a list of at least one preamble to be used for that purpose of indicating the availability of early measurements. The UE then selects one of these preambles for transmission to thereby indicate that the UE has available measurements performed in the dormant state.

In a second variant, the UE that wants to perform early measurement reporting reads the highest preamble value, same as for legacy UEs (e.g., indicated by totalNumberOfRA-Preambles) and a new parameter indicated for early measurement purposes (e.g., emr-LastPreamb/e-r16) and selects a preamble within the range of totalNumberOfRA-Preambles+1 and emr-LastPreamble-r16. The UE then transmits the selected preamble to thereby indicate that the UE has available measurements performed in the dormant state.

As described above, the UE may only perform the selection of the random access parameters according one of the variants described above only if the network has indicated the feasibility of the feature (e.g., in the SIB1 flag indicated above). It is also possible the UE may perform the selection of the random access parameters according to the second variant described above even if the network has not indicated the feasibility of the feature.

From the network perspective, the target node broadcasts specific Random Access Channel (RACH) parameters to be used in case the UE has early measurements stored to be reported during state transition to connected. The network may also broadcast an indication of the largest Transport Block Size that it supports, so that the UE is aware of how much can really be reported. Another embodiment could be for the UE to adjust the measurement results to fit the grant available (e.g., include the top 5 cells of a certain carrier instead of 10). The early measurement report parameters are provided in SIB1, possibly in the RACH configuration as shown below:

– RACH-ConfigCommon
The RACH-ConfigCommon IE is used to specify the cell specific random-access parameters.

RACH-ConfigCommon information element

```
-- ASN1START
-- TAG-RACH-CONFIG-COMMON-START
RACH-ConfigCommon ::=          SEQUENCE {
    rach-ConfigGeneric          RACH-ConfigGeneric,
    totalNumberOfRA-Preambles           INTEGER (1..63)
OPTIONAL,   -- Need S
    ssb-perRACH-OccasionAndCB-PreamblesPerSSB   CHOICE {
        oneEighth                   ENUMERATED
{n4,n8,n12,n16,n20,n24,n28,n32,n36,n40,n44,n48,n52,n56,n60,n64},
        oneFourth                   ENUMERATED
{n4,n8,n12,n16,n20,n24,n28,n32,n36,n40,n44,n48,n52,n56,n60,n64},
        oneHalf                     ENUMERATED
{n4,n8,n12,n16,n20,n24,n28,n32,n36,n40,n44,n48,n52,n56,n60,n64},
        one                         ENUMERATED
{n4,n8,n12,n16,n20,n24,n28,n32,n36,n40,n44,n48,n52,n56,n60,n64},
        two                         ENUMERATED {n4,n8,n12,n16,n20,n24,n28,n32},
        four                        INTEGER (1..16),
        eight                       INTEGER (1..8),
        sixteen                     INTEGER (1..4)
    }
OPTIONAL,   -- Need M
    groupBconfigured            SEQUENCE {
        ra-Msg3SizeGroupA           ENUMERATED {b56, b144, b208, b256, b282,
b480, b640,
                                    b800, b1000, b72, spare6, spare5,spare4,
spare3, spare2, spare1},
        messagePowerOffsetGroupB    ENUMERATED { minusinfinity, dB0, dB5,
dB8, dB10, dB12, dB15, dB18},
        numberOfRA-PreamblesGroupA      INTEGER (1..64)
    }
OPTIONAL,   -- Need R
    ra-ContentionResolutionTimer        ENUMERATED { sf8, sf16, sf24, sf32, sf40,
sf48, sf56, sf64},
    rsrp-ThresholdSSB           RSRP-Range
OPTIONAL,   -- Need R
    rsrp-ThresholdSSB-SUL       RSRP-Range
OPTIONAL,   -- Cond SUL
    prach-RootSequenceIndex     CHOICE {
        l839                        INTEGER (0..837),
        l139                        INTEGER (0..137)
    },
    msg1-SubcarrierSpacing      SubcarrierSpacing
OPTIONAL,   -- Cond L139
    restrictedSetConfig         ENUMERATED {unrestrictedSet,
restrictedSetTypeA, restrictedSetTypeB},
    msg3-transformPrecoder      ENUMERATED {enabled}
OPTIONAL,   -- Need R
    [[ inactiveModeMeasurementsResumeRequest-Parameters-r16
        SEQUENCE {
            emr-LastPreamble-r16            INTEGER(0..63),
            emr-TBS-r16                     ENUMERATED {b328, b408, b504, b600,
b712,
                                            b808, b936, b1000},
        mac-ContentionResolutionTimer-r16 ENUMERATED {sf240,
sf480, sf960,
                                            sf1920, sf3840, sf5760, sf7680,
sf10240}            OPTIONAL -- Need OP
        }                       OPTIONAL    -- Cond EMR
    ]]
    ...
}
-- TAG-RACH-CONFIG-COMMON-STOP
-- ASN1STOP
``` emr-LastPreamble-r16
Provides the mapping of preambles to groups for Early Measurement reporting, as specified in TS 38.321. The preambles for Early measurement reporting are the preambles totalNumberOfRA-Preambles + 1 to emr-LastPreamble-r16.
edt-TBS
Largest TBS for Msg3 applicable to a UE performing Early Measurement reporting. Value in bits. Value b328 corresponds to 328 bits, b408 corresponds to 408 bits and so on.

There may be other information indicated by a random access parameter selection or together with the early measurements.

In a variant of the realization, information regarding the time when the dormant state measurements (e.g., idle/ inactive measurements) were performed is also indicated. If that is indicated in the random access parameter, it allows the network to decide how trustful the available measurements stored at the UE are, i.e. how accurate the quality of the reported cells may really be. And, upon that decision, the network may send a large uplink grant or not, and/or indicate in the RAR whether early measurements available are to be reported or not. If the UE indicates a too large time value (where large is something decided by the network), the network does not send an uplink grant for early measurements and/or the RAR does not contain an indication for the UE to include early measurement reporting with MSG.3. If the time is not so large, the network sends an uplink grant for early measurements and/or the RAR contains an indication for the UE to include early measurement reporting with MSG.3. This will be detailed later in the next step.

There may be different variants that, e.g., only report/ indicate the time elapsed since the latest sample. For example, if the UE makes latest measurements at t0 and resumes at t0+T, it would only include the value of T in the indication. This time could be an exact elapsed time since the measurements were taken or a quantized value (e.g., only times between 0 and 5 seconds are reported, with 100 millisecond (ms) granularity, and all values greater than 5 seconds are reported as 5 seconds).

In another variant, the time information may be provided within the early measurements instead of indicating in the random access parameter, e.g. preamble. However, the usage differs on the network side depending which case is used. If this time is indicated in the random access parameters, e.g. preamble, the network has a chance to decide if it wants the measurements to be reported or not, as described above. If the time information is included together with the early measurements, e.g. multiplexed with MSG.3 after the network has provided the uplink grant for early measurements, the network may then decide whether it is going to use these measurements as input to setup CA/DC or not.

In one example realization based on the above structure, the UE sends the time information if:
- the provided grant for the RRC Resume Request like message is sufficient to include the time information while indicating that the UE shall use the shortI-RNTI;
- the network has indicated (e.g., in the NR SIB1 or LTE SIB2 messages discussed above) if it requires the time information for idle mode measurements; and/or
- since the size difference between fullI-RNTI and shortI-RNTI is 16 bits, the size of the time information which could be included in the new message in CCCH1 would only be 16 bit. A ShortAbsoluteTimeInfo Information Element (IE) can be introduced, e.g., that is 2 bytes long, (as compared to the AbsoluteTimeInfo IE that is defined in LTE which is 48 bits). If binary encoded decimal is used, this would require 4 bits per decimal digit, i.e. the time information could be of the format MM:SS.

The network could configure the UE with a time value (e.g., maxEarlyMeasReportTime) (e.g., in the suspend configuration in the release message or hardcoded in the RRC specifications), or could broadcast the time value, which indicates that the UE should not report idle mode measurements that are older than the maxEarlyMeasReportTime.

```
-    UL-CCCH1-Message
The UL-CCCH1-Message class is the set of 64bit RRC messages that may be sent from
the UE to the Network on the uplink CCCH1 logical channel.
-- ASN1START
-- TAG-UL-CCCH1-MESSAGE-START
UL-CCCH1-Message ::=                         SEQUENCE {
   message                                   UL-CCCH1-MessageType
}
UL-CCCH1-MessageType ::=                     CHOICE {
   c1                                        CHOICE {
      rrcResumeRequest1                         RRCResumeRequest1,
      rrcResumeRequest2                         RRCResumeRequest2,
      spare2 NULL,
      spare1 NULL
   },
   messageClassExtension SEQUENCE { }
}
-- TAG-UL-CCCH1-MESSAGE-STOP
-- ASN1STOP
-    RRCResumeRequest1
The RRCResumeRequest1 is the 64 bit message used to request the resumption of a
suspended RRC connection or perform an RNA update.
   Signalling radio bearer: SRB0
   RLC-SAP: TM
   Logical channel: CCCH1
   Direction: UE to Network
```

| RRCResumeRequest2 message |
| --- |

```
-- ASN1START
-- TAG-RRCRESUMEREQUEST2-START
RRCResumeRequest2 ::= SEQUENCE {
   rrcResumeRequest2                         RRCResumeRequest2-IEs
}
RRCResumeRequest2-IEs ::=                    SEQUENCE {
   idleMeasAbsoluteTime-r16                     ShortAbsoluteTimeInfo-r16
   resumeIdentity                               shortI-RNTI-Value,
   resumeMAC-I                                  BIT STRING (SIZE (16)),
```

| | |
|---|---|
| resumeCause | ResumeCause, |
| spare | BIT STRING (SIZE (1)) |
| } | |
| ShortAbsoluteTimeInfo-r16 ::= | BIT STRING (SIZE (16)) |
| -- TAG-RRCRESUMEREQUEST2-STOP | |
| -- ASN1STOP | |

| RRCResumeRequest1-IEs field descriptions |
|---|
| resumeCause |
| Provides the resume cause for the RRCResumeRequest1 as provided by the upper |
| layers or RRC. A gNB is not expected to reject an RRCResumeRequest1 due to |
| unknown cause value being used by the UE. |
| resumeIdentity |
| UE identity to facilitate UE context retrieval at gNB. |
| resumeMAC-I |
| Authentication token to facilitate UE authentication at gNB. The 16 least significant |
| bits of the MAC-I calculated using the security configuration as specified in 5.3.13.3. |
| idleMeasAbsoluteTime |
| Provides the time when the idle measurements were performed in the |
| ShortAbsoluteTimeInfo IE, which indicates an absolute time in a format |
| MM:SS and using BCD encoding. The first/leftmost bit of the bit string |
| contains the most significant bit of the most significant digit of the year |
| and so on. If the UE has no idle measurements to report, the UE sets this |
| field to binary ones. |

Another realization, in particular for the case of including the time information with MSG.3, is shown below, where a new logical channel is introduced (e.g., UL-CCCH2) which could provide a much larger grant and separate field for availability and time information.

Since the shortAbsoluteTimeInfo IE is 48 bits and two optionality flags indicating whether there are idle measurements available and whether there are time information available, the RRCResumeRequest2 message would be 50 bits larger than the RRCResumeRequest1 message (i.e., 114 bits).

- UL-CCCH2-Message

The UL-CCCH2-Message class is the set of 114 bit RRC messages that may be sent from the UE to the Network on the uplink CCCH2 logical channel.
-- ASN1START
-- TAG-UL-CCCH2-MESSAGE-START

| | |
|---|---|
| UL-CCCH2-Message ::= | SEQUENCE { |
| message | UL-CCCH2-MessageType |
| } | |
| UL-CCCH2-MessageType ::= | CHOICE { |
| c1 | CHOICE { |
| rrcResumeRequest2 | RRCResumeRequest2, |
| spare3 NULL, | |
| spare2 NULL, | |
| spare1 NULL | |
| }, | |
| messageClassExtension SEQUENCE { } | |
| } | |

-- TAG-UL-CCCH1-MESSAGE-STOP
-- ASN1STOP
- RRCResumeRequest2

The RRCResumeRequest2 is the 114 bit message used to request the resumption of a suspended RRC connection or perform an RNA update.
  Signalling radio bearer: SRB0
  RLC-SAP: TM
  Logical channel: CCCH2
  Direction: UE to Network

| RRCResumeRequest2 message |
|---|
| -- ASN1START |
| -- TAG-RRCRESUMEREQUEST2-START |

| | |
|---|---|
| RRCResumeRequest2 ::= | SEQUENCE { |
| rrcResumeRequest2 | RRCResumeRequest2-IEs |
| } | |
| RRCResumeRequest2-IEs ::= | SEQUENCE { |
| idleMeasAbsoluteTime-r16 | ShortAbsoluteTimeInfo-r16 OPTIONAL, |
| resumeIdentity | I-RNTI-Value, |
| resumeMAC-I | BIT STRING (SIZE (16)), |
| resumeCause | ResumeCause, |
| spare | BIT STRING (SIZE (1)) |
| } | |
| ShortAbsoluteTimeInfo-r16 ::= | BIT STRING (SIZE (16)) |

-- TAG-RRCRESUMEREQUEST-STOP
-- ASN1STOP

RRCResumeRequest field descriptions idleMeasAbsoluteTime
Provides an indication that the UE has available measurements that has
been performed in dormant state and the time when the measurements
were performed in the ShortAbsoluteTimeInfo IE. The IE
ShortAbsoluteTimeInfo indicates an absolute time in a format MM:SS
and using BCD encoding. The first/leftmost bit of the bit string contains
the most significant bit of the most significant digit of the minute and so
on . . .
resumeCause
Provides the resume cause for the RRC connection resume request as provided by
the upper layers or RRC. The network is not expected to reject an
RRCResumeRequest due to unknown cause value being used by the UE.
resumeIdentity
UE identity to facilitate UE context retrieval at gNB.
resumeMAC-I
Authentication token to facilitate UE authentication at gNB. The 16 least significant
bits of the MAC-I calculated using the security configuration as specified in
5.3.13.3.

Note that in the above the usage of the ShortAbsoluteTimeInfo is just an example, and there are other possibilities. For example, 1 byte, or an even fewer number of bits, can be used to encode the time information as measurements that are older than a certain duration are likely not reliable and thus not useful for the network to decide the proper CA/DC configuration. For example, only 4 bits used to encode the elapsed time, where 0001 represents 100 ms, 0010 represents 200 ms, . . . 1111 represents 15*20=1500 ms or above.

Also, the RRCResumeRequest2 is also just an example, and either RRCResumeRequest or RRCResumeRequest1 could be used (and correspondingly RRCConnectionResumeRequest in LTE).

In one example realization based on the above structure, the UE sends the time information if:
the provided grant for the RRCResumeRequest2 message is sufficient to include the time information; and/or
the network has indicated (e.g., in the NR SIB1 or LTE SIB2 messages discussed above) if it requires the time information for idle mode measurements.

In one embodiment, the network could indicate (e.g., in the NR SIB1 or LTE SIB2) the oldest idle mode measurement that it considers relevant. For example, if this is specified to be 100 seconds, the UE will not indicate (e.g., in the selected random access parameter) it has available measurements unless they were performed not longer than 100 seconds ago.

In another embodiment, the network may configure the UE upon release/suspend, with a time value (e.g., x seconds) that is the relevance limit for the measurements. Thus, the UE indicates idle mode measurement availability only if the measurements are fresher than the configured time out value. In yet another embodiment, the UE may perform another idle mode measurement when this specified time value has elapsed after performing the previous idle mode measurement.

In another variant, the RRC Resume Request like message is an RRCSetupRequest in NR for UEs coming from RRC_IDLE.

In another variant, the RRC Resume Request like message is an RRCConnectionResumeRequest in LTE for UEs coming from RRC_INACTIVE.

In another variant, the RRC Resume Request like message is an RRCConnectionResumeRequest in LTE for UEs coming from RRC_IDLE with a stored AS Context.

In another variant, the RRC Resume Request like message is an RRCSetupRequest in LTE for UEs coming from RRC_IDLE with a stored AS Context.

Note: this RRC Resume Request like message in the resume case may alternatively be an RRCResumeRequest1 message depending on the type of Inactive Radio Network Temporary Identifier (I-RNTI) to be included in the request message (long or short).

Note 2: the IEs within RRCResumeRequestand RRCResumeRequest1 cannot be extended. However, since the solutions proposed herein will be eventually addressed in Release 16, a new v16 IE has been created by including all the fields present in Release 15 (to keep a sort of compatibility with the previous release).

The indication in the random access parameter may be a parameter to enable the network to quickly identify the possible need for these measurements. For example, that may enable the network to configure additional measurements in measConfig in the follow-up RRCResume (or RRCConnectionResume in LTE) or the first RRCReconfiguration before security is setup when the UE comes from IDLE.

In a variant of that solution, this indication is not really included in the RRC Resume Request as the target network node identifies that the UE possibly has available idle measurements thanks to the UE AS context. That may require some explicit definition that the UE AS context contains that information so that is transferred between nodes in an inter-node procedure for context fetching/context fetching request. That may be seen as an opportunistic approach as the UE may have been configured with these measurements, but the network has not received any input from the UE that the UE has these stored.

Step 1310 (Optional): The UE receives an indication from the network, for example with the RAR message, that the UE is to transmit early measurements performed in the dormant state (e.g., idle/inactive state) with an RRC Resume Request like message (e.g., with an RRCResumeRequest or an RRCConnectionResumeRequest), if these are available. This indication may be implicit (e.g., a large grant) or explicit (e.g., some payload information in the RAR or a MAC CE).

In the explicit case, the MAC payload for the RAR message may contain an indication in a reserved bit. That may be implemented as follows:

6.2.3 MAC payload for Random Access Response
The MAC RAR is of fixed size as depicted in Figure 6.2.3-1, and consists of the following fields:
- R: Reserved bit, set to "0"; For UEs supporting early measurement reporting in state transitions, this bit is set to "1" to indicate that an UL Grant in Random Access Response is for Early Measurement Reporting e.g. with RRCResumeRequest.
- Timing Advance Command: The Timing Advance Command field indicates the index value $T_A$ used to control the amount of timing adjustment that the MAC entity has to apply in TS 38.213 [6]. The size of the
Timing Advance Command field is 12 bits;
- UL Grant: The Uplink Grant field indicates the resources to be used on the uplink in TS 38.213 [6], The size of the UL Grant field is 27 bits;
- Temporary C-RNTI: The Temporary C-RNTI field indicates the temporary identity that is used by the MAC entity during Random Access. The size of the Temporary C-RNTI field is 16 bits.
The MAC RAR is octet aligned.

Figure 14:
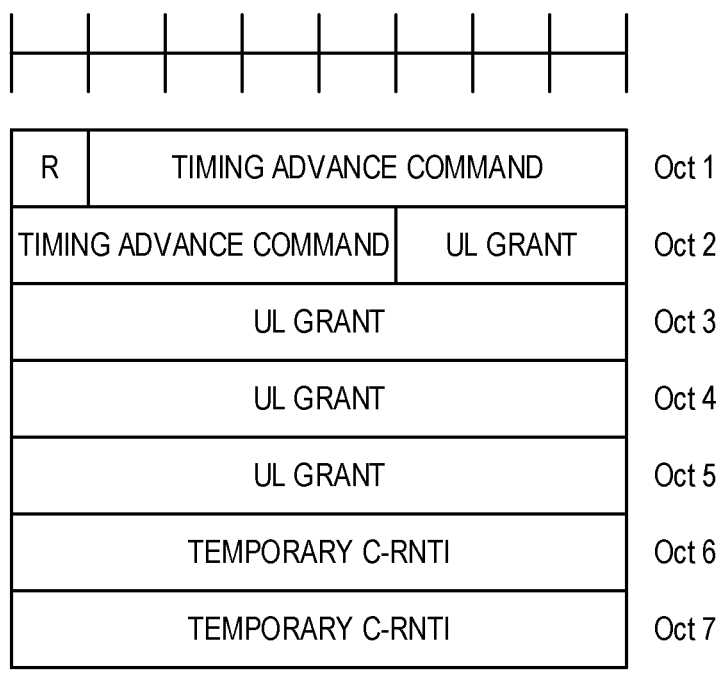
FIG. 14 illustrates a MAC Random Access Response (RAR) including an indication, from the network, that the UE is to transmit early measurements with an RRC Resume Request like message in accordance with one embodiment of the present disclosure.

[reproduced as Figure 14]
Figure 6.2.3-1: MAC RAR

In one variant the indication is transmitted in a separated message, e.g. a MAC CE.

Step 1312: The UE transmits, to the network, the stored early measurements performed in the dormant state (e.g., RRC_IDLE with AS Context, RRC_IDLE, or RRC_INACTIVE), if available, with an RRC Resume Request like message (e.g., in an RRC Resume Request like message (e.g., RRCResumeRequestor RRCConnectionResumeRequest) or in a separate message multiplexed (e.g., in the same radio frame) with the RRC Resume Request like message or in a separate message in a radio frame different from the radio frame used to send the RRC Resume Request like message).

In a first variant, the UE includes the measurements in the RRC Resume Request like message, e.g. RRCResumeRequest1, RRCResumeRequest, or RRCConnectionResumeRequest.

In a second variant, the UE includes the measurements in a different message (e.g., UEInformationResponse or a MeasurementReport like message that contains a modified measResults that contains idle mode measurements) that is not the same as the RRC Resume Request like message, but that is multiplexed in the same radio frame with the RRC Resume Request like message or sent in the radio frame soon after the radio frame used for sending the RRC Resume Request like message.

In another variant, if the network opportunistically requested the UE to report early measurements performed in the dormant state (e.g., RRC_INACTIVE or RRC_IDLE) but for some reason the UE does not have these measurements available, the UE may indicate that lack of available measurements in the RRC Resume Request like message. Alternatively, the absence of measurements in the message (or lack of the reception of another message that includes the measurements multiplexed with the RRC Resume Request like message) even though the network has requested the UE to include these could be an implicit indication to the network that the UE does not have idle measurements available.

In some embodiments, before the UE transmits the message carrying early measurements, the UE starts security for the target cell. Hence, the measurement information is encrypted and/or integrity protected according to new keys, i.e. the keys to decode the RRC Resume Request like message.

An example realization of a modified measResults that is can be included in the MeasurementReport message to report idle measurements is shown below:

- MeasurementReport
The MeasurementReport message is used for the indication of measurement results.
Signalling radio bearer: SRB1, SRB3
RLC-SAP: AM
Logical channel: DCCH
Direction: UE to Network MeasurementReport message -- ASN1START
-- TAG-MEASUREMENTREPORT-START
MeasurementReport ::=          SEQUENCE {
    criticalExtensions          CHOICE {
        measurementReport           MeasurementReport-IEs,
        criticalExtensionsFuture    SEQUENCE { }
    }
}
MeasurementReport-IEs ::=       SEQUENCE {
    measResults                 MeasResults,
    lateNonCriticalExtension        OCTET STRING        OPTIONAL,
    nonCriticalExtension            SEQUENCE{ }     OPTIONAL
}
-- TAG-MEASUREMENTREPORT-STOP
-- ASN1STOP
-    MeasResults
The IE MeasResults covers measured results for intra-frequency, inter-frequency, and inter-RAT mobility.

| MeasResults information element |
| --- |
| ```
-- ASN1START
-- TAG-MEAS-RESULTS-START
MeasResults ::=              SEQUENCE {
  measId                       MeasId,
  measResultServingMOList      MeasResultServMOList,
  measResultNeighCells         CHOICE {
    measResultListNR             MeasResultListNR,
    ...,
    measResultListEUTRA          MeasResultListEUTRA,
    measResultListIdle-r16       MeasResultListIdle-r16
  }
OPTIONAL,
  ...
}
``` |

| MeasResults field descriptions |
| --- |
| measId<br>Identifies the measurement identity for which the reporting is being performed. If measResultListIdle is included, any value can be assigned to the measId value, and it will be ignored by the network<br>measResultEUTRA<br>Measured results of an E-UTRA cell.<br>measResultListEUTRA<br>List of measured results for the maximum number of reported best cells for an E-UTRA measurement identity.<br>measResultListIdle<br>Idle mode measurement results<br>measResultListNR<br>List of measured results for the maximum number of reported best cells for an NR measurement identity.<br>measResultNR<br>Measured results of an NR cell.<br>measResultServingMOList<br>Measured results of measured cells with reference signals indicated in the serving cell measurement objects<br>including measurement results of SpCell, configured SCell(s) and best neighbouring cell within measured cells with reference signals indicated in on each serving cell measurement object. If measResultListIdle is included, this filed will be ignored by the network. |

In one embodiment, the absolute time the idle mode measurement was taken is included in the measurement sent to the network (e.g., in the measResultListIdle IE that is included in the UE information response or the modified measResult that is included in the MeasurementReport- shown above) instead of the RRC Resume Request like message as discussed in some of the previous embodiments. An example is shown below:

| MeasResults information element |
| --- |
| ```
-- ASN1START
-- TAG-MEAS-RESULTS-START
MeasResults :: =             SEQUENCE {
  measId                       MeasId,
  measResultServingMOList      MeasResultServMOList,
  measResultNeighCells         CHOICE {
``` |

| MeasResults information element |
| --- |
| ```
    measResultListNR             MeasResultListNR,
    ...,
    measResultListEUTRA          MeasResultListEUTRA,
      measResultListIdle-r16       SEQUENCE {
      idleMeasAbsoluteTime-r16     ShortAbsoluteTimeInfo-r16
    OPTIONAL,
      measResultsListIdle          MeasResultListIdle-r16    ,
    }
  }
OPTIONAL,
  ...
}
``` |

An example embodiment of the MeasResultListIdle-r16 is shown below:

```
MeasResultListIdle-r16  ::= SEQUENCE (SIZE (1..maxIdleMeasCarriers-r16)) OF
MeasResultIdle-r16
MeasResultIdle-r16  ::= SEQUENCE {
  measResultServingCell-r16           CHOICE {
    eutra                               SEQUENCE {
      rsrpResult-r16                      RSRP-RangeEUTRA,
      rsrqResult-r16                      RSRQ-RangeEUTRA,
      sinrResult-r16                      SINR-RangeEUTRA
    }
    nr                                  SEQUENCE {
      rsrpResult-r16                      RSRP-Range,
```

```
          rsrqResult-r16                         RSRQ-Range,
          sinrResult-r16                         SINR-Range
        }
      },
      measResultNeighCellsEUTRA-r16                CHOICE {
        measResultIdleListEUTRA-r15                  MeasResultIdleListEUTRA-r16,
        ...
      }                                          OPTIONAL, -- Need
    N
      measResultNeighCellsNR-r16                   CHOICE {
        measResultIdleListNR-r16                     MeasResultIdleListNR-r16,
        ...
      }                                          OPTIONAL, -- Need
    N
      ...
    }
    MeasResultIdleListEUTRA-r16 ::=              SEQUENCE (SIZE (1..maxCellMeasIdleEUTRA-
    r16)) OF MeasResultIdleEUTRA-r16
    MeasResultIdleEUTRA-r16 ::=                  SEQUENCE {
      carrierFreq-r16                              ARFCN-ValueEUTRA,
      physCellId-r16                               PhysCellIdEUTRA,
      measResult-r16                               SEQUENCE {
        rsrpResult-r16                               RSRP-RangeEUTRA,
        rsrqResult-r16                               RSRQ-RangeEUTRA,
        sinrResult-r16                               SINR-RangeEUTRA
      },
      ...
    }
    MeasResultIdleListNR-r16 ::=                 SEQUENCE (SIZE (1..maxCellMeasIdleNR-r16)) OF
    MeasResultIdleNR-r16
    MeasResultIdleNR-r16 ::=                     SEQUENCE {
      carrierFreq-r16                              ARFCN-ValueNR,
      physCellId-r16                               PhysCellId,
      measResult-r16                               SEQUENCE {
        rsrpResult-r16                               RSRP-Range,
        rsrqResult-r16                               RSRQ-Range,
        sinrResult-r16                               SINR-Range
      },
      ...
    }
```

Figure 15:
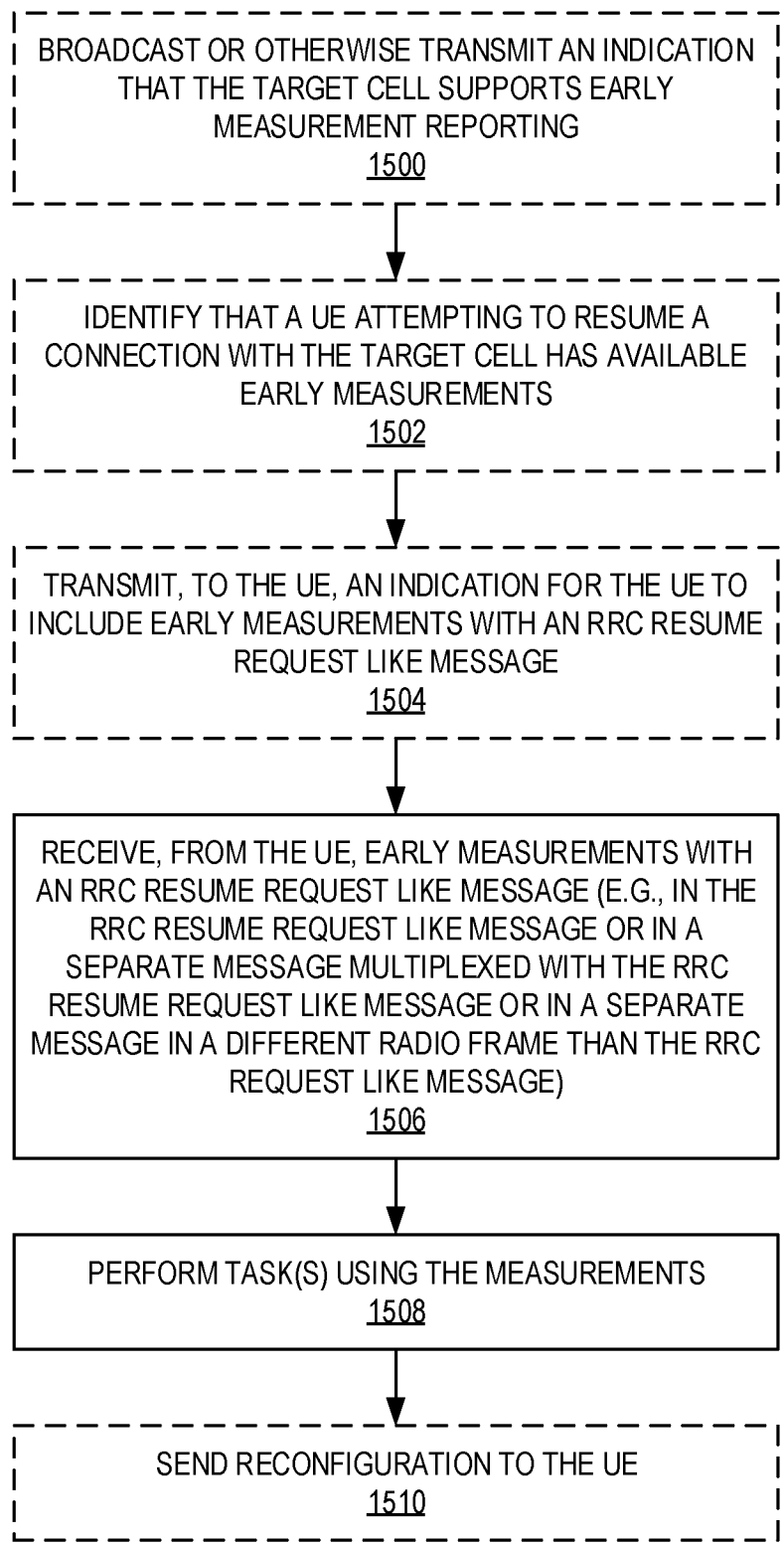
FIG. 15 is a flow chart that illustrates the operation of a target network node associated with a target cell where a wireless device is trying to resume, wherein the target network node enables early measurement reporting with a message (e.g., RRC Resume Request like message) sent by the wireless device to request resuming of a connection with the target cell, in accordance with some embodiments of the present disclosure.

In the present disclosure, embodiments of a method at a target network node (e.g., a target base station) associated with a target cell where a wireless terminal (e.g., UE) is trying to resume are provided. As illustrated in FIG. 15, in some embodiments, the method comprises the following steps. Note that while these actions are referred to as "steps", these actions may be performed in any suitable order and are not limited to the order in which they are presented here, unless otherwise stated or required. Further, optional steps are represented in FIG. 15 by dashed lines.

Step 1500 (Optional): The network node indicates that a target cell supports early measurements performed in a dormant state (e.g., idle and/or inactive state) to be reported as described in the method, e.g. by broadcasting an indication in the system information or including the indication in the paging message.

Step 1502 (Optional): The network node identifies that a UE is trying to resume a connection at that the target cell (or network node associated with the target cell) and that the UE has available measurements performed in the dormant state (e.g., RRC_IDLE or RRC_INACTIVE), e.g. by detecting a given random access parameter such as preamble, resource, etc.

Step 1504 (Optional): The network node indicates, to the UE trying to resume the connection, that the UE is to include early measurements performed in the dormant state (e.g., idle/inactive state), if these are available. The network also provides enough resources for the UE, e.g., by providing a large enough uplink grant for the message and the early measurements.

Step 1506: The network node receives, from the UE, measurements performed by the UE in the dormant state (e.g., RRC_IDLE with AS Context, RRC_IDLE, or RRC_I-NACTIVE) in an RRC Resume Request like message (e.g., RRCResumeRequest or RRCConnectionResumeRequest) or in a separate message multiplexed (e.g., in the same radio frame) with the RRC Resume Request like message or in a separate message in a radio frame different from the radio frame used to send the RRC Resume Request like message.

Step 1508: Upon receiving the early measurements from the UE, the network node performs one or more tasks using the early measurements. The one or more tasks may include, e.g., deciding to keep the existing resumed UE configuration; and/or add, remove, or modify SCG configurations; and/or add, remove, or modify SCell configurations of the MCG and/or SCG; and/or activate or deactivate the state of configured MCG/SCG SCells.

Step 1510 (Optional): The network node sends a reconfiguration to the UE in an RRC Resume Request like message (e.g., RRCResume, RRCConnectionResume, RRCReconfiguration, or RRCConnectionReconfiguration) to add, modify, remove, change state (activate/deactivate/etc.) SCGs, SCell(s), perform handovers, or any other action that may be assisted by early measurements).

Figure 16:
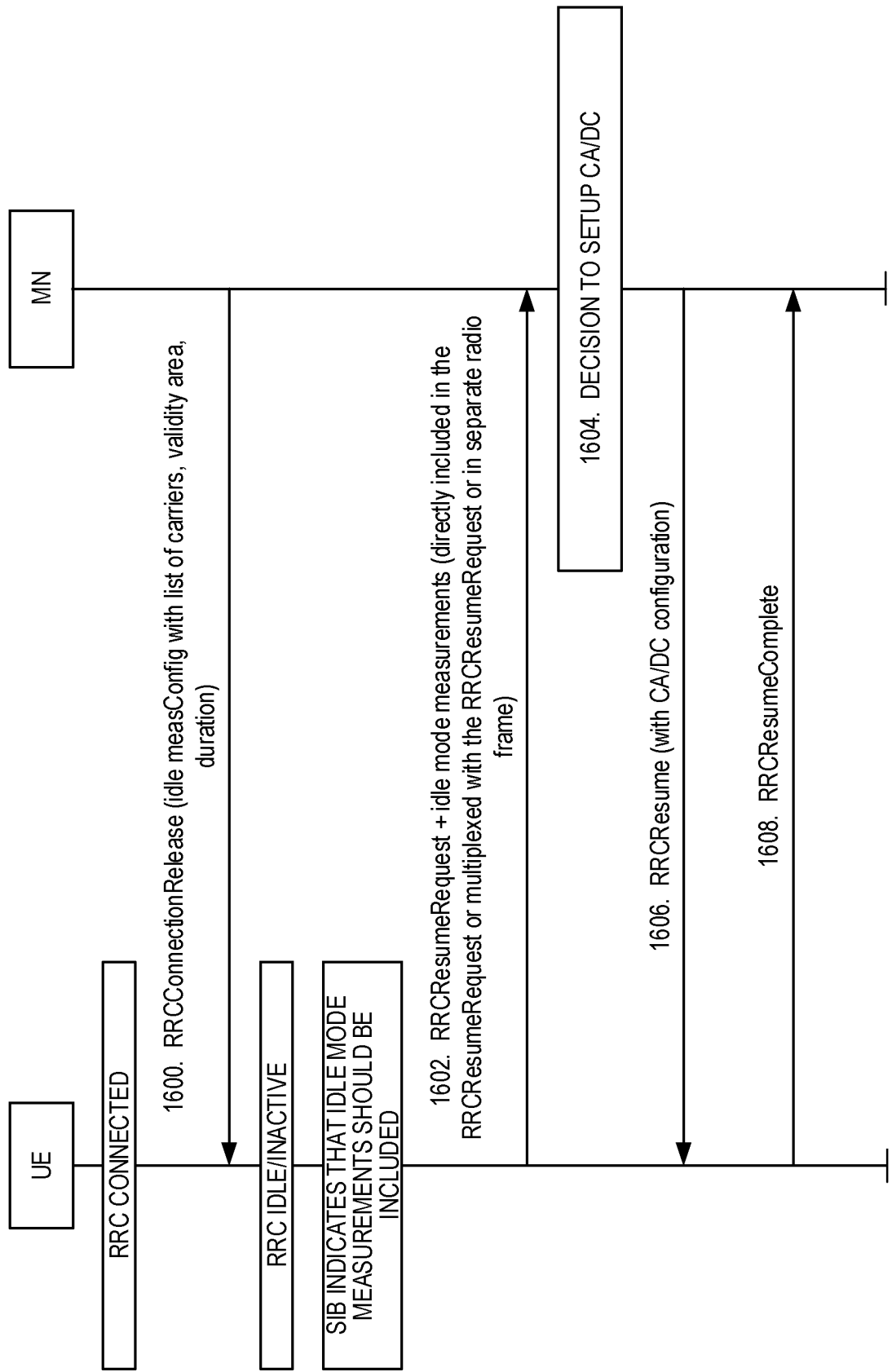
FIG. 16 illustrates the operation of a UE and a network node associated with a target cell of the UE in accordance with some embodiments of the present disclosure.
Figure 17:
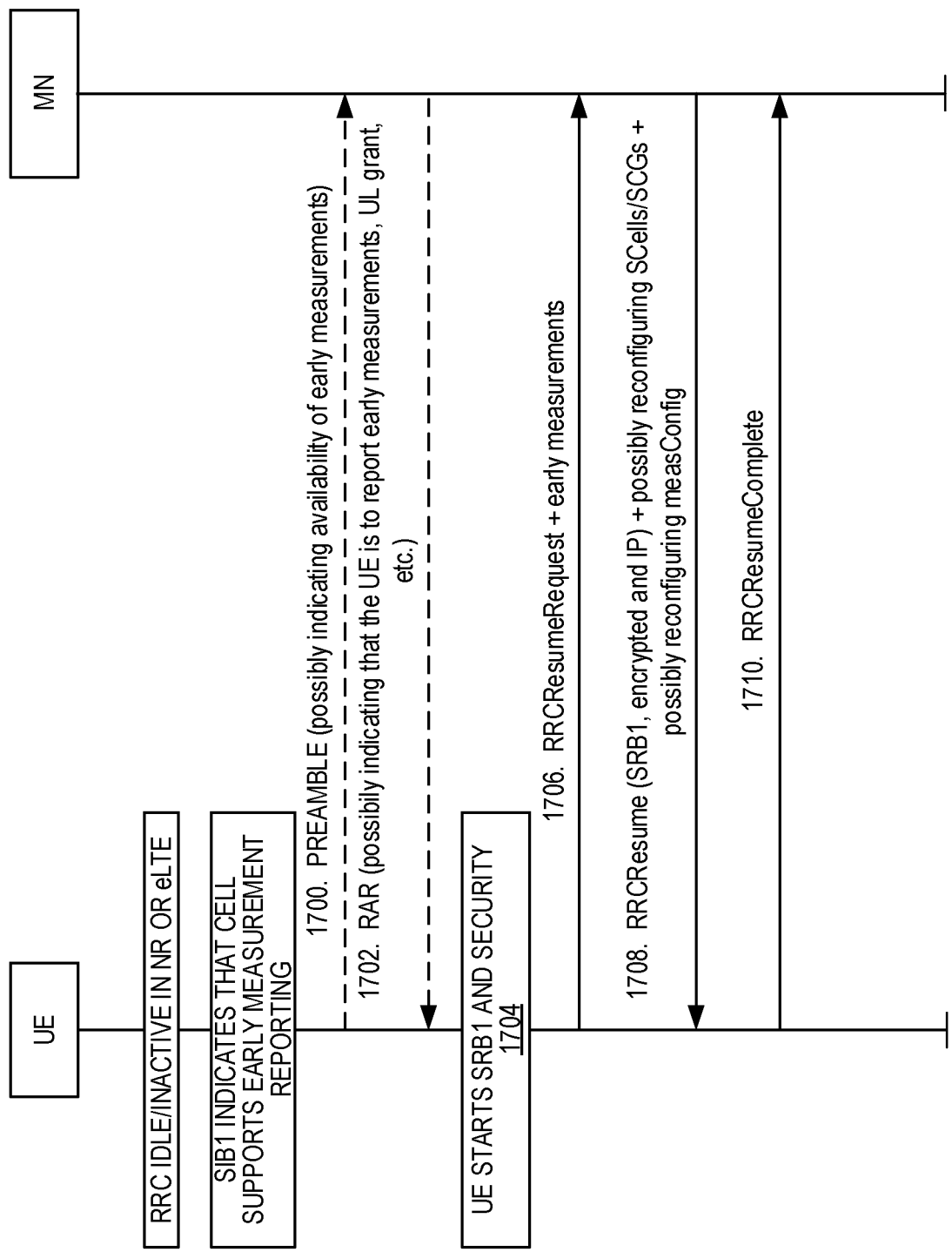
FIG. 17 illustrates the operation of a UE and a network node associated with a target cell of the UE in accordance with some other embodiments of the present disclosure.
Figure 18:
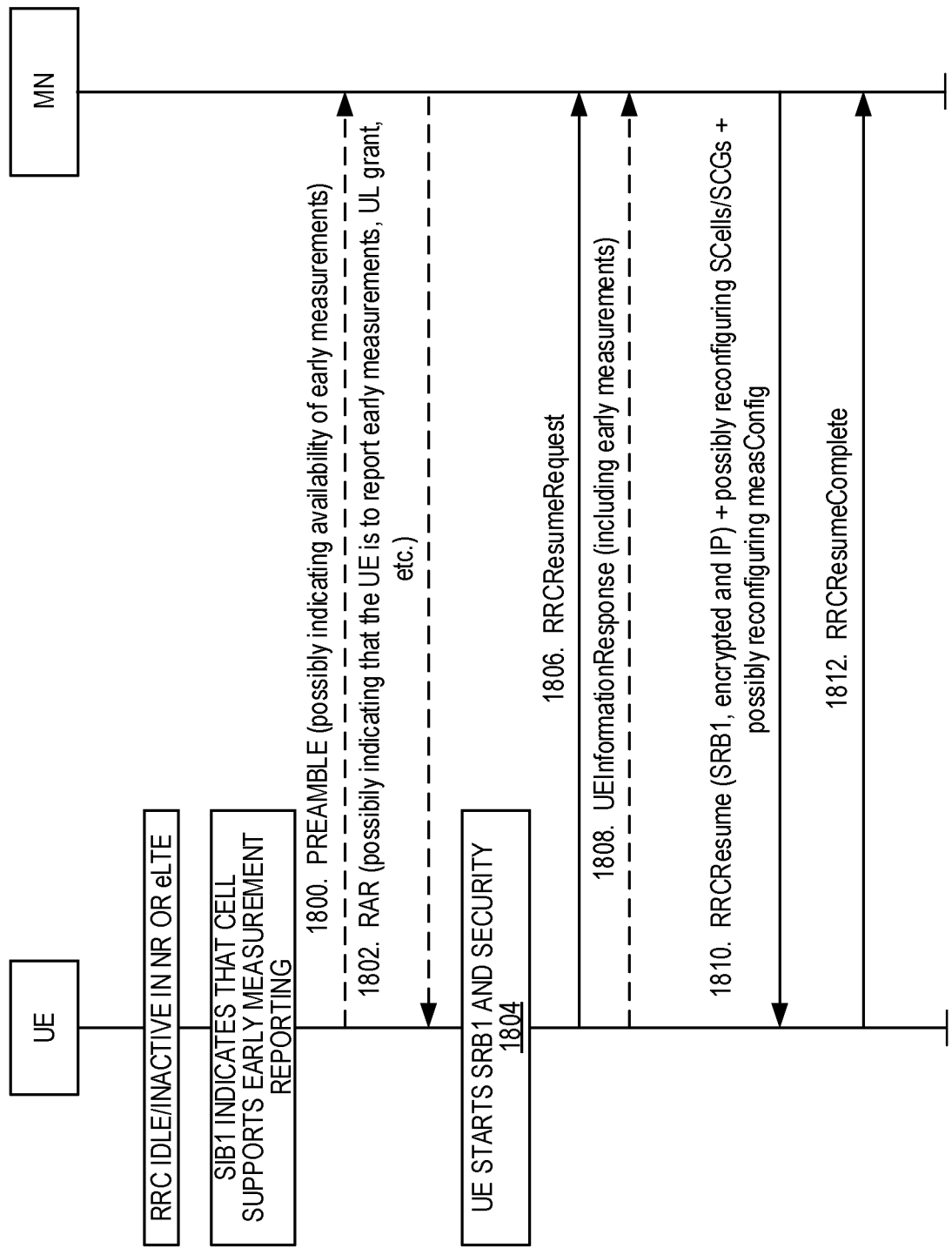
FIG. 18 illustrates the operation of a UE and a network node associated with a target cell of the UE in accordance with some other embodiments of the present disclosure.

FIGS. 16 through 18 show some signaling diagrams between the UE and the target network node that illustrate at least some of the embodiments described above.

In particular, FIG. 16 illustrates the operation of a UE and a network node associated with a target cell of the UE in accordance with some embodiments described above. As illustrated in FIG. 16, the UE is in an RRC connected state. The network node sends, and the UE receives, an RRC Connection Release message with configurations for dormant state measurements (which are idle mode measurements in this example) (step 1600). The UE transitions to RRC idle/inactive state. While not illustrated, while in RRC idle/inactivate state, the UE performs measurements in accordance with the received configurations. These measurements are referred to herein as "early measurements" or "dormant state measurements" or "idle mode measurements." Note that, in this example, SIB indicates that idle mode measurements are to be included with RRCResumeRequest.

The UE sends an RRCResumeRequest with the idle mode measurements to the network node (step 1602). As discussed above, the idle mode measurements may be included in the RRCResumeRequest, included in a message that is multiplexed with the RRCResumeRequest, or included in a message that is transmitted in a separate radio frame (e.g., a radio frame immediately following the frame in which the RRCResumeRequest is transmitted).

The network node makes a decision to setup CA or DC for the UE based on the early measurements reported by the UE (step 1604), and the network node sends an RRCResume message with CA or DC configurations for the UE (step 1606). The UE responds with an RRCResumeComplete message (step 1608).

FIG. 17 illustrates the operation of a UE and a network node associated with a target cell of the UE in accordance with some other embodiments described above. As illustrated in FIG. 17, the UE is in an RRC idle or inactive state. While not illustrated, while in RRC idle/inactivate state, the UE performs measurements. These measurements are referred to herein as "early measurements" or "dormant state measurements" or "idle mode measurements." Note that, in this example, SIB1 indicates that the target cell supports reporting of idle mode measurements.

In this example, the UE transmits a random access preamble that indicates that that UE has early measurements available for reporting (step 1700), and the network node responds with a RAR that indicates that the UE is to report the early measurements (step 1702). The UE starts SRB1 and security (step 1704). The UE then transmits an RRCResumeRequest message that includes the early measurements to the network node (step 1706). The network node responds with an RRCResume message that possibly includes reconfigurations for the UE, as described above (step 1708). The UE responds with an RRCResumeComplete message (step 1710).

FIG. 18 illustrates an embodiment that is similar to that of FIG. 17 but in which the early measurements are sent by the UE in a message that is multiplexed with the RRCResumeRequest message. In this example, the message is a UEInformationResponse message.

As discussed above, in addition to challenges related to the reporting of the early measurements themselves, there is also a challenge related to requesting early measurements from a UE. Thus, another problem addressed in the present disclosure is how early the network can request early measurements from the UE. In this regard, with the current NR specification, a UE entering in the RRC_CONNECTED state may not take advantage of the possible CA/DC/Multi-Connectivity (MC) opportunity. In fact, current specifications do not support early measurements by the UE and thus the network is not able to do a fast setup (or resume) of CA or DC in NR. By early measurement, it is meant that measurement results that can be received from the UE without the need to send or restore measurement configurations after the UE has gone to the CONNECTED mode. This can preferably be even before the UE has got message 3, e.g., RRCResume, so that the network can configure CA/DC immediately in that command.

Under current NR specifications, the network can decide to setup CA or DC only after the UE enters into the RRC_CONNECTED state and can start to perform measurements and send measurement reports when the triggering conditions are fulfilled. Of course, this means that the functionalities of CA and DC (i.e., low latencies and high data rate) are not fully exploited in case the UE has a huge amount of data, or data with very strict latency requirements, in its queue. Moreover, according to the legacy solutions, the network may setup CA or DC when it is too late; by the time CA/DC is set up, the data transmission might already be finished or, in the worst case, data may have been buffered too long to satisfy the latency requirements. In order to avoid this, it is beneficial for the UE to provide early measurements to the network as soon as it goes (or if possible, even before) to RRC_CONNECTED.

In LTE Release 15, the existing mechanism by which the network can indicate that it supports the request/reception of early idle measurements performed by the UE is an indication in SIB2—a flag indicating the support—so the UE then includes the availability of measurements in an RRCConnectionSetupComplete message or an RRCConnectionResumeComplete message. However, that is an indication that the cell/eNB supports the feature, not that the cell/eNB wants a specific UE to report the available idle measurements.

For that purpose, the LTE Release 15 solution demands that the network explicitly ask for the idle mode measurement by using the UEInformationRequest message with a new flag that has been introduced for that purpose. The UEInformationRequest is sent on SRB1 and only after the UE indicates that it has measurements available. This conventional solution is illustrated in FIG. 19.

Figure 19:
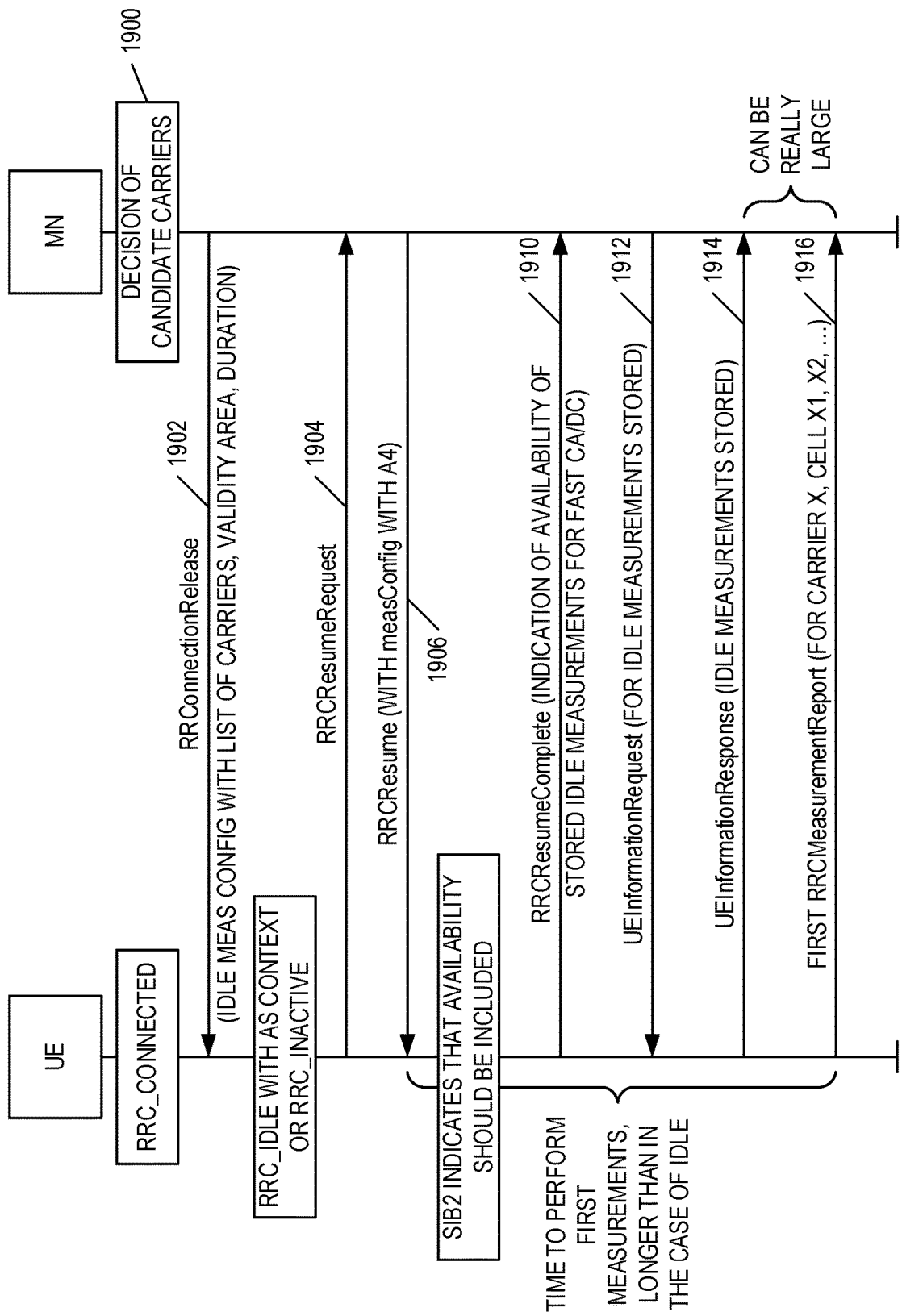
FIG. 19 illustrates the conventional mechanism by which a network can receive stored IDLE measurements from a UE.

FIG. 19 illustrates the conventional mechanism by which a network can receive stored IDLE measurements. After the Master Node (MN) decides on candidate carriers (step 1900), it issues an RRCConnectionRelease message to the UE (step 1902), putting the UE into the RRC_IDLE state or the RRC_INACTIVE state. Later, the UE issues an RRCResumeRequest message (step 1904), which prompts the MN to respond with an RRCResume message in which SIB2 indicates that availability should be included (step 1906). The UE issues an RRCResumeComplete message, indicating the availability of stored IDLE mode measurements for fast CA/DC (step 1910).

In order to get the stored IDLE mode measurements, the MN must issue a UEInformationRequest message to the UE (step 1912), which responds with a UEInformationResponse message that contains the stored IDLE mode measurements (step 1914). Later, the UE sends the MN an RRCMeasurementReport message (step 1916).

Certain aspects of the present disclosure and their embodiments may provide solutions to the aforementioned or other challenges related to how the network requests early measurements from the UE. The present disclosure provides a method executed by a UE (also referred to as a wireless terminal or wireless device) for measurement reporting configuration while the UE is in a dormant state (e.g., in the RRC_IDLE state or the RRC_INACTIVE state).

Figure 20:
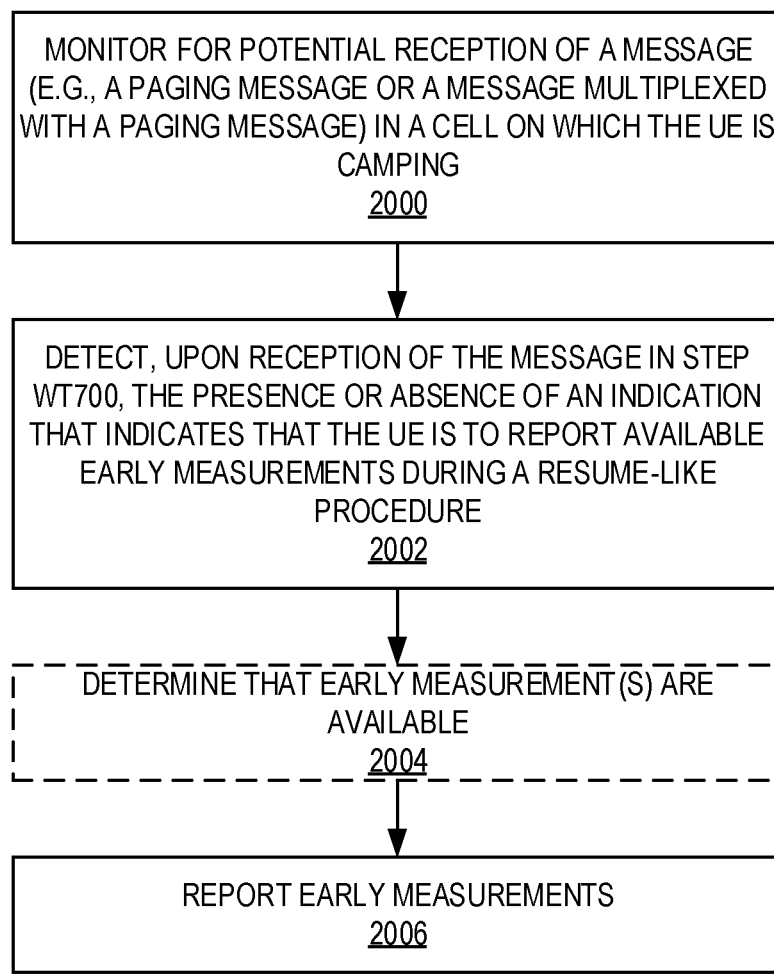
FIG. 20 is a flow chart that illustrates the operation of a wireless device (e.g., a UE) to provide early measurement reporting in response to an indication received in association with a paging procedure in accordance with some embodiments of the present disclosure.

In some embodiments, as illustrated in FIG. 20, the method comprises the following steps:

Step 2000: The UE (e.g., wireless device 1212) monitors for the potential reception of a message in the downlink (e.g., a paging message or any other message multiplexed with the paging message) in a cell that the UE is camping on.

Step 2002: The UE detects, upon the reception of that downlink message (or any other message multiplexed), the presence or absence of an indication that indicates that the UE shall report available early measurements (e.g., measurements taken while the UE was in an IDLE or INACTIVE mode) during a resume-like procedure. This shall be interpreted by the UE as a request to report early measurements during the state transition.

Step 2004 (Optional): The UE determines whether at least one early measurement is available at the UE.

Step 2006: The UE reports early measurements, if stored, according to the previous indication/request from the network in the RRC paging like message and/or in the message multiplexed in the paging message.

In some embodiments, the indication is included in an RRC Paging like message. In other embodiments, the indication is included in a UE Information Request like message, possibly multiplexed with the RRC Paging like message. In some embodiments, the resume like procedure is a connection resume, connection setup, connection establishment, connection reestablishment procedure, etc.

In conventional networks, early measurement indications are included in the UEInformationRequest message, which is sent on SRB1 and is integrity protected and encrypted using security keys to be used in the cell the UE has just resumed or setup the RRC connection with. In contrast, the present disclosure uses an RRC Paging like message, which is not security protected or integrity protected, as the UE does not start security (e.g., integrity protection/encryption) before it can decode a paging message or any message transmitted in a paging like channel. Hence, one aspect of the solution where the indication is sent to a specific UE is how the security requirements are fulfilled.

In some embodiments, the UE runs security in the INACTIVE state or the IDLE state using old keys used in the last source cell where the UE was in the CONNECTED state. Then, the UE decodes the message on the paging channel using old keys so it can interpret the indication for early measurement reporting. That message may be prepared by the source cell. That may include some assistance by the target cell, as will be described in more detail below.

In other embodiments, the UE runs security in the INACTIVE state or the IDLE state using new keys according to the cell the UE is camping on, i.e. where the UE is monitoring the paging channel. Hence, in these embodiments, at least upon the reception of each paging message the UE shall refresh security keys before it decodes the indication (either in the paging message or in the message multiplexed with the paging message in a paging like channel). That enables each target (in the RAN notification area) to possibly include that indication in the paging message received from the source in case of RAN paging (details described in the network embodiments).

From the network side, different embodiments are herein presented:

Solution 1: The network includes an indication of need for early measurements within the paging message. Once receiving such an indication, the UE can choose to report the measurements collected during the RRC_IDLE state or the RRC_INACTIVE STATE to the network.

In some embodiments, the indication for early idle/inactive measurements is decided by each target (in the RAN configuration area for the UE for which paging is addressed) receiving a paging request from the source node (that receives data and decides to perform RAN paging for UEs in the RRC_INACTIVE STATE). Then, a target includes the indication to be transmitted for that UE in the paging like channel, e.g. within the paging message or in another message multiplexed with the RRC Paging message, e.g. UE Information Request message. In that solution where the target includes the indication, the target may use new security keys to secure the indication that it wants early measurements, i.e. same keys to be later used in the target when the UE resumes (e.g., same key that will be used to encrypt and integrity protect the RRC Resume Request like message).

In some embodiments, the indication for early idle/inactive measurements is decided by the source having the UE AS Context. Then, a source includes the indication to be transmitted for that UE in the paging like channel, e.g. within the paging message or in another message multiplexed with the RRC Paging like message, e.g. UE Information Request message. In that solution where the source includes the indication, the source may use old security keys to secure the indication that it wants early measurements (or that a target may want early measurements), i.e. same keys to be later used in target when the UE resumes (e.g., same key that will be used to encrypt and integrity protect the RRC Resume Request like message). Notice that in this variant the source may know that the target wants early measurements by pre-populating the UE AS context and getting an indication that a neighbor may want early measurement of paging, e.g. depending which carriers have been decided by the source to be measured while the UE was in idle/inactive state.

Solution 2: The paging message itself could be an indication for the UE to report to the network the measurements collected during the RRC_IDLE state or the RRC_INACTIVE state.

There are, proposed herein, various embodiments which address one or more of the issues disclosed herein. Certain embodiments may provide one or more of the following technical advantage(s). If the indication for the need of early measurements is provided to the UE early, it would allow the network to get early idle/inactive measurements early enough, which can help the network decide in a timely way to setup/resume CA or DC. This translates in a better utilization of DC/CA options with a consequent high user throughput and low delays.

In some embodiments, the network sends an indication within the paging message to indicate to the UE to provide/report early measurements performed during IDLE/INACTIVE mode. In one embodiment, the indication is done by means of a new field within the paging message. In another embodiment, the indication for reporting early measurements is implicitly given by receiving the paging message itself (i.e., a UE configured for early measurement will assume the network will need the early measurements on resumption).

In another embodiment, the indication in the paging message triggers the UE to report available measurements that usually are performed in the RRC_IDLE state or the RRC_INACTIVE STATE to the network.

In some embodiments, upon receiving an indication that early measurements should be reported into the paging message, the UE indicates that it has an early measurement available in the RRCResumeRequest/RRCResumeRequest1 message. This can be done either by the introduction of a new field in these messages or using a new resume cause (e.g., mt-AccessEarlyMeas). In one embodiment, this new resume cause helps the UE to notify the network that early measurements are available. As an alternative, the UE sets the resume cause in the RRCResumeRequest/RRCResumeRequest1 message to, e.g., mo-DataEarlyMeas indicating that the resume request is for a Mobile Originated access (and that the UE has early measurements available). Yet, in another embodiment, the network knows that a UE has early measurements to send thanks to UE AS Context stored and fetched in the RRC procedure such as resume or handover.

In another embodiment, what we call a paging like message indicating the request to the UE for early measurements is a MAC like message, such as a MAC CE and/or a RAR, after the network receives a preamble and possibly identifies the UE. And, knowing that it wants to have available early measurements it requests the UE to report early measurements in the RAR or with a MAC CE.

In another embodiment, the UE is provided with a new paging identity (e.g., earlyMeasIdentity, or any appropriate abbreviation/acronym). In NR, a UE in the RRC_IDLE state or the RRC_INACTIVE state can be paged with the Core Network (CN) identity 5G System Architecture Evolution Temporary Mobile Subscriber Identity (S-TMSI) and an RRC_INACTIVE UE can also be paged with the I-RNTI. If the UE is paged with the 5G-S-TMSI while in the RRC_INACTIVE state, the UE enters RRC_IDLE and performs a Non-Access Stratum (NAS) recovery. If the UE is paged with the I-RNTI, the UE performs an RRC Resume procedure.

This new identity could either be provided by the CN, similar to the 5G-S-TMSI which would then be applicable for both RRC_IDLE and RRC_IDLE, or the new identity could be provided by the RAN, and thus be applicable only in the RRC_INACTIVE state (since the UE releases everything it has received from the RAN when entering RRC_IDLE).

The UE could receive this new identity in either RRC_CONNECTED with an RRCReconfiguration message, or in the RRCRelease message, possible within the SuspendConfig if it is to be used only in the RRC_INACTIVE state.

Thus, the UE would monitor paging from up to 3 different identities: the 5G-S-TMSI, the I-RNTI, and the new earlyMeasIdentity.

If the UE receives a paged with the earlyMeasIdentity, the UE would perform the early measurement procedures described elsewhere in the present disclosure (trigger early measurements, report stored measurements, etc.).

In another embodiment, the network broadcasts in one of the SIBs (e.g., SIB1/2/4, etc.) that it requires UEs that have available idle mode measurements to report these measurements upon resumption.

When the UE has implicitly or explicitly received an indication to send early measurements according to any of the embodiments described above, it will send the measurements at the first opportunity it gets to send the measurements (e.g., UEInformationResponse or MeasurementReport after RRCResumeComplete).

Figure 21:
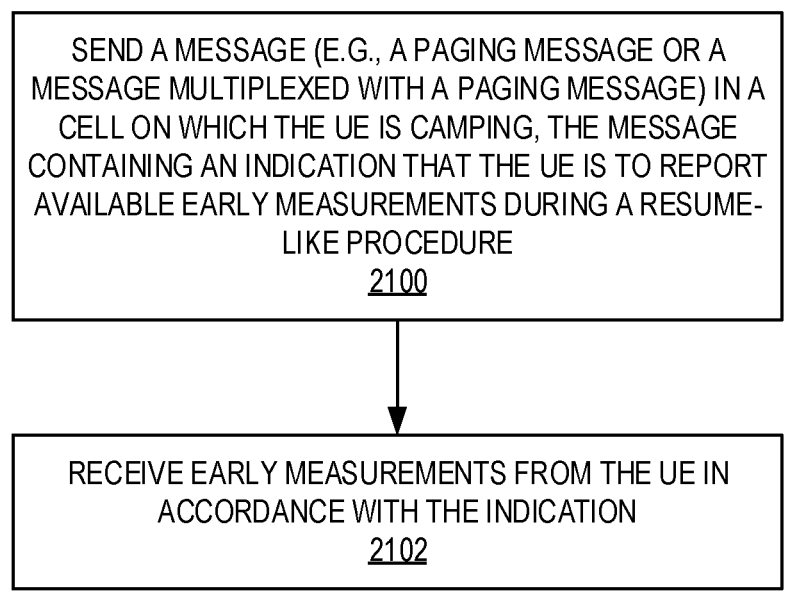
FIG. 21 is a flow chart that illustrates the operation of a network node to provide a request for early measurement reporting in association with a paging procedure in accordance with some embodiments of the present disclosure.

FIG. 21 is a flow chart that illustrates the operation of a network node for early measurement indication in association with a paging procedure in accordance with some embodiments of the present disclosure. In some embodiments, the network node comprises a Base Station (BS), an Access Point (AP), an eNB, a gNB, a Remote Radio Unit (RRU), or a RRH. The steps of the process are as follows:

Step 2100: The network node sends a message within a cell on which a UE is camping. The message comprises a paging message or a separate message that is multiplexed with the paging message. The message contains an indication that the UE is to report available early measurements during a resume like procedure. In some embodiments, the paging message comprises an RRC Paging message. In some embodiments, the separate message comprises a UEInformationRequest message. In some embodiments, the message contains security keys to be used by the UE to decode at least a portion of the message. In some embodiments, the resume like procedure comprises a connection resume procedure, a connection setup procedure, a connection establishment procedure, or a connection re-establishment procedure. In some embodiments, an early measurement comprises a measurement taken by the UE while the UE was in the RRC_IDLE state and/or the RRC_INACTIVE state.

Step 2102: The network node receives, from the UE, at least one early measurement in response to the sent message.

Some examples of possible implementations are as follows.

Case 1: Indication for Early Measurements within the Paging Message.

The following is an example of implementation for the case where an indication is added for early measurements into the paging message. The specification into which the following could be implemented is 3GPP TS 38.331.

---

5.3.2 Paging
The purpose of this procedure is:
  - to transmit paging information to a UE in the RRC_IDLE state or the RRC_INACTIVE state.
5.3.2.2 Initiation
The network initiates the paging procedure by transmitting the Paging message at the UE's paging occasion as specified in TS 38.304 [20]. The network may address multiple UEs within a Paging message by including one PagingRecord for each UE.
5.3.2.3 Reception of the Paging message by the UE
Upon receiving the Paging message, the UE shall:
  1> if in the RRC_IDLE state, for each of the PagingRecord, if any, included in the Paging message:
    2> if the ue-Identity included in the PagingRecord matches the UE identity allocated by upper layers:
      3> forward the ue-Identity and accessType (if present) to the upper layers;
    2> if needForEarlyMeas is included in the PagingRecord:
      3> initiate the RRC connection resumption procedure according to -continued

```
        5.3.13 with resumeCause set to mt-AccesEarlyMeas;
1> if in the RRC_INACTIVE state, for each of the PagingRecord, if any, included in
   the Paging message:
    2>  if the ue-Identity included in the PagingRecord matches the UE's stored
        fullI-RNTI:
        3> if the UE is configured by upper layers with access identity 1:
            4>initiate the RRC connection resumption procedure according to 5.3.13
              with resumeCause set to MPS-PriorityAccess;
        3> else if the UE is configured by upper layers with access identity 2:
            4>initiate the RRC connection resumption procedure according to 5.3.13
              with resumeCause set to MCS-PriorityAccess;
        3> else if the UE is configured by upper layers with one or more access
           identities equal to 11-15:
            4>initiate the RRC connection resumption procedure according to 5.3.13
              with resumeCause set to highPriorityAccess,
        3> else:
            4> if needForEarlyMeas is included in the PagingRecord:
              1 5> initiate the RRC connection resumption procedure
                 according to 5.3.13 with resumeCause set to mt-
                 AccessEarlyMeas;
            4> else:
              2 5> initiate the RRC connection resumption procedure according to
                 5.3.13 with resumeCause set to mt-Access;
    2>  else if the ue-Identity included in the PagingRecord matches the UE
        identity allocated by upper layers:
        3> forward the ue-Identity to upper layers and accessType (if present) to
           the upper layers;
        3> perform the actions upon going to RRC_IDLE as specified in 5.3.11 with
           release cause 'other'.
```

The IE ResumeCause is used to indicate the resume cause in RRCResumeRequestand RRCResumeRequest1.

| ResumeCause information element |
| --- |
| -- ASN1START |
| -- TAG-RESUME-CAUSE-START |
| ResumeCause ::=    ENUMERATED {emergency, highPriorityAccess, mt-Access, mo-Signalling, |
| ~~mo-Data, mo-VoiceCall, mo-VideoCall, mo-SMS, rna-Update, mps-PriorityAccess, mcs-PriorityAccess,~~ mt-AcessEarlyMeas, mo-DataEarlyMeas    spare1, spare2, spare3, ~~spare4, spare5~~ } |
| -- TAG-RESUME-CAUSE-STOP |
| -- ASN1STOP |
| -  Paging |
| The Paging message is used for the notification of one or more UEs. |
| Signalling radio bearer: N/A |
| RLC-SAP: TM |
| Logical channel: PCCH |
| Direction: Network to UE |

| Paging message |
| --- |
| -- ASN1START |
| -- TAG-PAGING-START |
| Paging ::=       SEQUENCE { |
|   pagingRecordList        PagingRecordList    OPTIONAL, -- Need N |
|   lateNonCriticalExtension     OCTET STRING OPTIONAL, |
|   nonCriticalExtension     SEQUENCE{ }   OPTIONAL |
| } |
| PagingRecordList ::=    SEQUENCE (SIZE(1..maxNrofPageRec)) OF PagingRecord |
| PagingRecord ::=     SEQUENCE { |
|   ue-Identity        PagingUE-Identity, |
|   accessType        ENUMERATED {non3GPP}  OPTIONAL,  -- Need N |
|   ... |
|   [[ needForEarlyMeas           ENUMERATED {true}  OPTIONAL, |
|   ]] |
| } |

```
PagingUE-Identity ::=       CHOICE {
    ng-5G-S-TMSI                NG-5G-S-TMSI,
    fullI-RNTI                  I-RNTI-Value,
    ...
}
-- TAG-PAGING-STOP
-- ASN1STOP
```

PagingRecord field descriptions accessType
It indicates whether Paging is originated due to the PDU sessions from the non-3GPP access.
needForEarlyMeas
It indicates that idle or inactive measurements should be reported.

Figure 22:
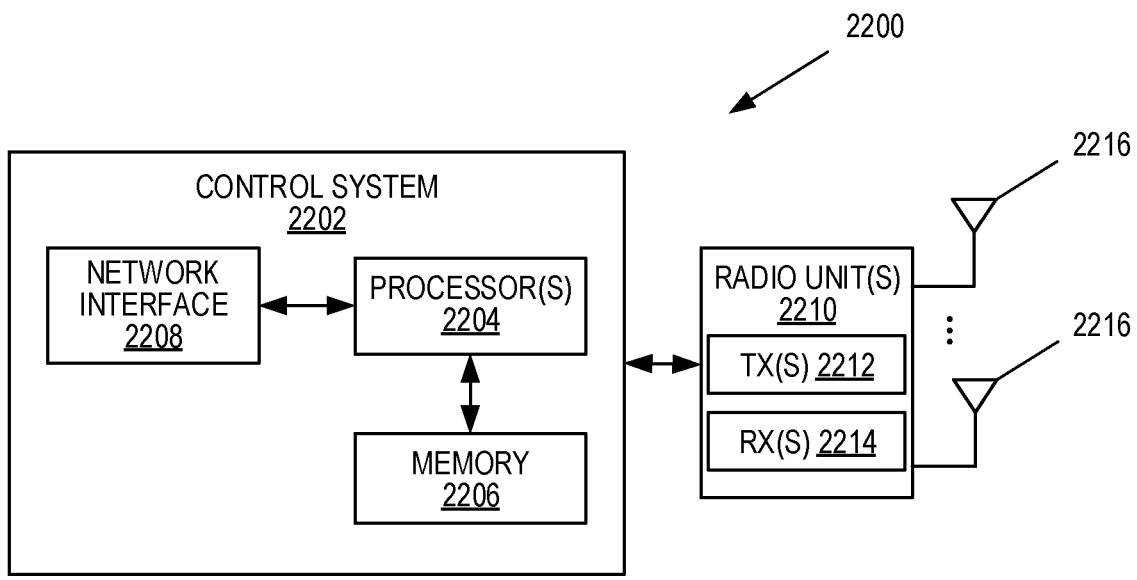
FIGS. 22 through 24 are schematic block diagrams of example embodiments of a radio access node.

FIG. 22 is a schematic block diagram of a radio access node 2200 according to some embodiments of the present disclosure. The radio access node 2200 may be, for example, a base station 1202 or 1206. As illustrated, the radio access node 2200 includes a control system 2202 that includes one or more processors 2204 (e.g., Central Processing Units (CPUs), Application Specific Integrated Circuits (ASICs), Field Programmable Gate Arrays (FPGAs), and/or the like), memory 2206, and a network interface 2208. The one or more processors 2204 are also referred to herein as processing circuitry. In addition, the radio access node 2200 includes one or more radio units 2210 that each includes one or more transmitters 2212 and one or more receivers 2214 coupled to one or more antennas 2216. The radio units 2210 may be referred to or be part of radio interface circuitry. In some embodiments, the radio unit(s) 2210 is external to the control system 2202 and connected to the control system 2202 via, e.g., a wired connection (e.g., an optical cable). However, in some other embodiments, the radio unit(s) 2210 and potentially the antenna(s) 2216 are integrated together with the control system 2202. The one or more processors 2204 operate to provide one or more functions of a radio access node 2200 as described herein (e.g., one or more functions of a network node or base station described above, e.g., with respect to FIGS. 15, 16, 17, 18, and/or 21). In some embodiments, the function(s) are implemented in software that is stored, e.g., in the memory 2206 and executed by the one or more processors 2204.

Figure 23:
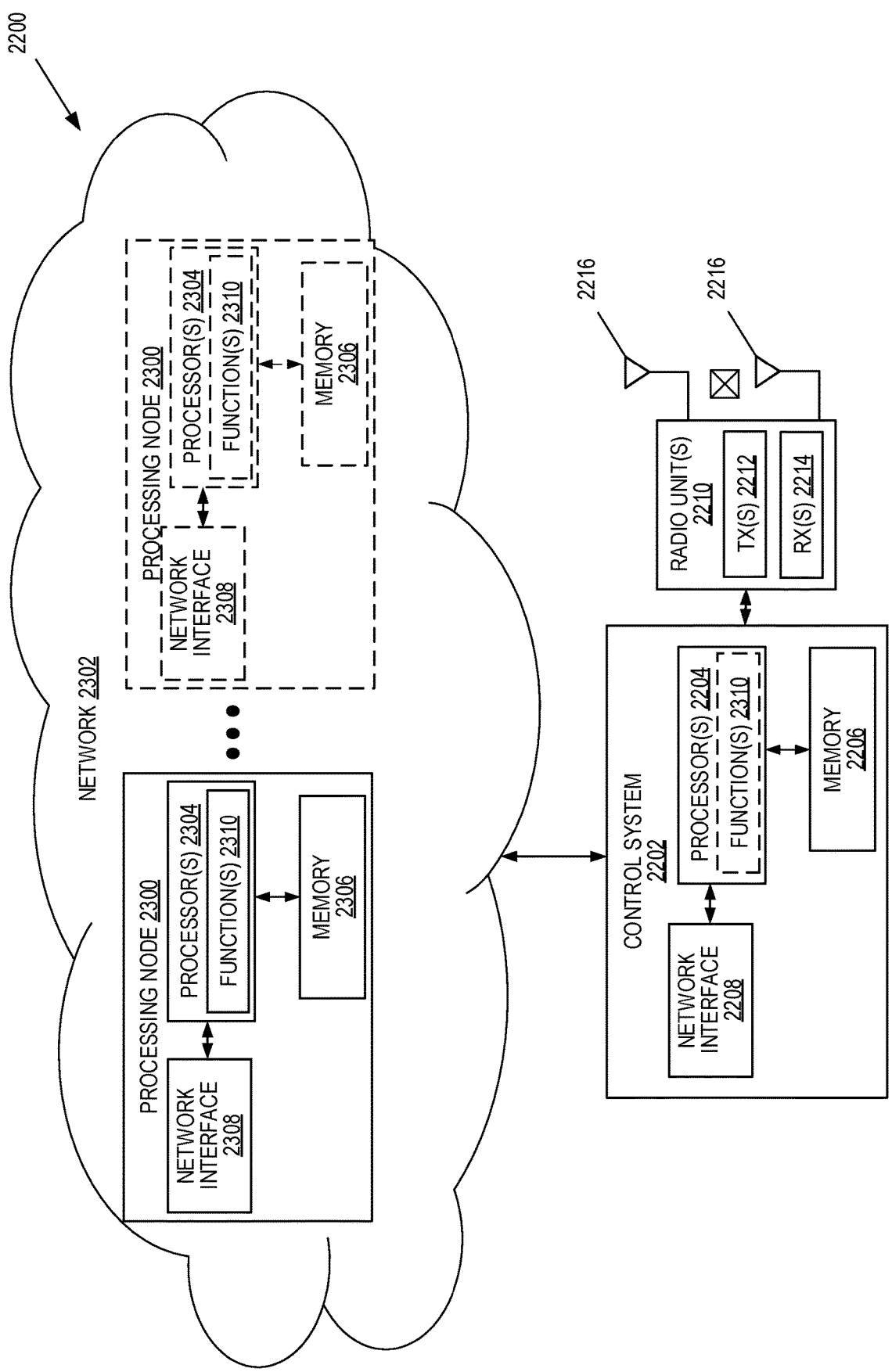

FIG. 23 is a schematic block diagram that illustrates a virtualized embodiment of the radio access node 2200 according to some embodiments of the present disclosure. This discussion is equally applicable to other types of network nodes. Further, other types of network nodes may have similar virtualized architectures.

As used herein, a "virtualized" radio access node is an implementation of the radio access node 2200 in which at least a portion of the functionality of the radio access node 2200 is implemented as a virtual component(s) (e.g., via a virtual machine(s) executing on a physical processing node(s) in a network(s)). As illustrated, in this example, the radio access node 2200 includes the control system 2202 that includes the one or more processors 2204 (e.g., CPUs, ASICs, FPGAs, and/or the like), the memory 2206, and the network interface 2208 and the one or more radio units 2210 that each includes the one or more transmitters 2212 and the one or more receivers 2214 coupled to the one or more antennas 2216, as described above. The control system 2202 is connected to the radio unit(s) 2210 via, for example, an optical cable or the like. The control system 2202 is connected to one or more processing nodes 2300 coupled to or included as part of a network(s) 2302 via the network interface 2208. Each processing node 2300 includes one or more processors 2304 (e.g., CPUs, ASICs, FPGAs, and/or the like), memory 2306, and a network interface 2308.

In this example, functions 2310 of the radio access node 2200 described herein (e.g., one or more functions of a network node or base station described above, e.g., with respect to FIGS. 15, 16, 17, 18, and/or 21) are implemented at the one or more processing nodes 2300 or distributed across the control system 2202 and the one or more processing nodes 2300 in any desired manner. In some particular embodiments, some or all of the functions 2310 of the radio access node 2200 described herein (e.g., one or more functions of a network node or base station described above, e.g., with respect to FIGS. 15, 16, 17, 18, and/or 21) are implemented as virtual components executed by one or more virtual machines implemented in a virtual environment(s) hosted by the processing node(s) 2300. As will be appreciated by one of ordinary skill in the art, additional signaling or communication between the processing node(s) 2300 and the control system 2202 is used in order to carry out at least some of the desired functions 2310. Notably, in some embodiments, the control system 2202 may not be included, in which case the radio unit(s) 2210 communicate directly with the processing node(s) 2300 via an appropriate network interface(s).

In some embodiments, a computer program including instructions which, when executed by at least one processor, causes the at least one processor to carry out the functionality of radio access node 2200 or a node (e.g., a processing node 2300) implementing one or more of the functions 2310 of the radio access node 2200 (e.g., one or more functions of a network node or base station described above, e.g., with respect to FIGS. 15, 16, 17, 18, and/or 21) in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 24:
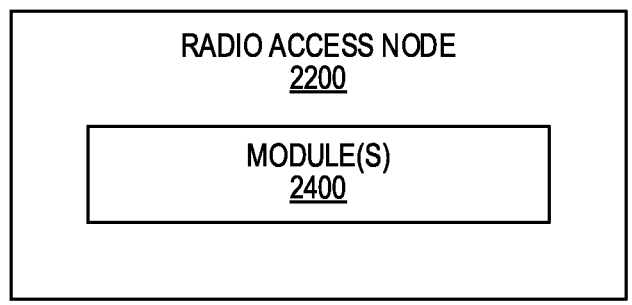

FIG. 24 is a schematic block diagram of the radio access node 2200 according to some other embodiments of the present disclosure. The radio access node 2200 includes one or more modules 2400, each of which is implemented in software. The module(s) 2400 provide the functionality of the radio access node 2200 described herein (e.g., one or more functions of a network node or base station described above, e.g., with respect to FIGS. 15, 16, 17, 18, and/or 21). This discussion is equally applicable to the processing node 2300 of FIG. 23 where the modules 2400 may be implemented at one of the processing nodes 2300 or distributed across multiple processing nodes 2300 and/or distributed across the processing node(s) 2300 and the control system 2202.

Figure 25:
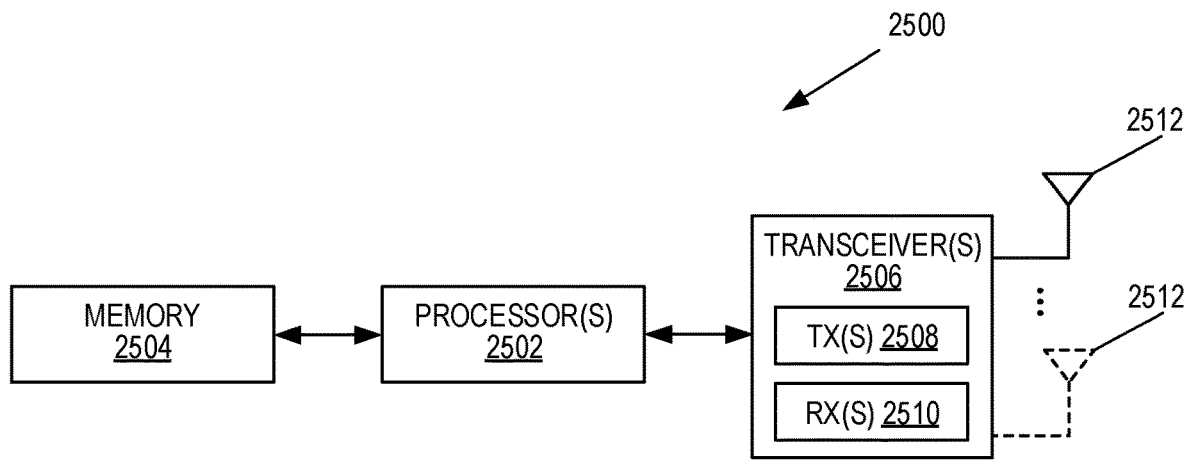
FIGS. 25 and 26 are schematic block diagrams of example blocks diagrams of a UE.

FIG. 25 is a schematic block diagram of a UE 2500 according to some embodiments of the present disclosure. As illustrated, the UE 2500 includes one or more processors 2502 (e.g., CPUs, ASICs, FPGAs, and/or the like), memory 2504, and one or more transceivers 2506 each including one or more transmitters 2508 and one or more receivers 2510 coupled to one or more antennas 2512. The transceiver(s) 2506 includes radio-front end circuitry connected to the antenna(s) 2512 that is configured to condition signals communicated between the antenna(s) 2512 and the processor(s) 2502, as will be appreciated by on of ordinary skill in the art. The processors 2502 are also referred to herein as processing circuitry. The transceivers 2506 are also referred to herein as radio circuitry. In some embodiments, the functionality of the UE 2500 described above (e.g., one or more functions of a wireless device or UE described above, e.g., with respect to FIGS. 13, 16, 17, 18, and/or 20) may be fully or partially implemented in software that is, e.g., stored in the memory 2504 and executed by the processor(s) 2502. Note that the UE 2500 may include additional components not illustrated in FIG. 25 such as, e.g., one or more user interface components (e.g., an input/output interface including a display, buttons, a touch screen, a microphone, a speaker(s), and/or the like and/or any other components for allowing input of information into the UE 2500 and/or allowing output of information from the UE 2500), a power supply (e.g., a battery and associated power circuitry), etc.

In some embodiments, a computer program including instructions which, when executed by at least one processor, causes the at least one processor to carry out the functionality of the UE 2500 according to any of the embodiments described herein (e.g., one or more functions of a wireless device or UE described above, e.g., with respect to FIGS. 13, 16, 17, 18, and/or 20) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 26:
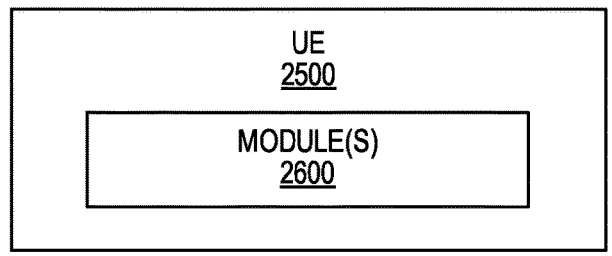

FIG. 26 is a schematic block diagram of the UE 2500 according to some other embodiments of the present disclosure. The UE 2500 includes one or more modules 2600, each of which is implemented in software. The module(s) 2600 provide the functionality of the UE 2500 described herein (e.g., one or more functions of a wireless device or UE described above, e.g., with respect to FIGS. 13, 16, 17, 18, and/or 20).

Figure 27:
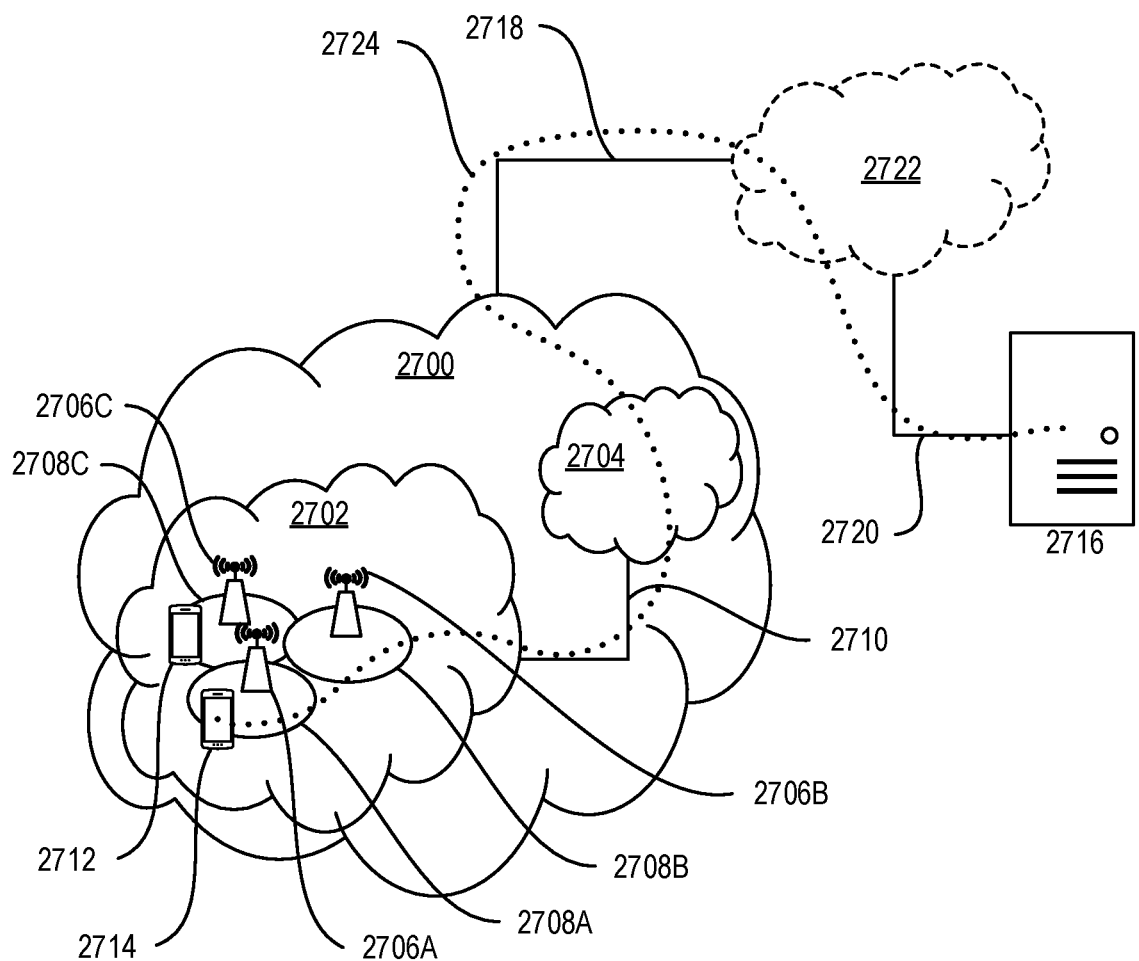
FIG. 27 illustrates one example of a system in which embodiments of the present disclosure may be implemented.

With reference to FIG. 27, in accordance with an embodiment, a communication system includes a telecommunication network 2700, such as a 3GPP-type cellular network, which comprises an access network 2702, such as a RAN, and a core network 2704. The access network 2702 comprises a plurality of base stations 2706A, 2706B, 2706C, such as Node Bs, eNBs, gNBs, or other types of wireless APs, each defining a corresponding coverage area 2708A, 2708B, 2708C. Each base station 2706A, 2706B, 2706C is connectable to the core network 2704 over a wired or wireless connection 2710. A first UE 2712 located in coverage area 2708C is configured to wirelessly connect to, or be paged by, the corresponding base station 2706C. A second UE 2714 in coverage area 2708A is wirelessly connectable to the corresponding base station 2706A. While a plurality of UEs 2712, 2714 are illustrated in this example, the disclosed embodiments are equally applicable to a situation where a sole UE is in the coverage area or where a sole UE is connecting to the corresponding base station 2706.

The telecommunication network 2700 is itself connected to a host computer 2716, which may be embodied in the hardware and/or software of a standalone server, a cloud-implemented server, a distributed server, or as processing resources in a server farm. The host computer 2716 may be under the ownership or control of a service provider, or may be operated by the service provider or on behalf of the service provider. Connections 2718 and 2720 between the telecommunication network 2700 and the host computer 2716 may extend directly from the core network 2704 to the host computer 2716 or may go via an optional intermediate network 2722. The intermediate network 2722 may be one of, or a combination of more than one of, a public, private, or hosted network; the intermediate network 2722, if any, may be a backbone network or the Internet; in particular, the intermediate network 2722 may comprise two or more sub-networks (not shown).

The communication system of FIG. 27 as a whole enables connectivity between the connected UEs 2712, 2714 and the host computer 2716. The connectivity may be described as an Over-the-Top (OTT) connection 2724. The host computer 2716 and the connected UEs 2712, 2714 are configured to communicate data and/or signaling via the OTT connection 2724, using the access network 2702, the core network 2704, any intermediate network 2722, and possible further infrastructure (not shown) as intermediaries. The OTT connection 2724 may be transparent in the sense that the participating communication devices through which the OTT connection 2724 passes are unaware of routing of uplink and downlink communications. For example, the base station 2706 may not or need not be informed about the past routing of an incoming downlink communication with data originating from the host computer 2716 to be forwarded (e.g., handed over) to a connected UE 2712. Similarly, the base station 2706 need not be aware of the future routing of an outgoing uplink communication originating from the UE 2712 towards the host computer 2716.

Example implementations, in accordance with an embodiment, of the UE, base station, and host computer discussed in the preceding paragraphs will now be described with reference to FIG. 28. In a communication system 2800, a host computer 2802 comprises hardware 2804 including a communication interface 2806 configured to set up and maintain a wired or wireless connection with an interface of a different communication device of the communication system 2800. The host computer 2802 further comprises processing circuitry 2808, which may have storage and/or processing capabilities. In particular, the processing circuitry 2808 may comprise one or more programmable processors, ASICs, FPGAs, or combinations of these (not shown) adapted to execute instructions. The host computer 2802 further comprises software 2810, which is stored in or accessible by the host computer 2802 and executable by the processing circuitry 2808. The software 2810 includes a host application 2812. The host application 2812 may be operable to provide a service to a remote user, such as a UE 2814 connecting via an OTT connection 2816 terminating at the UE 2814 and the host computer 2802. In providing the service to the remote user, the host application 2812 may provide user data which is transmitted using the OTT connection 2816.

The communication system 2800 further includes a base station 2818 provided in a telecommunication system and comprising hardware 2820 enabling it to communicate with the host computer 2802 and with the UE 2814. The hardware 2820 may include a communication interface 2822 for setting up and maintaining a wired or wireless connection with an interface of a different communication device of the communication system 2800, as well as a radio interface 2824 for setting up and maintaining at least a wireless connection 2826 with the UE 2814 located in a coverage area (not shown in FIG. 28) served by the base station 2818. The communication interface 2822 may be configured to facilitate a connection 2828 to the host computer 2802. The connection 2828 may be direct or it may pass through a core network (not shown in FIG. 28) of the telecommunication system and/or through one or more intermediate networks outside the telecommunication system. In the embodiment shown, the hardware 2820 of the base station 2818 further includes processing circuitry 2830, which may comprise one or more programmable processors, ASICs, FPGAs, or combinations of these (not shown) adapted to execute instructions. The base station 2818 further has software 2832 stored internally or accessible via an external connection.

The communication system 2800 further includes the UE 2814 already referred to. The UE's 2814 hardware 2834 may include a radio interface 2836 configured to set up and maintain a wireless connection 2826 with a base station serving a coverage area in which the UE 2814 is currently located. The hardware 2834 of the UE 2814 further includes processing circuitry 2838, which may comprise one or more programmable processors, ASICs, FPGAs, or combinations of these (not shown) adapted to execute instructions. The UE 2814 further comprises software 2840, which is stored in or accessible by the UE 2814 and executable by the processing circuitry 2838. The software 2840 includes a client application 2842. The client application 2842 may be operable to provide a service to a human or non-human user via the UE 2814, with the support of the host computer 2802. In the host computer 2802, the executing host application 2812 may communicate with the executing client application 2842 via the OTT connection 2816 terminating at the UE 2814 and the host computer 2802. In providing the service to the user, the client application 2842 may receive request data from the host application 2812 and provide user data in response to the request data. The OTT connection 2816 may transfer both the request data and the user data. The client application 2842 may interact with the user to generate the user data that it provides.

Figure 28:
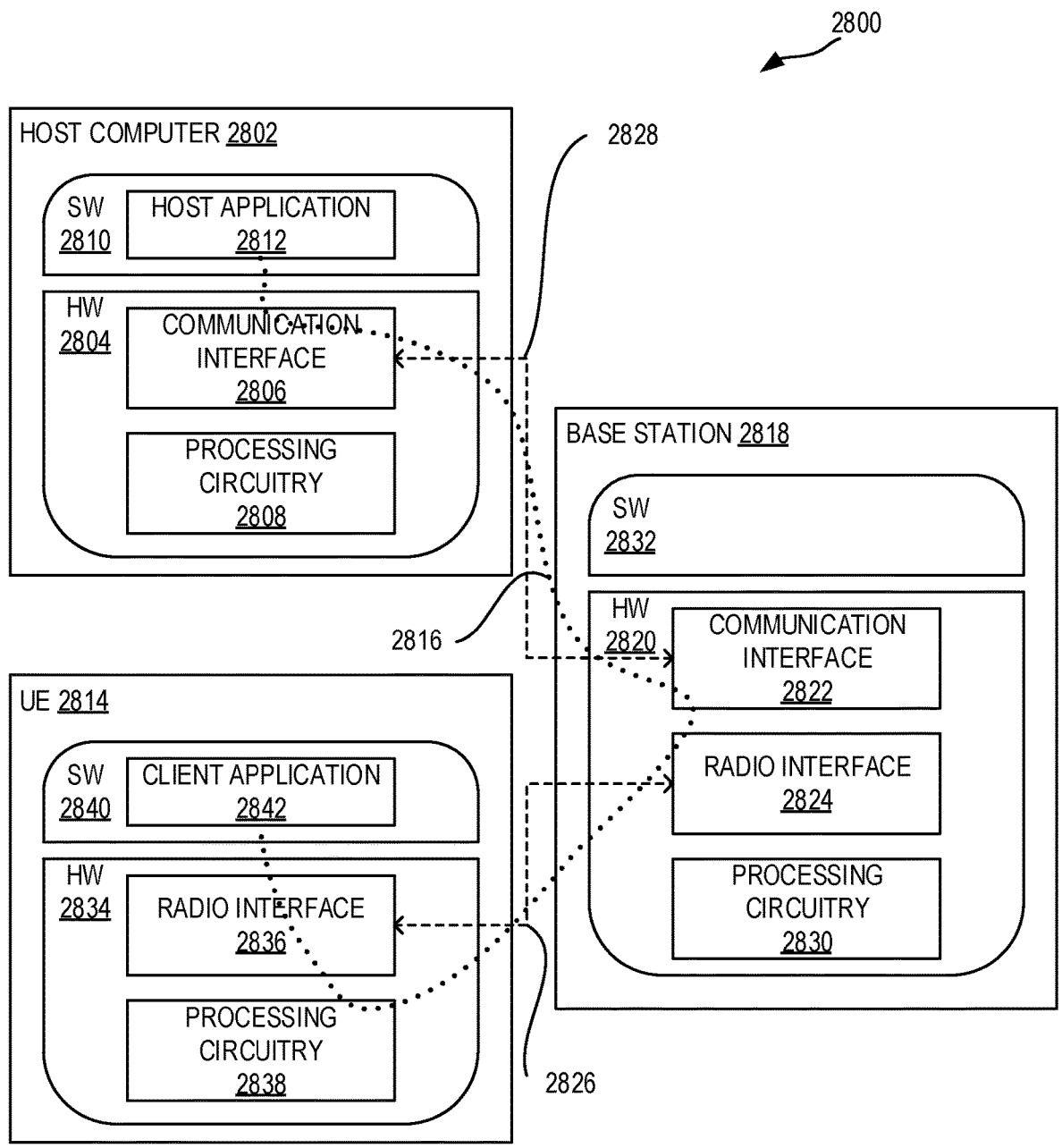
FIG. 28 illustrates example embodiments of the host computer, base station, and UE of the system of FIG. 27.

It is noted that the host computer 2802, the base station 2818, and the UE 2814 illustrated in FIG. 28 may be similar or identical to the host computer 2716, one of the base stations 2706A, 2706B, 2706C, and one of the UEs 2712, 2714 of FIG. 27, respectively. This is to say, the inner workings of these entities may be as shown in FIG. 28 and independently, the surrounding network topology may be that of FIG. 27.

In FIG. 28, the OTT connection 2816 has been drawn abstractly to illustrate the communication between the host computer 2802 and the UE 2814 via the base station 2818 without explicit reference to any intermediary devices and the precise routing of messages via these devices. The network infrastructure may determine the routing, which may be configured to hide from the UE 2814 or from the service provider operating the host computer 2802, or both. While the OTT connection 2816 is active, the network infrastructure may further take decisions by which it dynamically changes the routing (e.g., on the basis of load balancing consideration or reconfiguration of the network).

The wireless connection 2826 between the UE 2814 and the base station 2818 is in accordance with the teachings of the embodiments described throughout this disclosure. One or more of the various embodiments improve the performance of OTT services provided to the UE 2814 using the OTT connection 2816, in which the wireless connection 2826 forms the last segment. More precisely, the teachings of these embodiments may improve e.g., data rate, latency, and/or power consumption and thereby provide benefits such as, e.g., reduced user waiting time, relaxed restriction on file size, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 2816 between the host computer 2802 and the UE 2814, in response to variations in the measurement results. The measurement procedure and/or the network functionality for reconfiguring the OTT connection 2816 may be implemented in the software 2810 and the hardware 2804 of the host computer 2802 or in the software 2840 and the hardware 2834 of the UE 2814, or both. In some embodiments, sensors (not shown) may be deployed in or in association with communication devices through which the OTT connection 2816 passes; the sensors may participate in the measurement procedure by supplying values of the monitored quantities exemplified above, or supplying values of other physical quantities from which the software 2810, 2840 may compute or estimate the monitored quantities. The reconfiguring of the OTT connection 2816 may include message format, retransmission settings, preferred routing, etc.; the reconfiguring need not affect the base station 2818, and it may be unknown or imperceptible to the base station 2818. Such procedures and functionalities may be known and practiced in the art. In certain embodiments, measurements may involve proprietary UE signaling facilitating the host computer 2802's measurements of throughput, propagation times, latency, and the like. The measurements may be implemented in that the software 2810 and 2840 causes messages to be transmitted, in particular empty or 'dummy' messages, using the OTT connection 2816 while it monitors propagation times, errors, etc.

FIG. 29 is a flowchart illustrating a method implemented in a communication system, in accordance with one embodiment. The communication system includes a host computer, a base station, and a UE which may be those described with reference to FIGS. 27 and 28. For simplicity of the present disclosure, only drawing references to FIG. 29 will be included in this section. In step 2900, the host computer provides user data. In sub-step 2902 (which may be optional) of step 2900, the host computer provides the user data by executing a host application. In step 2904, the host computer initiates a transmission carrying the user data to the UE. In step 2906 (which may be optional), the base station transmits to the UE the user data which was carried in the transmission that the host computer initiated, in accordance with the teachings of the embodiments described throughout this disclosure. In step 2908 (which may also be optional), the UE executes a client application associated with the host application executed by the host computer.

FIG. 30 is a flowchart illustrating a method implemented in a communication system, in accordance with one embodiment. The communication system includes a host computer, a base station, and a UE which may be those described with reference to FIGS. 27 and 28. For simplicity of the present disclosure, only drawing references to FIG. 30 will be included in this section. In step 3000 of the method, the host computer provides user data. In an optional sub-step (not shown) the host computer provides the user data by executing a host application. In step 3002, the host computer initiates a transmission carrying the user data to the UE. The transmission may pass via the base station, in accordance with the teachings of the embodiments described throughout this disclosure. In step 3004 (which may be optional), the UE receives the user data carried in the transmission.

Figures 31, 32:
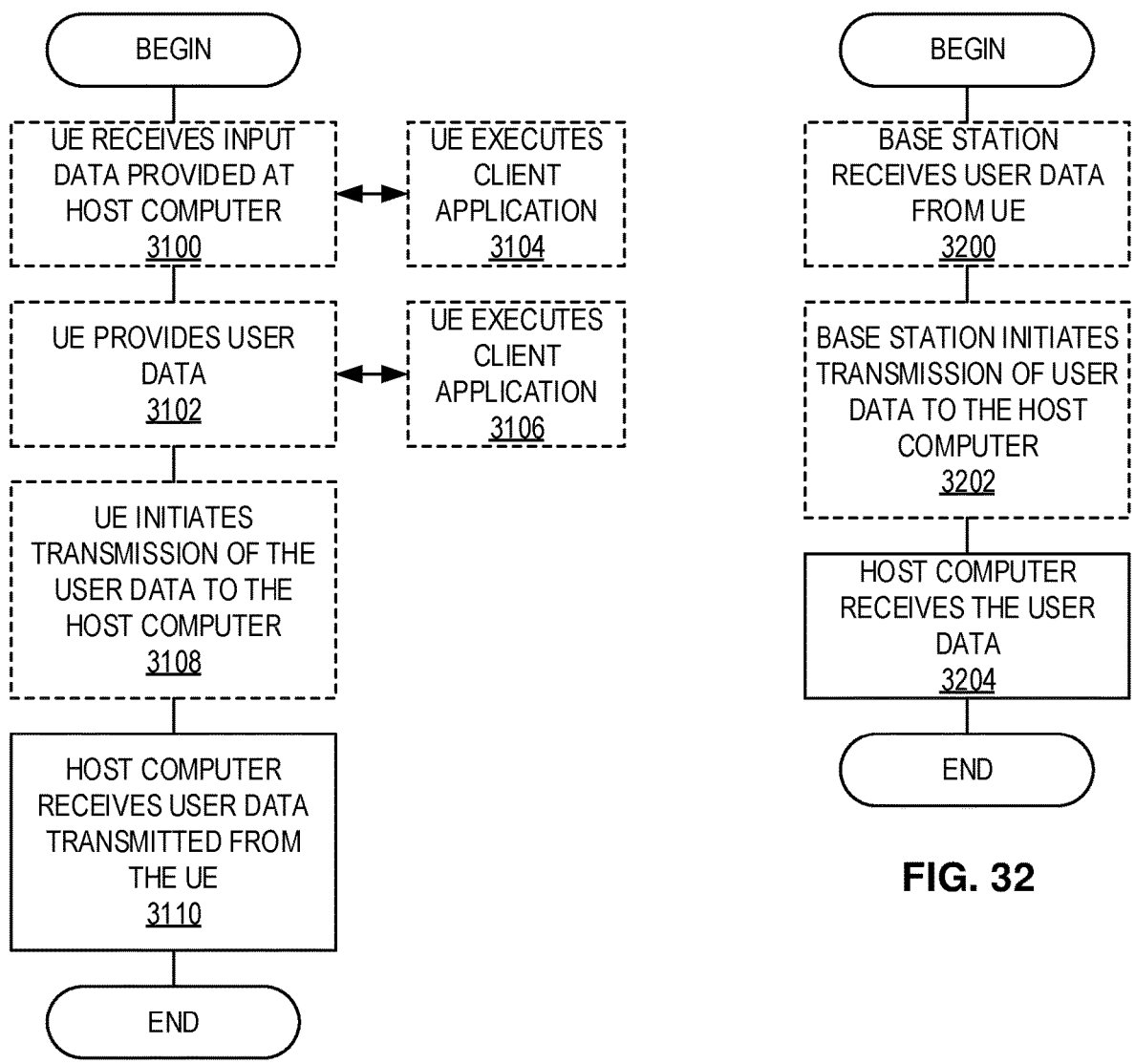

FIG. 31 is a flowchart illustrating a method implemented in a communication system, in accordance with one embodiment. The communication system includes a host computer, a base station, and a UE which may be those described with reference to FIGS. 27 and 28. For simplicity of the present disclosure, only drawing references to FIG. 31 will be included in this section. In step 3100 (which may be optional), the UE receives input data provided by the host computer. Additionally or alternatively, in step 3102, the UE provides user data. In sub-step 3104 (which may be optional) of step 3100, the UE provides the user data by executing a client application. In sub-step 3106 (which may be optional) of step 3102, the UE executes a client application which provides the user data in reaction to the received input data provided by the host computer. In providing the user data, the executed client application may further consider user input received from the user. Regardless of the specific manner in which the user data was provided, the UE initiates, in sub-step 3108 (which may be optional), transmission of the user data to the host computer. In step 3110 of the method, the host computer receives the user data transmitted from the UE, in accordance with the teachings of the embodiments described throughout this disclosure.

FIG. 32 is a flowchart illustrating a method implemented in a communication system, in accordance with one embodiment. The communication system includes a host computer, a base station, and a UE which may be those described with reference to FIGS. 27 and 28. For simplicity of the present disclosure, only drawing references to FIG. 32 will be included in this section. In step 3200 (which may be optional), in accordance with the teachings of the embodiments described throughout this disclosure, the base station receives user data from the UE. In step 3202 (which may be optional), the base station initiates transmission of the received user data to the host computer. In step 3204 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Group A Embodiments

Embodiment 1: A method performed by a wireless device, the method comprising: transmitting (1312, 1602, 1706, 1808), to a network node, measurements with a first message (e.g., a Radio Resource Control, RRC, Resume Request like message) to request resuming of a connection (e.g., an RRC connection) with a target cell, the measurements being measurements performed by the wireless device while in a dormant state.

Embodiment 2: The method of embodiment 1 further comprising performing and storing (1302) the measurement while in the dormant state.

Embodiment 3: The method of embodiment 1 or 2 wherein transmitting (1312, 1602, 1706, 1808) the measurements comprises transmitting (1312, 1602, 1808) a separate message that is multiplexed with the first message, the separate message comprising the measurements.

Embodiment 4: The method of embodiment 1 or 2 wherein transmitting (1312, 1602, 1706, 1808) the measurements comprises transmitting (1312, 1602, 1706) the first message, the first message comprising the measurements.

Embodiment 5: The method of any one of embodiments 1 to 4 wherein the first message is an RRC Resume Request like message.

Embodiment 6: The method of any one of embodiments 1 to 5 further comprising, prior to transmitting (1312, 1602, 1706, 1808) the measurements, identifying (1304, 1702, 1802) that the target cell supports early measurement reporting.

Embodiment 7: The method of any one of embodiments 1 to 6 further comprising, prior to transmitting (1312, 1602, 1706, 1808) the measurements, transmitting (1700, 1800) a random access preamble that indicates that the wireless device has measurements available for reporting.

Embodiment 8: The method of any one of embodiments 1 to 7 further comprising receiving (1702, 1802) a random access response that indicates that the wireless device is to report early measurements.

Embodiment 9: The method of any of the previous embodiments, further comprising: providing user data; and forwarding the user data to a host computer via the transmission to the network node.

Group B Embodiments

Embodiment 10: A method performed by a base station, the method comprising: receiving (1506, 1602, 1706, 1808), from a wireless device, measurements with a first message (e.g., a Radio Resource Control, RRC, Resume Request like message) to request resuming of a connection (e.g., an RRC connection) with a target cell, the measurements being measurements performed by the wireless device while in a dormant state.

Embodiment 11: The method of embodiment 10 further comprising performing (1508 and/or 1510, 1604, 1708, 1810) one or more tasks based on the measurements.

Embodiment 12: The method of embodiment 10 or 11 wherein receiving (1506, 1602, 1706, 1808) the measurements comprises receiving (1506, 1602, 1808) a separate message that is multiplexed with the first message, the separate message comprising the measurements.

Embodiment 13: The method of embodiment 10 or 11 wherein receiving (1506, 1602, 1706, 1808) the measurements comprises receiving (1506, 1602, 1706) the first message, the first message comprising the measurements.

Embodiment 14: The method of any one of embodiments 10 to 13 wherein the first message is an RRC Resume Request like message.

Embodiment 15: The method of any one of embodiments 10 to 14 further comprising, prior to receiving (1506, 1602, 1706, 1808) the measurements, transmitting (1500) an indication that the target cell supports early measurement reporting.

Embodiment 16: The method of any one of embodiments 10 to 14 further comprising, prior to receiving (1506, 1602, 1706, 1808) the measurements, identifying (1502) that the wireless device has available early measurements.

Embodiment 17: The method of embodiment 16 wherein identifying (1502) that the wireless device has available early measurements comprises receiving (1700, 1800) a random access preamble that indicates that the wireless device has measurements available for reporting.

Embodiment 18: The method of any one of embodiments 10 to 17 further comprising transmitting (1504) an indication for the UE to include early measurements with the first message.

Embodiment 19: The method of embodiment 18 wherein transmitting (1504) an indication for the UE to include early measurements with the first message comprises transmitting (1702, 1802) a random access response that indicates that the wireless device is to report early measurements.

Embodiment 20: The method of any of the previous embodiments, further comprising: obtaining user data; and forwarding the user data to a host computer or a wireless device.

Group C Embodiments

Embodiment 21: A wireless device, the wireless device comprising: processing circuitry configured to perform any of the steps of any of the Group A embodiments; and power supply circuitry configured to supply power to the wireless device.

Embodiment 22: A base station, the base station comprising: processing circuitry configured to perform any of the steps of any of the Group B embodiments; and power supply circuitry configured to supply power to the base station.

Embodiment 23: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 24: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 25: The communication system of the previous embodiment further including the base station.

Embodiment 26: The communication system of the previous 2 embodiments, further including the UE, wherein the UE is configured to communicate with the base station.

Embodiment 27: The communication system of the previous 3 embodiments, wherein: the processing circuitry of the host computer is configured to execute a host application, thereby providing the user data; and the UE comprises processing circuitry configured to execute a client application associated with the host application.

Embodiment 28: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 29: The method of the previous embodiment, further comprising, at the base station, transmitting the user data.

Embodiment 30: The method of the previous 2 embodiments, wherein the user data is provided at the host computer by executing a host application, the method further comprising, at the UE, executing a client application associated with the host application.

Embodiment 31: A User Equipment, UE, configured to communicate with a base station, the UE comprising a radio interface and processing circuitry configured to perform the method of the previous 3 embodiments.

Embodiment 32: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 33: The communication system of the previous embodiment, wherein the cellular network further includes a base station configured to communicate with the UE.

Embodiment 34: The communication system of the previous 2 embodiments, wherein: the processing circuitry of the host computer is configured to execute a host application, thereby providing the user data; and the UE's processing circuitry is configured to execute a client application associated with the host application.

Embodiment 35: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 36: The method of the previous embodiment, further comprising at the UE, receiving the user data from the base station.

Embodiment 37: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 38: The communication system of the previous embodiment, further including the UE.

Embodiment 39: The communication system of the previous 2 embodiments, further including the base station, wherein the base station comprises a radio interface configured to communicate with the UE and a communication interface configured to forward to the host computer the user data carried by a transmission from the UE to the base station.

Embodiment 40: The communication system of the previous 3 embodiments, wherein: the processing circuitry of the host computer is configured to execute a host application; and the UE's processing circuitry is configured to execute a client application associated with the host application, thereby providing the user data.

Embodiment 41: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 42: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 43: The method of the previous embodiment, further comprising, at the UE, providing the user data to the base station.

Embodiment 44: The method of the previous 2 embodiments, further comprising: at the UE, executing a client application, thereby providing the user data to be transmitted; and at the host computer, executing a host application associated with the client application.

Embodiment 45: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 46: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 47: The communication system of the previous embodiment further including the base station.

Embodiment 48: The communication system of the previous 2 embodiments, further including the UE, wherein the UE is configured to communicate with the base station.

Embodiment 49: The communication system of the previous 3 embodiments, wherein: the processing circuitry of the host computer is configured to execute a host application; and the UE is configured to execute a client application associated with the host application, thereby providing the user data to be received by the host computer.

Embodiment 50: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 51: The method of the previous embodiment, further comprising at the base station, receiving the user data from the UE.

Embodiment 52: The method of the previous 2 embodiments, further comprising at the base station, initiating a transmission of the received user data to the host computer.

Group D Embodiments

Embodiment 53: A method, performed by a User Equipment, UE, for early measurement indication in a paging procedure, the method comprising: receiving a message in a cell on which the UE is camping, the message comprising a paging message or a message that is multiplexed with the paging message and is not a paging message; detecting that the message contains an indication that the UE shall report available early measurements during a resume-like procedure; determining whether any early measurements are available; and, upon a determination that at least one early measurement is available, reporting the at least one early measurement.

Embodiment 54: The method of embodiment 53 wherein the paging message comprises a Radio Resource Control, RRC, Paging message.

Embodiment 55: The method of embodiment 53 or 54 wherein the other message that is not a paging message comprises a UEInformationRequest message.

Embodiment 56: The method of embodiments 53-55 wherein detecting that the message contains an indication that the UE shall report available early measurements comprises first decoding at least a portion of the message.

Embodiment 57: The method of embodiment 56 wherein decoding at least a portion of the message comprises decoding the portion of the message using security keys provided by the last cell in which the UE was in the CONNECTED state.

Embodiment 58: The method of embodiment 56 wherein decoding at least a portion of the message comprises decoding the portion of the message using security keys provided by the cell in which the UE is currently camping.

Embodiment 59: The method of embodiment 58 wherein the security keys are included in the received message.

Embodiment 60: The method of embodiments 53-59 wherein the resume-like procedure comprises a connection resume procedure, a connection setup procedure, a connection establishment procedure, or a connection re-establishment procedure.

Embodiment 61: The method of embodiments 53-60 wherein an early measurement comprises a measurement taken by the UE while the UE was in the RRC_IDLE state and/or the RRC_INACTIVE state.

Group E Embodiments

Embodiment 62: A method, performed by a network node, for early measurement indication in a paging procedure, the method comprising: sending a message within a cell on which a UE is camping, the message comprising a paging message or a message that is multiplexed with a paging message and is not a paging message, the message containing an indication that the UE shall report available early measurements during a resume-like procedure; and receiving, from the UE, at least one early measurement in response to the sent message.

Embodiment 63: The method of embodiment 62 wherein the paging message comprises a Radio Resource Control, RRC, Paging message.

Embodiment 64: The method of embodiment 62 or 63 wherein the other message that is not a paging message comprises a UEInformationRequest message.

Embodiment 65: The method of embodiments 62-64 wherein the message contains security keys to be used by the UE to decode at least a portion of the message.

Embodiment 66: The method of embodiments 62-65 wherein the resume-like procedure comprises a connection resume procedure, a connection setup procedure, a connection establishment procedure, or a connection re-establishment procedure.

Embodiment 67: The method of embodiments 62-66 wherein an early measurement comprises a measurement taken by the UE while the UE was in the RRC_IDLE state and/or the RRC_INACTIVE state.

Embodiment 68: The method of embodiments 62-67 wherein the network node comprises a Base Station, BS, an access point, AP, an evolved Node B, eNB, a New Radio, NR, NodeB, gNB, a Remote Radio Unit, RRU, or a Remote Radio Head, RRH.

Group F Embodiments

Embodiment 69: A wireless device for early measurement indication in a paging procedure, the wireless device comprising: processing circuitry configured to perform any of the steps of any of the Group D embodiments; and power supply circuitry configured to supply power to the wireless device.

Embodiment 70: A base station for early measurement indication in a paging procedure, the base station comprising: processing circuitry configured to perform any of the steps of any of the Group E embodiments; and power supply circuitry configured to supply power to the base station.

Embodiment 71: A User Equipment, UE, for early measurement indication in a paging procedure, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group D embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 72: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group E embodiments.

Embodiment 73: The communication system of the previous embodiment further including the base station.

Embodiment 74: The communication system of the previous 2 embodiments, further including the UE, wherein the UE is configured to communicate with the base station.

Embodiment 75: The communication system of the previous 3 embodiments, wherein: the processing circuitry of the host computer is configured to execute a host application, thereby providing the user data; and the UE comprises processing circuitry configured to execute a client application associated with the host application.

Embodiment 76: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group E embodiments.

Embodiment 77: The method of the previous embodiment, further comprising, at the base station, transmitting the user data.

Embodiment 78: The method of the previous 2 embodiments, wherein the user data is provided at the host computer by executing a host application, the method further comprising, at the UE, executing a client application associated with the host application.

Embodiment 79: A User Equipment, UE, configured to communicate with a base station, the UE comprising a radio interface and processing circuitry configured to perform the method of the previous 3 embodiments.

Embodiment 80: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group D embodiments.

Embodiment 81: The communication system of the previous embodiment, wherein the cellular network further includes a base station configured to communicate with the UE.

Embodiment 82: The communication system of the previous 2 embodiments, wherein: the processing circuitry of the host computer is configured to execute a host application, thereby providing the user data; and the UE's processing circuitry is configured to execute a client application associated with the host application.

Embodiment 83: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group D embodiments.

Embodiment 84: The method of the previous embodiment, further comprising at the UE, receiving the user data from the base station.

Embodiment 85: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group D embodiments.

Embodiment 86: The communication system of the previous embodiment, further including the UE.

Embodiment 87: The communication system of the previous 2 embodiments, further including the base station, wherein the base station comprises a radio interface configured to communicate with the UE and a communication interface configured to forward to the host computer the user data carried by a transmission from the UE to the base station.

Embodiment 88: The communication system of the previous 3 embodiments, wherein: the processing circuitry of the host computer is configured to execute a host application; and the UE's processing circuitry is configured to execute a client application associated with the host application, thereby providing the user data.

Embodiment 89: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 90: A method implemented in a communication system including a host computer, a base station, and a User Equipment, UE, the method comprising: at the host computer, receiving user data transmitted to the base station from the UE, wherein the UE performs any of the steps of any of the Group D embodiments.

Embodiment 91: The method of the previous embodiment, further comprising, at the UE, providing the user data to the base station.

Embodiment 92: The method of the previous 2 embodiments, further comprising: at the UE, executing a client application, thereby providing the user data to be transmitted; and at the host computer, executing a host application associated with the client application.

Embodiment 93: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 94: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group E embodiments.

Embodiment 95: The communication system of the previous embodiment further including the base station.

Embodiment 96: The communication system of the previous 2 embodiments, further including the UE, wherein the UE is configured to communicate with the base station.

Embodiment 97: The communication system of the previous 3 embodiments, wherein: the processing circuitry of the host computer is configured to execute a host application; and the UE is configured to execute a client application associated with the host application, thereby providing the user data to be received by the host computer.

Embodiment 98: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group D embodiments.

Embodiment 99: The method of the previous embodiment, further comprising at the base station, receiving the user data from the UE.

Embodiment 100: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AMF Access and Mobility Management Function
AP Access Point
AS Access Stratum
ASIC Application Specific Integrated Circuit
BS Base Station
BWP Bandwidth Part
CA Carrier Aggregation
CE Control Element
CG Cell Group
CM Connection Management
CMAS Commercial Mobile Alert System
CN Core Network
CPU Central Processing Unit
DC Dual Connectivity
DRB Data Radio Bearer
DRX Discontinuous Reception
DSP Digital Signal Processor
eNB Enhanced or Evolved Node B
EN-DC Evolved Universal Terrestrial Radio Access Network New Radio Dual Connectivity
eLTE Enhanced Long Term Evolution
EPC Evolved Packet Core
ETWS Earthquake and Tsunami Warning System
E-UTRA Evolved Universal Terrestrial Radio Access
FPGA Field Programmable Gate Array
FR Frequency Range
GHz Gigahertz
gNB New Radio Base Station
ID Identity
IE Information Element
I-RNTI Inactive Radio Network Temporary Identifier
LTE Long Term Evolution
MAC Medium Access Control
MC Multi-Connectivity
MCG Master Cell Group
MeNB Master Enhanced or Evolved Node B MHz Megahertz
MME Mobility Management Entity
MN Master Node
MR-DC Multi-Radio Dual Connectivity
ms Millisecond
MTC Machine Type Communication
NAS Non-Access Stratum
NE New Radio Evolved Universal Terrestrial Radio Access
ng-eNB Next Generation Enhanced or Evolved Node B
NGEN-DC Next Generation Dual Connectivity
NG-RAN Next Generation Radio Access Network
NR New Radio
OTT Over-the-Top
PCell Primary Cell
PCI Physical Cell Identity
P-GW Packet Data Network Gateway
PO Paging Occasion
PSCell Primary Secondary Cell
PWS Public Warning System
RACH Random Access Channel
RAM Random Access Memory
RAN Radio Access Network
RAR Random Access Response
RAT Radio Access Technology
ROM Read Only Memory
RRC Radio Resource Control
RRH Remote Radio Head
RRM Radio Resource Management
RRU Remote Radio Unit
RSRP Reference Signal Received Power
RSRQ Reference Signal Received Quality
RTT Round Trip Time
SA Stand-Alone
SCEF Service Capability Exposure Function
SCell Secondary Cell
SCG Secondary Cell Group
SeNB Secondary Enhanced or Evolved Node B
SIB System Information Block
SN Secondary Node
SRB Signaling Radio Bearer
S-TMSI System Architecture Evolution Temporary Mobile Subscriber Identity
TS Technical Specification
UE User Equipment Those skilled in the art will recognize improvements and modifications to the embodiments of the present disclosure. All such improvements and modifications are considered within the scope of the concepts disclosed herein.

What is claimed is:

1. A method, performed by a wireless device for an early measurement request in association with a paging procedure, the method comprising:
   receiving a message in a cell on which the wireless device is camping and while the wireless device is in a dormant state, the message comprising either: (a) a paging message or (b) a separate message that is multiplexed with the paging message;
   detecting that the message contains an indication that the wireless device is to report available early measurements taken while the device is in the dormant state during a resume-like procedure performed during a state transition of the wireless device; and
   reporting at least one early measurement in accordance with the indication.

2. The method of claim 1 further comprising:
   determining that the at least one early measurement is available at the wireless device; and
   wherein reporting the at least one early measurement comprises reporting the at least one early measurement upon determining that the at least one early measurement is available at the wireless device.

3. The method of claim 1 wherein the message comprises the paging message.

4. The method of claim 1 wherein the message comprises the separate message that is multiplexed with the paging message.

5. The method of claim 1 wherein the paging message comprises a Radio Resource Control, RRC, Paging message.

6. The method of claim 1 wherein the separate message that is multiplexed with the paging message comprises a UEInformationRequest message.

7. The method of claim 1 wherein detecting that the message contains the indication that the wireless device is to report the available early measurements comprises first decoding at least a portion of the message.

8. The method of claim 7 wherein decoding at least a portion of the message comprises decoding the portion of the message using security keys provided by a last cell in which the wireless device was in a CONNECTED state.

9. The method of claim 7 wherein decoding the at least a portion of the message comprises decoding the at least a portion of the message using security keys provided by the cell on which the wireless device is camping.

10. The method of claim 9 wherein the security keys are included in the received message.

11. A wireless device for a cellular communications system, the wireless device adapted to:
    receive a message in a cell on which the wireless device is camping and while the wireless device is in a dormant state, the message comprising either: (a) a paging message or (b) a separate message that is multiplexed with the paging message;
    detect that the message contains an indication that the wireless device is to report available early measurements taken while the device is in the dormant state during a resume-like procedure performed during a state transition of the wireless device; and
    report at least one early measurement in accordance with the indication.

12. The wireless device of claim 11 wherein the wireless device comprises:
    one or more transmitters;
    one or more receivers; and
    processing circuitry associated with the one or more transmitters and the one or more receivers, the processing circuitry configured to cause the wireless device to:
      receive the message in the cell on which the wireless device is camping;
      detect that the message contains the indication that the wireless device is to report the available early measurements during the resume-like procedure; and
      report the at least one early measurement in accordance with the indication.

13. A method, performed by a network node, for an early measurement request in association with a paging procedure, the method comprising:
    sending a message within a cell on which a wireless device, while the wireless device is in a dormant state, is camping, the message comprising either: (a) a paging message or (b) a separate message that is multiplexed with the paging message, the message containing an indication that the wireless device is to report available early measurements taken while the wireless device is in the dormant state during a resume-like procedure performed during a state transition of the wireless device; and receiving, from the wireless device, at least one early measurement in response to the sent message.

14. The method of claim 13 wherein the message comprises the paging message.

15. The method of claim 13 wherein the message comprises the separate message that is multiplexed with the paging message.

16. The method of claim 15 wherein the separate message comprises a UEInformationRequest message.

17. The method of claim 13 wherein the paging message comprises a Radio Resource Control, RRC, Paging message.

18. The method of claim 13 wherein the message contains security keys to be used by the wireless device to decode at least a portion of the message.

19. A network node for a cellular communications system, the network node adapted to:

send a message within a cell on which a wireless device, while the wireless device is in a dormant state, is camping, the message comprising either: (a) a paging message or (b) a separate message that is multiplexed with the paging message, the message containing an indication that the wireless device is to report available early measurements taken while the wireless device is in the dormant state during a resume-like procedure performed during a state transition of the wireless device; and receive, from the wireless device, at least one early measurement in response to the sent message.

20. The network node of claim 19 wherein the network node comprises processing circuitry configured to cause the network node to:

send the message within the cell on which the wireless device is camping; and receive, from the wireless device, the at least one early measurement in response to the sent message.

* * * * *